US012238498B2

(12) United States Patent
Zhang et al.

(10) Patent No.: US 12,238,498 B2
(45) **Date of Patent: *Feb. 25, 2025**

(54) BONE CONDUCTION SPEAKER

(71) Applicant: SHENZHEN SHOKZ CO., LTD., Guangdong (CN)

(72) Inventors: Lei Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,080

(22) Filed: Aug. 18, 2023

(65) Prior Publication Data

US 2023/0396928 A1 Dec. 7, 2023

Related U.S. Application Data

(63) Continuation of application No. 17/453,643, filed on Nov. 4, 2021, now Pat. No. 11,778,384, which is a (Continued)

(30) Foreign Application Priority Data

Jan. 8, 2018 (WO) ................ PCT/CN2018/071751

(51) Int. Cl.
*H04R 9/02* (2006.01)
*H01F 7/08* (2006.01)
(Continued)

(52) U.S. Cl.
CPC ............. *H04R 9/025* (2013.01); *H01F 7/081* (2013.01); *H01F 7/121* (2013.01); *H04R 1/1091* (2013.01); *H04R 9/06* (2013.01); *H04R 2460/13* (2013.01)

(58) Field of Classification Search
CPC ........ H04R 9/025; H04R 1/1091; H04R 9/06; H04R 2460/13; H04R 9/02; H04R 11/02;
(Continued)

(56) References Cited

U.S. PATENT DOCUMENTS

| | | | |
|---|---|---|---|
| 4,783,824 | A | 11/1988 | Kobayashi |
| 4,892,633 | A | 1/1990 | Welty |

(Continued)

FOREIGN PATENT DOCUMENTS

| | | | |
|---|---|---|---|
| CN | 2302625 | Y | 12/1998 |
| CN | 201015225 | Y | 1/2008 |

(Continued)

OTHER PUBLICATIONS

The Search Report in Brazil Application No. BR112020013968-8 mailed on Jan. 31, 2024, 7 pages.

(Continued)

*Primary Examiner* — Carolyn R Edwards
*Assistant Examiner* — Julie X Dang
(74) *Attorney, Agent, or Firm* — METIS IP LLC

(57) ABSTRACT

The present disclosure relates to a magnetic circuit assembly of a bone conduction speaker. The magnetic circuit assembly may generate a first magnetic field. The magnetic circuit assembly may include a first magnetic element, and the first magnetic element may generate a second magnetic field. The magnetic circuit may further include a first magnetic guide element and at least one second magnetic element. The at least one second magnetic element may be configured to surround the first magnetic element and a magnetic gap may be configured between the second magnetic element and the first magnetic element. A magnetic field strength of the first magnetic field within the magnetic gap may exceed a magnetic field strength of the second magnetic field within the magnetic gap.

20 Claims, 32 Drawing Sheets

Related U.S. Application Data continuation of application No. 17/170,897, filed on Feb. 9, 2021, now Pat. No. 11,197,100, which is a continuation of application No. 16/923,015, filed on Jul. 7, 2020, now Pat. No. 11,310,602, which is a continuation of application No. PCT/CN2018/104934, filed on Sep. 11, 2018.

(51) Int. Cl.
*H01F 7/121* (2006.01)
*H04R 1/10* (2006.01)
*H04R 9/06* (2006.01)

(58) Field of Classification Search
CPC ...... H04R 1/1075; H04R 1/06; H04R 1/1041; H04R 5/0335; H04R 1/10; H04R 1/1033; H04R 1/028; H04R 1/1008; H04R 25/00; H04R 9/066; H04R 31/006; H04R 7/26; H04R 1/46; H01F 7/081; H01F 7/121; G02C 11/10; G02C 5/22; G10K 11/178; G10K 11/165
See application file for complete search history.

(56) References Cited

U.S. PATENT DOCUMENTS

| | | | | |
|---|---|---|---|---|
| 5,664,024 | A | 9/1997 | Furuta et al. | |
| 5,687,248 | A | 11/1997 | Yen et al. | |
| 6,671,385 | B2 | 12/2003 | Suzuki et al. | |
| 9,654,883 | B2 | 5/2017 | Fuji et al. | |
| 9,769,571 | B2 | 9/2017 | Asano et al. | |
| 10,057,686 | B2 | 8/2018 | Kobayashi et al. | |
| 10,178,480 | B2 | 1/2019 | Zhang et al. | |
| 10,805,718 | B1 | 10/2020 | Porter et al. | |
| 10,811,949 | B2 | 10/2020 | Oonishi et al. | |
| 11,197,100 | B2 | 12/2021 | Zhang et al. | |
| 11,778,384 | B2 * | 10/2023 | Zhang | H01F 7/121 381/412 |
| 2002/0094107 | A1 | 7/2002 | Cork | |
| 2003/0002232 | A1 * | 1/2003 | Dee | G11B 5/3903 |
| 2003/0031338 | A1 | 2/2003 | Suzuki et al. | |
| 2005/0175213 | A1 | 8/2005 | Stiles | |
| 2005/0190946 | A1 | 9/2005 | Stiles | |
| 2006/0045305 | A1 | 3/2006 | Shimamura | |
| 2006/0177090 | A1 | 8/2006 | Regl | |
| 2007/0160239 | A1 * | 7/2007 | Fukuda | H04R 11/06 381/151 |
| 2009/0116681 | A1 | 5/2009 | Sadaie et al. | |
| 2010/0111334 | A1 | 5/2010 | Simokawatoko et al. | |
| 2010/0172534 | A1 | 7/2010 | Lemarquand et al. | |
| 2010/0177928 | A1 | 7/2010 | Shimokawatoko et al. | |
| 2010/0329486 | A1 | 12/2010 | Scheel et al. | |
| 2011/0198949 | A1 | 8/2011 | Furuich et al. | |
| 2013/0163791 | A1 * | 6/2013 | Qi | H04R 9/02 381/151 |
| 2014/0056468 | A1 | 2/2014 | Kuze et al. | |
| 2015/0088008 | A1 | 3/2015 | Fuji et al. | |
| 2015/0365744 | A1 | 12/2015 | Cai et al. | |
| 2016/0322937 | A1 | 11/2016 | Suzuki et al. | |
| 2016/0323674 | A1 | 11/2016 | Porter et al. | |
| 2017/0177089 | A1 | 6/2017 | Kar et al. | |
| 2017/0332173 | A1 | 11/2017 | Gerkinsmeyer | |
| 2020/0228903 | A1 | 7/2020 | Liao et al. | |

FOREIGN PATENT DOCUMENTS

| | | | | |
|---|---|---|---|---|
| CN | 101909234 | A | 12/2010 | |
| CN | 102497611 | A * | 6/2012 | |
| CN | 202488645 | U | 10/2012 | |
| CN | 202713600 | U | 1/2013 | |
| CN | 203261475 | U | 10/2013 | |
| CN | 104105033 | A | 10/2014 | |
| CN | 104936104 | A | 9/2015 | |
| CN | 104936108 | A | 9/2015 | |
| CN | 205017570 | U | 2/2016 | |
| CN | 105681982 | A | 6/2016 | |
| CN | 205596326 | U | 9/2016 | |
| CN | 106507252 | A | 3/2017 | |
| CN | 206136279 | U | 4/2017 | |
| CN | 105142077 | B | 5/2017 | |
| CN | 216795282 | U | 6/2022 | |
| DE | 102008055172 | A1 | 7/2010 | |
| EP | 1227701 | A1 | 7/2002 | |
| EP | 3163909 | A1 * | 5/2017 | G02C 11/00 |
| JP | 59048197 | U1 | 3/1984 | |
| JP | S5948197 | U | 3/1984 | |
| JP | H10155198 | A | 6/1998 | |
| JP | 2001128287 | A | 5/2001 | |
| JP | 2003061189 | A | 2/2003 | |
| JP | 2003061190 | A | 2/2003 | |
| JP | 2007189269 | A | 7/2007 | |
| JP | 2007306214 | A | 11/2007 | |
| JP | 2008054063 | A | 3/2008 | |
| JP | 2015186103 | A | 10/2015 | |
| WO | 2004066671 | A1 | 8/2004 | |

OTHER PUBLICATIONS

International Search Report in PCT/CN2018/104934 mailed on Dec. 4, 2018, 6 pages.
Written Opinion in PCT/CN2018/104934 mailed on Dec. 4, 2018, 7 pages.
Office Action in Russian Application No. 2020126339 mailed on Jan. 27, 2021, 15 pages.
The Extended European Search Report in European Application No. 18897956.1 mailed on Nov. 25, 2020, 8 pages.
The Second Office Action in Russian Application No. 2020126339 mailed on Jun. 22, 2021, 13 pages.
"Methods for Changing the Parameters of the Loudspeaker Heads", Web page <http://web.archive.org/web/20170228235026/http:/ldsound.ru/sposoby-izmeneniya-parametrov-golovok-gromkogovoritelej/>, Feb. 28, 2017.
"Features of Electric-Acoustic Calculation ", Web page <http:/web.archive.org/web/20150702021919/https:/www.escortpro.ru/files/tutorials/ok/part2.pdf>, Jul. 2, 2015.
Bobrow A.L., Fundamentals of Magnetic Control Compendium of Lectures, Siberian State University of Railways, 2014, 1-60.
Bobrow A.L., Fundamentals of Magnetic Control Compendium of Lectures, Siberian State University of Railways, 2014, 61-120.
Notice of Reasons for Rejection in Japanese Application No. 2020538036 mailed on Sep. 21, 2021, 9 pages.
The Office Action in Russian Application No. 2022102718 mailed on Sep. 29, 2022, 15 pages.
The Second Office Action in Russian Application No. 2022102718 mailed on Feb. 14, 2023, 13 pages.
Notice of Reasons for Rejection in Japanese Application No. 2022071579 mailed on Apr. 24, 2023, 11 pages.

* cited by examiner

3700

4900

1000

1200

1400

1900

1904

1906

BONE CONDUCTION SPEAKER

CROSS-REFERENCE TO RELATED APPLICATIONS

The present disclosure is a continuation of U.S. application Ser. No. 17/453,643, filed on Nov. 4, 2021, which is a continuation of U.S. application Ser. No. 17/170,897 (issued as U.S. Pat. No. 11,197,100), filed on Feb. 9, 2021, which is a continuation of U.S. application Ser. No. 16/923,015 (issued as U.S. Pat. No. 11,310,602), filed on Jul. 7, 2020, which is a continuation of International Application PCT/CN2018/104934, filed on Sep. 11, 2018, which claims the priority of International Application No. PCT/CN2018/071751, filed on Jan. 8, 2018, the contents of each of which are incorporated herein in its entirety by reference.

TECHNICAL FIELD

The present disclosure relates to bone conduction speakers, and in particular relates to magnetic circuit assemblies of the bone conduction speakers.

BACKGROUND

The bone conduction speaker can convert electrical signals into mechanical vibration signals, and transmit the mechanical vibration signals into the cochlea through human tissues and bones, so that a user can hear a sound. In contrast to air conduction speakers, which generate sound based on air vibration driven by vibration diaphragms, bone conduction speakers need to drive the user's soft tissues and bones to vibrate, so the mechanical power required is higher. Increasing the sensitivity of a bone conduction speaker can make the higher efficiency of converting electrical energy into mechanical energy, thereby outputting greater mechanical power. Increasing sensitivity is even more important for bone conduction speakers with higher power requirements.

SUMMARY

The present disclosure relates to a magnetic circuit assembly of a bone conduction speaker. The magnetic circuit assembly may generate a first magnetic field. The magnetic circuit assembly may include a first magnetic element generating a second magnetic field; a first magnetic guide element; and at least one second magnetic element. The at least one second magnetic element may be configured to surround the first magnetic element and a magnetic gap may be configured between the second magnetic element and the first magnetic element. A magnetic field strength of the first magnetic field within the magnetic gap may exceed a magnetic field strength of the second magnetic field within the magnetic gap.

DETAILED DESCRIPTION

Figure 1:
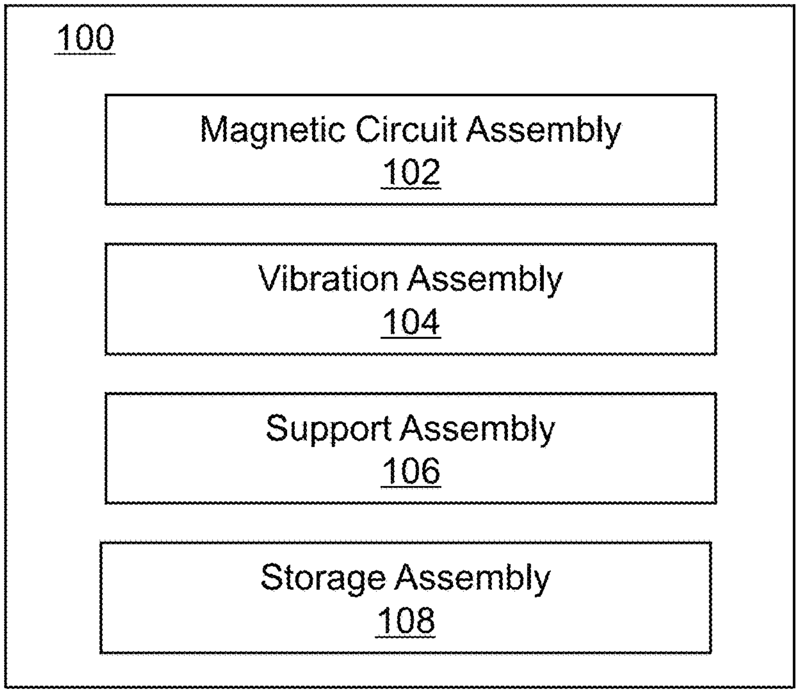
FIG. 1 is a block diagram illustrating a bone conduction speaker according to some embodiments of the present disclosure.

In the following, without loss of generality, the description of "bone conduction speaker" or "bone conduction headset" will be used when describing the bone conduction related technologies in the present disclosure. This description is only a form of bone conduction application. For a person of ordinary skill in the art, "speaker" or "headphone" can also be replaced with other similar words, such as "player", "hearing aid", or the like. In fact, the various implementations in the present disclosure may be easily applied to other non-speaker-type hearing devices. For example, for a person skilled in the art, after understanding the basic principle of bone conduction speaker, it is possible to make various modifications and changes in the form and details of the specific means and steps of implementing bone conduction speaker without departing from this principle. In particular, an ambient sound pickup and processing function may be added to a bone conduction speaker to enable the bone conduction speaker to implement the function of a hearing aid. For example, mikes, such as microphones may pick up the sound of a user/wearer's surroundings and, under a certain algorithm, send the processed (or generated electrical signal) sound to the bone conduction speaker, i.e., the bone conduction speaker may be modified to include the function of picking up ambient sound, and after a certain signal processing, the sound is transmitted to the user/wearer through the bone conduction speaker, thereby realizing the function of bone conduction hearing aid. For example, the algorithm mentioned here may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

The present disclosure provides a highly sensitive bone conduction speaker. In some embodiments, the bone conduction speaker may include a magnetic circuit assembly. The magnetic circuit assembly may generate a first magnetic field. The magnetic circuit assembly may include a first magnetic element, a first magnetic guide element, a second magnetic guide element, and one or more second magnetic elements. The first magnetic element may generate a second magnetic field, and the one or more second magnetic elements may be configured to surround the first magnetic element and a magnetic gap may be configured between the one or more second magnetic elements and the first magnetic element. The magnetic field strength of the first magnetic field within the magnetic gap may exceed the magnetic field strength of the second magnetic field within the magnetic gap. The arrangement of the one or more second magnetic elements in the magnetic circuit assembly surrounding the first magnetic element may reduce the volume and weight of the magnetic circuit assembly, improve the efficiency of the bone conduction speaker, and increase the service life of the bone conduction speaker in the case of increasing the magnetic field strength within the magnetic gap and the sensitivity of the bone conduction speaker.

The bone conduction speaker may have a small size, a light weight, a high efficiency, a high sensitivity, a long service life, etc., which is convenient for combining the bone conduction speaker with a wearable smart device, thereby achieving multiple functions of a single device, improving and optimizing user experience. The wearable smart device may include but is not limited to, smart headphones, smart glasses, smart headbands, smart helmets, smart watches, smart gloves, smart shoes, smart cameras, smart cameras, or the like. The bone conduction speaker may be further combined with smart materials to integrate the bone conduction speaker in the manufacturing materials of user's clothes, gloves, hats, shoes, etc. The bone conduction speaker may be further implanted into a human body, and cooperate with a chip that is implanted into the human body or an external processor to achieve a more personalized function.

FIG. 1 is a block diagram illustrating a bone conduction speaker 100 according to some embodiments of the present disclosure. As shown, the bone conduction speaker 100 may include a magnetic circuit assembly 102, a vibration assembly 104, a support assembly 106, and a storage assembly 108.

The magnetic circuit assembly 102 may provide a magnetic field (also referred to as a total magnetic field). The magnetic field may be used to convert a signal containing sound information (also referred to as sound signal) into a vibration signal. In some embodiments, the sound information may include a video and/or audio file having a specific data format, or data or files that may be converted into sound in a specific way. The sound signal may be from the storage assembly 108 of the bone conduction speaker 100 itself, or may be from an information generation, storage, or transmission system other than the bone conduction speaker 100. The sound signal may include an electric signal, an optical signal, a magnetic signal, a mechanical signal, or the like, or any combination thereof. The sound signal may be from a signal source or a plurality of signal sources. The plurality of signal sources may be related and may not be related. In some embodiments, the bone conduction speaker 100 may obtain the sound signal in a variety of different ways. The acquisition of the signal may be wired or wireless, and may be real-time or delayed. For example, the bone conduction speaker 100 may receive an electric sound signal through a wired or wireless manner, or may obtain data directly from a storage medium (e.g., the storage assembly 108) to generate a sound signal. As another example, a bone conduction hearing aid may include a component for sound collection. The mechanical vibration of the sound may be converted into an electrical signal by picking up sound in the environment, and an electrical signal that meets specific requirements may be obtained after being processed by an amplifier. In some embodiments, the wired connection may include using a metal cable, an optical cable, or a hybrid cable of metal and optics, for example, a coaxial cable, a communication cable, a flexible cable, a spiral cable, a non-metal sheathed cable, a metal sheathed cable, a multicore cable, a twisted pair cable, a ribbon cable, shielded cable, a telecommunication cable, a twisted pair cable, a parallel twin conductor, a twisted pair, or the like, or any combination thereof. The examples described above are only for the convenience of explanation. The media for wired connection may also be other types, such as other electrical or optical signal transmission carriers.

The wireless connection may include a radio communication, a free-space optical communication, an acoustic communication, and an electromagnetic induction, or the like. The radio communication may include an IEEE1002.11 standard, an IEEE1002.15 standard (e.g., a Bluetooth technique and a Zigbee technique, etc.), a first generation mobile communication technique, a second generation mobile communication technique (e.g., FDMA, TDMA, SDMA, CDMA, and SSMA, etc.), a general packet wireless service technique, a third generation mobile communication technique (e.g., a CDMA2000, a WCDMA, a TD-SCDMA, and WiMAX, etc.), a fourth generation mobile communication technique (e.g., TD-LTE and FDD-LTE, etc.), a satellite communication (e.g., GPS technology, etc.), a near field communication (NFC), and other techniques operating in the ISM band (e.g., 2.4 GHz, etc.); the free space optical communication may include using a visible light, an infrared signal, etc.; the acoustic communication may include using a sound wave, an ultrasonic signal, etc.; the electromagnetic induction may include a nearfield communication technique, etc. The examples described above are for illustrative purposes only. The media for wireless connection may be other types, such as a Z-wave technique, other charged civilian radiofrequency bands, military radiofrequency bands, etc. For example, the bone conduction speaker 100 may obtain the sound signal from other devices through Bluetooth.

The vibration assembly 104 may generate mechanical vibration. The generation of the mechanical vibration may be accompanied by energy conversion. The bone conduction speaker 100 may use a specific magnetic circuit assembly 102 and a vibration assembly 104 to convert a sound signal into the mechanical vibration. The conversion process may include the coexistence and conversion of many different types of energy. For example, an electrical sound signal may be directly converted into a mechanical vibration through a transducer to generate sound. As another example, the sound information may be included in an optical signal, and a specific transducer may convert the optical signal into a vibration signal. Other types of energy that may coexist and convert during the operation of the transducer may include thermal energy, magnetic field energy, etc. According to the energy conversion way, the transducer may include a moving coil type, an electrostatic type, a piezoelectric type, a moving iron type, a pneumatic type, an electromagnetic type, etc. The frequency response range and sound quality of the bone conduction speaker 100 may be affected by the vibration assembly 104. For example, in a transducer with the moving coil type, the vibration assembly 104 may include a cylindrical coil and a vibrator (e.g., a vibrating plate). The cylindrical coil driven by a signal current may drive the vibrator to vibrate in a magnetic field provided by the magnetic circuit assembly 102 and make a sound. The sound quality of the bone conduction speaker 100 may be affected by the expansion and contraction, the deformation, the size, the shape, the fixed mean, etc., of the vibrator, and the magnetic density of the permanent magnet in the magnetic circuit assembly 102. The vibrator in the vibration assembly 104 may be a mirror-symmetric structure, a center-symmetric structure, or an asymmetric structure. The vibrator may be configured with multiple holes, so that the vibrator may have a larger displacement, thereby achieving higher sensitivity and improving the output power of vibration and sound for the bone conduction speaker. The vibrator may be provided as one or more coaxial annular bodies. A plurality of supporting rods which may be converged toward the center may be arranged in each of the one or more coaxial annular bodies. The count of the supporting rods may be two or more.

The support assembly 106 may support the magnetic circuit assembly 102, the vibration assembly 104, and/or the storage assembly 108. The support assembly 106 may include one or more housings, one or more connectors. The one or more housings may form a space configured to accommodate the magnetic circuit assembly 102, the vibration assembly 104, and/or the storage assembly 108. The one or more connectors may connect the housings with the magnetic circuit assembly 102, the vibration assembly 104, and/or the storage assembly 108.

The storage assembly 108 may store sound signals. In some embodiments, the storage assembly 108 may include one or more storage devices. The one or more storage devices may include storage devices on a storage system (e.g., a direct attached storage, a network attached storage, and a storage area network, etc.). The one or more storage devices may include various types of storage devices, such as a solid-state storage device (e.g., a solid-state hard disk, a solid-state hybrid hard disk, etc.), a mechanical hard disk, a USB flash memory, a memory stick, a memory card (e.g., a CF, an SD, etc.), other drivers (e.g., a CD, a DVD, an HD DVD, a Blu-ray, etc.), a random access memory (RAM), and a read-only memory (ROM). The RAM may include a dekatron, a selectron, a delay line memory, a Williams tubes, a dynamic random access memory (DRAM), a static random access memory (SRAM), a thyristor random access memory (T-RAM), a zero capacitor random access memory (Z-RAM), etc. The ROM may include a bubble memory, a twistor memory, a film memory, a plated wire memory, a magnetic-core memory, a drum memory, a CD-ROM, a hard disk, a tape, a non-volatile random access memory (NVRAM), a phase-change memory, a magneto-resistive random access memory, a ferroelectric random access memory, a non-volatile SRAM, a flash memory, an electrically erasable programmable read-only memory, an erasable programmable read-only memory, a programmable read-only memory, a mask ROM, a floating gate random access memory, a Nano random access memory, a racetrack memory, a resistive random access memory, a programmable metallization unit, etc. The storage device/storage unit mentioned above is a list of some examples. The storage device/storage unit may use a storage device that is not limited to this.

The above description of the bone conduction speaker may be only a specific example, and should not be regarded as the only feasible implementation solution. Obviously, for those skilled in the art, after understanding the basic principle of bone conduction speaker, it is possible to make various modifications and changes in the form and details of the specific means and steps for implementing bone conduction speaker without departing from this principle, but these modifications and changes are still within the scope described above. For example, the bone conduction speaker 100 may include one or more processors, the one or more processors may execute one or more algorithms for processing sound signals. The algorithms for processing sound signals may modify or strengthen the sound signal. For example, a noise reduction, an acoustic feedback suppression, a wide dynamic range compression, an automatic gain control, an active environment recognition, an active noise reduction, a directional processing, a tinnitus processing, a multi-channel wide dynamic range compression, an active howling suppression, a volume control, or other similar or any combination of the above processing may be performed on sound signals. These amendments and changes are still within the protection scope of the present disclosure. As another example, the bone conduction speaker 100 may include one or more sensors, such as a temperature sensor, a humidity sensor, a speed sensor, a displacement sensor, or the like. The sensor may collect user information or environmental information.

Figure 2:
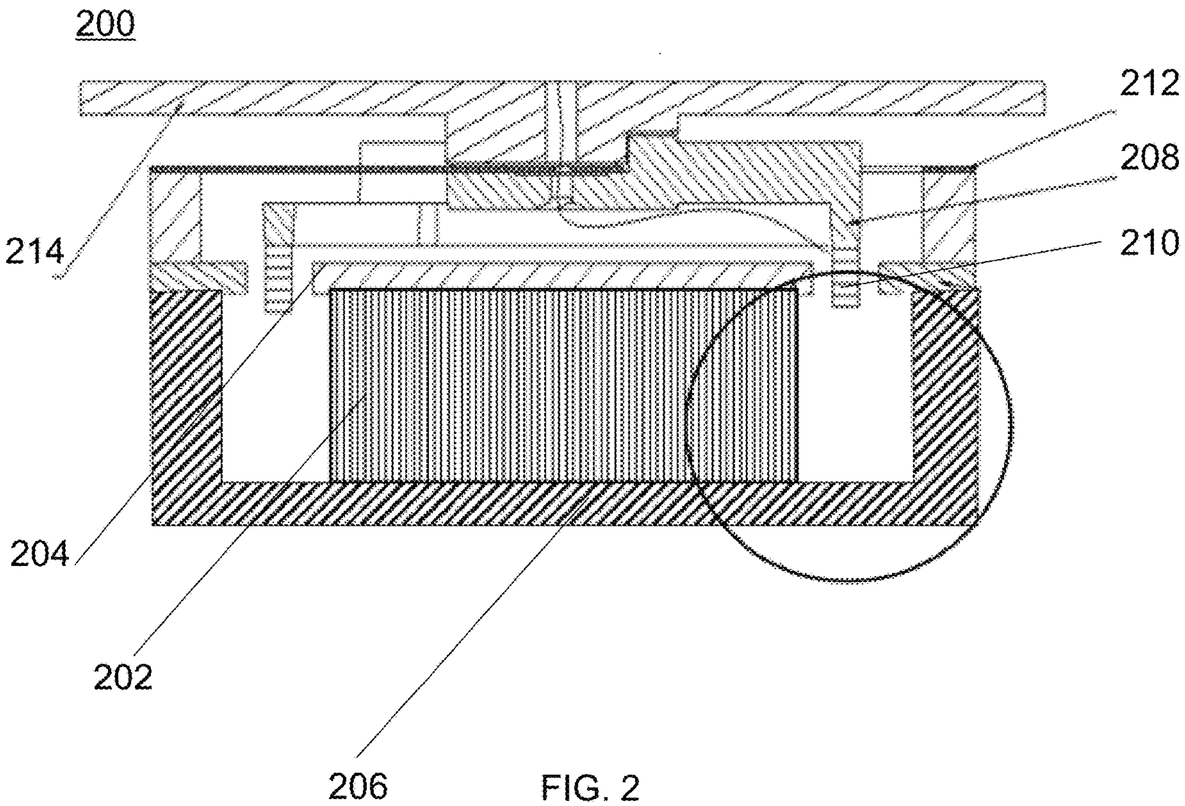
FIG. 2 is a schematic diagram illustrating a longitudinal sectional view of a bone conduction speaker according to some embodiments of the present disclosure.

FIG. 2 is a schematic diagram illustrating a vertical section of a bone conduction speaker 200 according to some embodiments of the present disclosure. As shown, the bone conduction speaker 200 may include a first magnetic element 202, a first magnetic guide element 204, a second magnetic guide element 206, a first vibration plate 208, a voice coil 210, a second vibration plate 212, and a vibration panel 214.

As used herein, a magnetic element described in the present disclosure refers to an element that may generate a magnetic field, such as a magnet. The magnetic element may have a magnetization direction, and the magnetization direction may refer to a magnetic field direction inside the magnetic element. The first magnetic element 202 may include one or more magnets. In some embodiments, a magnet may include a metal alloy magnet, a ferrite, or the like. The metal alloy magnet may include a neodymium iron boron, a samarium cobalt, an aluminum nickel cobalt, an iron chromium cobalt, an aluminum iron boron, an iron carbon aluminum, or the like, or a combination thereof. The ferrite may include a barium ferrite, a steel ferrite, a manganese ferrite, a lithium manganese ferrite, or the like, or a combination thereof.

The lower surface of the first magnetic guide element 204 may be connected with the upper surface of the first magnetic element 202. The second magnetic guide element 206 may be connected with the first magnetic element 202. It should be noted that a magnetic guide element used herein may also be referred to as a magnetic field concentrator or iron core. The magnetic guide element may adjust the distribution of the magnetic field (e.g., the magnetic field generated by the first magnetic element 202). The magnetic guide element may be made of a soft magnetic material. In some embodiments, the soft magnetic material may include a metal material, a metal alloy, a metal oxide material, an amorphous metal material, or the like, for example, an iron, an iron-silicon based alloy, an iron-aluminum based alloy, a nickel-iron based alloy, an iron-cobalt based alloy, a low carbon steel, a silicon steel sheet, a silicon steel sheet, a ferrite, or the like. In some embodiments, the magnetic guide element may be manufactured by a way of casting, plastic processing, cutting processing, powder metallurgy, or the like, or any combination thereof. The casting may include a sand casting, an investment casting, a pressure casting, a centrifugal casting, etc. The plastic processing may include a rolling, a casting, a forging, a stamping, an extrusion, a drawing, or the like, or any combination thereof. The cutting processing may include a turning, a milling, a planning, a grinding, etc. In some embodiments, the processing means of the magnetic guide element may include a 3D printing, a CNC machine tool, or the like. The connection means between the first magnetic guide element 204, the second magnetic guide element 206, and the first magnetic element 202 may include a bonding, a clamping, a welding, a riveting, a bolting, or the like, or any combination thereof. In some embodiments, the first magnetic element 202, the first magnetic guide element 204, and the second magnetic guide element 206 may be configured as an axisymmetric structure. The axisymmetric structure may be an annular structure, a columnar structure, or other axisymmetric structures.

In some embodiments, a magnetic gap may be formed between the first magnetic element 202 and the second magnetic guide element 206. The voice coil 210 may be located within the magnetic gap. The voice coil 210 may be physically connected with the first vibration plate 208. The first vibration plate 208 may be connected with the second vibration plate 212, and the second vibration plate 212 may be connected with the vibration panel 214. When a current is passed into the voice coil 210, and the voice coil 210 may be located in a magnetic field formed by the first magnetic element 202, the first magnetic guide element 214, and the second magnetic guide element 206, and affected by an ampere force generated under the magnetic field. The ampere force may drive the voice coil 210 to vibrate, and the vibration of the voice coil 210 may drive the vibration of the first vibration plate 208, the second vibration plate 212, and the vibration panel 214. The vibration panel 214 may transmit the vibration to the auditory nerve through tissues and bones, so that a person hears the sound. The vibration panel 214 may directly contact the human skin, or may contact the skin through a vibration transmission layer composed of a specific material.

In some embodiments, for some bone conduction speakers with a single magnetic element, the magnetic induction lines passing through the voice coil may be nonuniform and divergent. At the same time, a magnetic leakage may exist in the magnetic circuit. More magnetic induction lines may be outside the magnetic gap and fail to pass through the voice coil, so that the magnetic induction intensity (or magnetic field strength) at the position of the voice coil decreases, thereby affecting the sensitivity of the bone conduction speaker. Therefore, the bone conduction speaker 200 may further include at least one second magnetic element and/or at least one third magnetic guide element (not shown). The at least one second magnetic element and/or the at least one third magnetic guide element may suppress the leakage of the magnetic induction lines and restrict the shape (e.g., direction, quantity) of the magnetic induction lines passing through the voice coil, so that more magnetic lines pass through the voice coil as horizontally and densely as possible to enhance the magnetic induction intensity (or magnetic field strength) at the position of the voice coil, thereby improving the sensitivity and the mechanical conversion efficiency of the bone conduction speaker 200 (e.g., the efficiency of converting the electric energy input into the bone conduction speaker 200 into the mechanical energy of the voice coil vibration). More descriptions of the at least one second magnetic element may be found elsewhere in the present disclosure (e.g., FIG. 3A to FIG. 3G, FIG. 4A to FIG. 4M and/or FIG. 5A to FIG. 5F, and the descriptions thereof).

The above description of the bone conduction speaker 200 may be only a specific example, and should not be regarded as the only feasible implementation solution. Obviously, for those skilled in the art, after understanding the basic principle of bone conduction speaker, it is possible to make various modifications and changes in the form and details of the specific means and steps for implementing bone conduction speaker without departing from this principle, but these modifications and changes are still within the scope described above. For example, the bone conduction speaker 200 may include a housing, a connector, or the like. The connector may connect the vibration panel 214 and the housing. As another example, the bone conduction speaker 200 may include a second magnetic element, and the second magnetic element may be physically connected with the first magnetic guide element 204. As another example, the bone conduction speaker 200 may further include one or more annular magnetic elements, the annular magnetic elements may be physically connected with the second magnetic guide element 206.

Figure 3A:
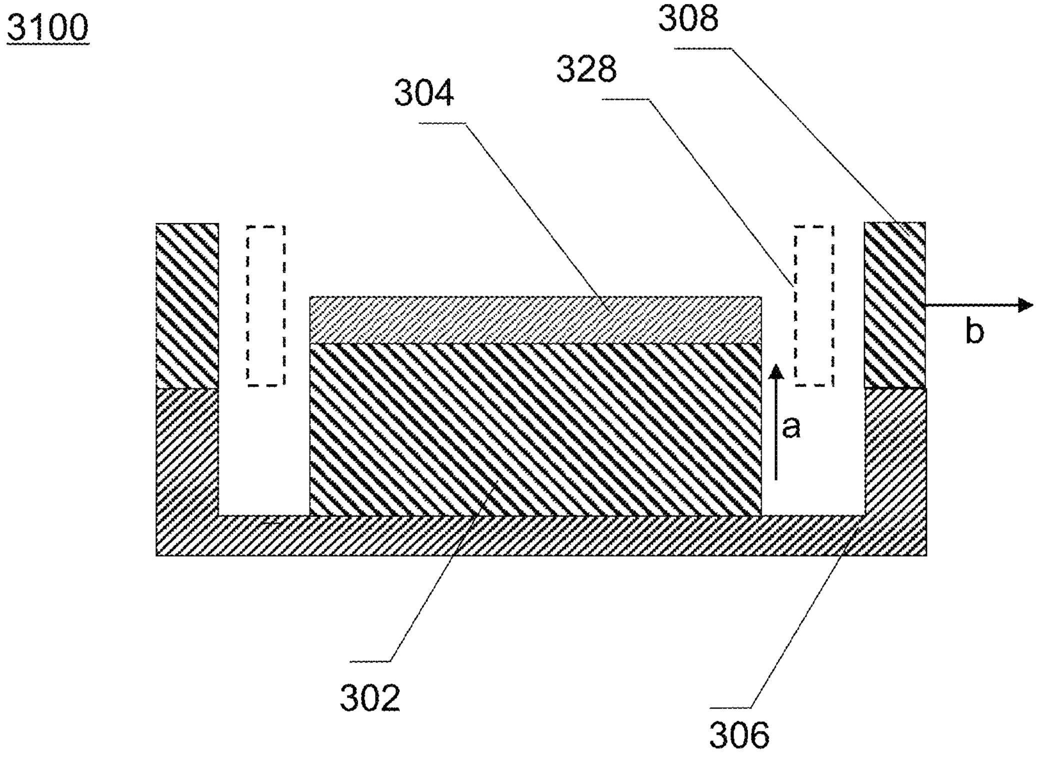
FIG. 3A is a schematic diagram illustrating a longitudinal sectional view of a magnetic circuit assembly according to some embodiments of the present disclosure.

FIG. 3A is a schematic diagram illustrating a longitudinal section of a magnetic circuit assembly 3100 according to some embodiments of the present disclosure. As shown in FIG. 3A, the magnetic circuit assembly 3100 may include a first magnetic element 302, a first magnetic guide element 304, a second magnetic guide element 306, and a second magnetic element 308. In some embodiments, the first magnetic element 302 and/or the second magnetic element 308 may include one or more magnets as described in the present disclosure. In some embodiments, the first magnetic element 302 may include a first magnet, and the second magnetic element 308 may include a second magnet. The first magnet may be the same as or different from the second magnet in types. The first magnetic guide element 304 and/or the second magnetic guide element 306 may include one or more permeability magnetic materials as described in the present disclosure. The first magnetic guide element 304 and/or the second magnetic guide element 306 may be manufactured using any one or more processing means as described in the present disclosure. In some embodiments, the first magnetic element 302 and/or the first magnetic guide element 304 may be axisymmetric. For example, the first magnetic element 302 and/or the first magnetic guide element 304 may be a cylinder, a rectangle parallelepiped, or a hollow ring (e.g., the cross section is the shape of a runway). In some embodiments, the first magnetic element 302 and the first magnetic guide element 304 may be coaxial cylinders with the same or different diameters. In some embodiments, the second magnetic guide element 306 may be a groove-type structure. The groove-type structure may include a U-shaped cross section (as shown in FIG. 3A). The second magnetic guide element 306 with the groove-type structure may include a baseplate and a side wall. In some embodiments, the baseplate and the side wall may be integrally formed. For example, the side wall may be formed by extending the baseplate in a direction perpendicular to the baseplate. In some embodiments, the baseplate may be physically connected with the side wall through any one or more connection means as described in the present disclosure. The second magnetic element 308 may be provided in an annular shape or a sheet shape. More descriptions regarding the shape of the second magnetic element 308 may be found elsewhere in the specification (e.g., FIG. 5A and FIG. 5B and the descriptions thereof). In some embodiments, the second magnetic element 308 may be coaxial with the first magnetic element 302 and/or the first magnetic guide element 304.

The upper surface of the first magnetic element 302 may be physically connected with the lower surface of the first magnetic guide element 304. The lower surface of the first magnetic element 302 may be physically connected with the baseplate of the second magnetic guide element 306. The lower surface of the second magnetic element 308 may be physically connected with the side wall of the second magnetic guide element 306. Connection means between the first magnetic element 302, the first magnetic guide element 304, the second magnetic guide element 306, and/or the second magnetic element 308 may include the bonding, the snapping, the welding, the riveting, the bolting, or the like, or any combination thereof.

The magnetic gap may be configured between the first magnetic element 302 and/or the first magnetic guide element 304 and an inner ring of the second magnetic element 308. A voice coil 328 may be located within the magnetic gap. In some embodiments, the height of the second magnetic element 308 and the voice coil 328 relative to the baseplate of the second magnetic guide element 306 may be equal. In some embodiments, the first magnetic element 302, the first magnetic guide element 304, the second magnetic guide element 306, and the second magnetic element 308 may form a magnetic circuit (or magnetic return path). In some embodiments, the magnetic circuit assembly 3100 may generate a first magnetic field (also referred to as full magnetic field or total magnetic field), and the first magnetic element 302 may generate a second magnetic field. The first magnetic field may be jointly formed by magnetic fields generated by all components (e.g., the first magnetic element 302, the first magnetic guide element 304, the second magnetic guide element 306, and the second magnetic element 308) in the magnetic circuit assembly 3100. The magnetic field strength (also referred to as magnetic induction intensity or magnetic flux density) of the first magnetic field within the magnetic gap may exceed the magnetic field strength of the second magnetic field within the magnetic gap. As used herein, a magnetic field strength of a magnetic field within a magnetic gap may refer to an average value of magnetic field strengths of the magnetic field at different locations of the magnetic gap or a value of a magnetic field strength of the magnetic field at a specific location within the magnetic gap. In some embodiments, the second magnetic element 308 may generate a third magnetic field. The third magnetic field may increase the magnetic field strength of the first magnetic field within the magnetic gap. The third magnetic field mentioned here increasing the magnetic field strength of the first magnetic field may refer to that the first magnetic field generated by the magnetic circuit assembly 3100 including the second magnetic element 308 (i.e., when the third magnetic field exists) has a stronger magnetic field strength than the first magnetic field generated by the magnetic circuit assembly 3100 not including the second magnetic element 308 (i.e., when the second magnetic field does not exist). In other embodiments in this specification, unless otherwise specified, the magnetic circuit assembly represents a structure including all magnetic elements and magnetic guide elements. The total magnetic field represents the total magnetic field generated by the magnetic circuit assembly as a whole. The second magnetic field, the third magnetic field, . . . , and the Nth magnetic field represent magnetic fields generated by corresponding magnetic elements, respectively. In different embodiments, a magnetic element that generates the second magnetic field (or the third magnetic field, . . . , Nth magnetic field) may be the same, and may be different.

In some embodiments, an included angle between the magnetization direction of the first magnetic element 302 and the magnetization direction of the second magnetic element 308 may be in a range from 0 to 180 degrees. In some embodiments, the included angle between the magnetization direction of the first magnetic element 302 and the magnetization direction of the second magnetic element 308 may be in a range from 45 degrees to 135 degrees. In some embodiments, the included angle between the magnetization direction of the first magnetic element 302 and the magnetization direction of the second magnetic element 308 may be equal to or greater than 90 degrees. In some embodiments, the magnetization direction of the first magnetic element 302 may be perpendicular to the lower surface or the upper surface of the first magnetic element 302 and be vertically upward the direction denoted by arrow a in FIG. 3A). The magnetization direction of the second magnetic element 308 may be directed from the inner ring of the second magnetic element 308 to the outer ring (the direction denoted by arrow b in FIG. 3A). On the right side of the first magnetic element 302, the magnetization direction of the second magnetic element 308 may be same as the magnetization direction of the first magnetic element 302 deflected 90 degrees in a clockwise direction.

In some embodiments, at the position of the second magnetic element 308, an included angle between the direction of the first magnetic field and the magnetization direction of the second magnetic element 308 may not be higher than 90 degrees. In some embodiments, at the position of the second magnetic element 308, the included angle between the direction of the first magnetic field generated by the first magnetic element 302 and the magnetization direction of the second magnetic element 308 may be an included angle that is less than or equal to 90 degrees, such as 0 degrees, 10 degrees, 20 degrees, etc.

Compared with the magnetic circuit assembly including one single magnetic element, the second magnetic element 308 may increase the total magnetic flux within the magnetic gap in the magnetic circuit assembly 3100, thereby increasing the magnetic induction intensity within the magnetic gap. In addition, under the action of the second magnetic element 308, the magnetic induction lines that are originally divergent may converge to the position of the magnetic gap, further increasing the magnetic induction intensity within the magnetic gap.

The above description of the magnetic circuit assembly 3100 may be only a specific example, and should not be considered as the only feasible implementation. Obviously, for a person skilled in the art, after understanding the basic principle of bone magnetic circuit assembly, it is possible to make various modifications and changes in the form and details of the specific means and steps of implementing the magnetic circuit assembly 3100 without departing from this principle, but these modifications and changes are still within the scope described above. For example, the second magnetic guide element 306 may be a ring structure or a sheet structure. As another example, the magnetic circuit assembly 3100 may further include a magnetic shield, the magnetic shield may be configured to encompass the first magnetic element 302, the first magnetic guide element 304, the second magnetic guide element 306, and the second magnetic element 308.

Figure 3B:
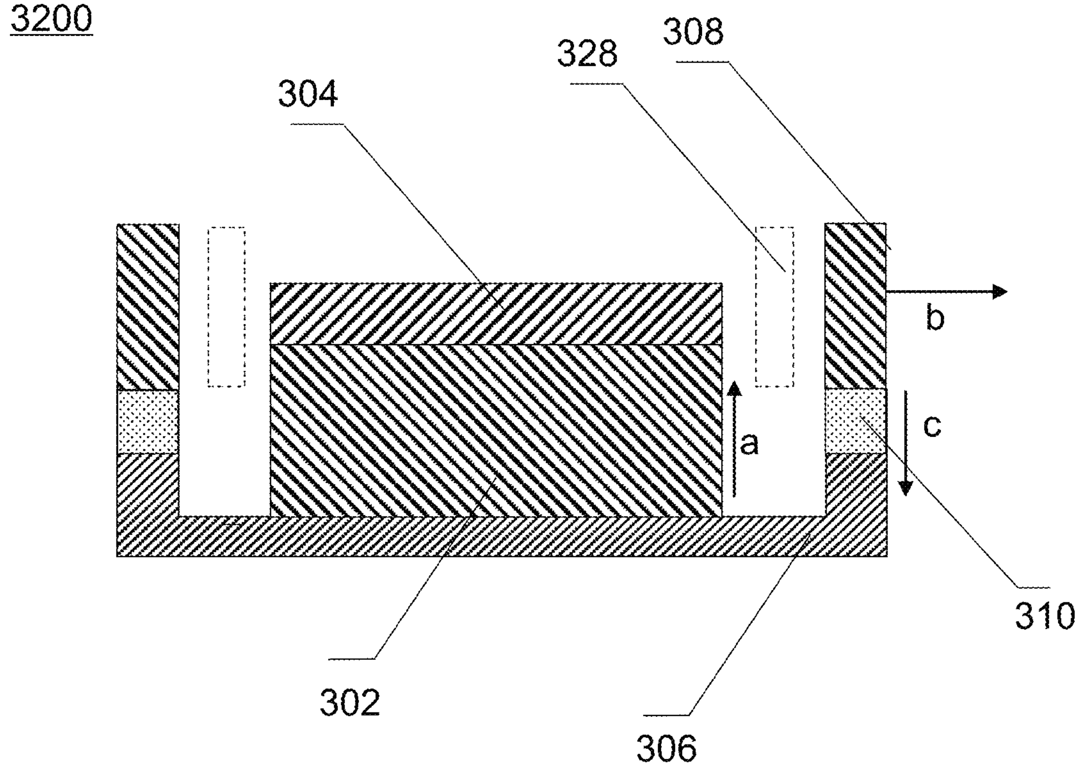
FIG. 3B is a schematic diagram illustrating a longitudinal sectional view of a magnetic circuit assembly according to some embodiments of the present disclosure.

FIG. 3B is a schematic diagram illustrating a longitudinal sectional of a magnetic circuit assembly 3200 according to some embodiments of the present disclosure. As shown in FIG. 3B, different from the magnetic circuit assembly 3100, the magnetic circuit assembly 3200 may further include a third magnetic element 310.

The upper surface of the third magnetic element 310 may be physically connected with the second magnetic element 308, and the lower surface may be physically connected with the side wall of the second magnetic guide element 306. The magnetic gap may be configured between the first magnetic element 302, the first magnetic guide element 304, the second magnetic element 308, and/or the third magnetic element 310. The voice coil 328 may be located within the magnetic gap. In some embodiments, the first magnetic element 302, the first magnetic guide element 304, the second magnetic guide element 306, the second magnetic element 308, and the third magnetic element 310 may form a magnetic circuit. In some embodiments, the magnetization direction of the second magnetic element 308 may refer to the detailed descriptions in FIG. 3A of the present disclosure.

In some embodiments, the magnetic circuit assembly 3200 may generate the total magnetic field, and the first magnetic element 302 may generate the first magnetic field. The magnetic field strength of the total magnetic field within the magnetic gap may exceed the magnetic field strength of the first magnetic field within the magnetic gap. In some embodiments, the third magnetic element 310 may generate the third magnetic field, and the third magnetic field may increase the magnetic field strength of the first magnetic field within the magnetic gap.

In some embodiments, an included angle between the magnetization direction of the first magnetic element 302 and the magnetization direction of the third magnetic element 310 may be in a range from 0 to 180 degrees. In some embodiments, the included angle between the magnetization direction of the first magnetic element 302 and the magnetization direction of the third magnetic element 310 may be in a range from 45 degrees to 135 degrees. In some embodiments, the included angle between the magnetization direction of the first magnetic element 302 and the magnetization direction of the third magnetic element 310 may be equal to or greater than 90 degrees. In some embodiments, the magnetization direction of the first magnetic element 302 may be perpendicular to the lower surface or the upper surface of the first magnetic element 302 vertically upward (the direction denoted by arrow a in the FIG. 3B). The magnetization direction of the third magnetic element 310 may be directed from the upper surface of the third magnetic element 310 to the lower surface (the direction denoted by arrow c in the FIG. 3B). On the right side of the first magnetic element 302, the magnetization direction of the third magnetic element 310 may be same as the magnetization direction of the first magnetic element 302 deflected 180 degrees in a clockwise direction.

In some embodiments, at the position of the third magnetic element 310, the included angle between the direction of the total magnetic field and the magnetization direction of the third magnetic element 310 may not be higher than 90 degrees. In some embodiments, at the position of the third magnetic element 310, the included angle between the direction of the first magnetic field generated by the first magnetic element 302 and the magnetization direction of the third magnetic element 310 may be an included angle that is less than or equal to 90 degrees, such as 0 degrees, 10 degrees, 20 degrees, etc.

Compared with the magnetic circuit assembly 3100, the third magnetic element 310 may be added to the magnetic circuit assembly 3200. The third magnetic element 310 may further increase the total magnetic flux within the magnetic gap in the magnetic circuit assembly 3200, thereby further increasing the magnetic induction intensity within the magnetic gap. In addition, under the action of the third magnetic element 310, the magnetic induction line will further converge to the position of the magnetic gap, further increasing the magnetic induction intensity within the magnetic gap.

The above description of the magnetic circuit assembly 3200 may be only a specific example, and should not be considered as the only feasible implementation solution. Obviously, for those skilled in the art, after understanding the basic principles of magnetic circuit assembly, it is possible to make various modifications and changes in the form and details of the specific means and steps of implementing the magnetic circuit assembly 3200 without departing from this principle, but these modifications and changes are still within the scope described above. For example, the second magnetic guide element 306 may be the ring structure or the sheet structure. As another example, the magnetic circuit assembly 3200 may not include the second magnetic guide element 306. As another example, the at least one magnetic element may be added to the magnetic circuit assembly 3200. In some embodiments, the lower surface of the further added magnetic element may be connected with the upper surface of the second magnetic element 308. The magnetization direction of the further added magnetic element may be opposite to the magnetization direction of the third magnetic element 312. In some embodiments, the further added magnetic element may be connected with the side wall of the first magnetic element 302 and the second magnetic guide element 306. The magnetization direction of the further added magnetic element may be opposite to the magnetization direction of the second magnetic element 308.

Figure 3C:
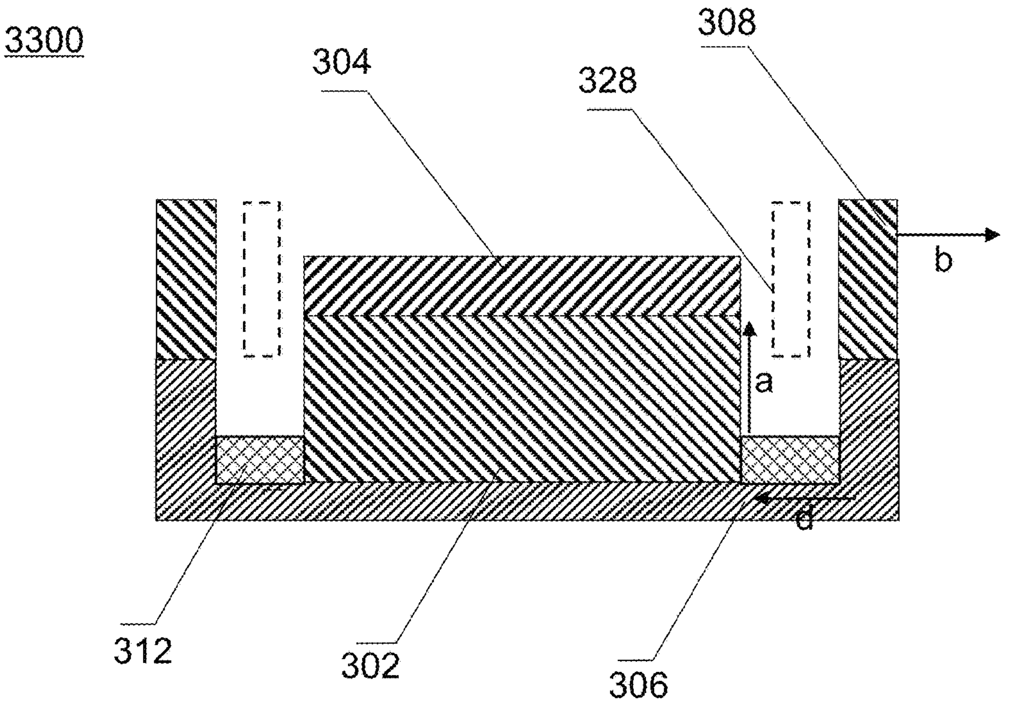
FIG. 3C is a schematic diagram illustrating a longitudinal sectional view of a magnetic circuit assembly according to some embodiments of the present disclosure.

FIG. 3C is a schematic diagram illustrating a longitudinal sectional view of a magnetic circuit assembly 3300 according to some embodiments of the present disclosure. As shown in FIG. 3C, different from the magnetic circuit assembly 3100, the magnetic circuit assembly 3300 may further include a fourth magnetic element 312.

The fourth magnetic element 312 may be connected with the side wall of the first magnetic element 302 and the second magnetic guide element 306 by the bonding, the snapping, the welding, the riveting, the bolting, or the like, or any combination thereof. In some embodiments, the magnetic gap may be configured between the first magnetic element 302, the first magnetic guide element 304, the second magnetic guide element 306, the second magnetic element 308, and the fourth magnetic element 312. In some embodiments, the magnetization direction of the second magnetic element 308 may refer to the detailed descriptions in FIG. 3A of the present disclosure.

In some embodiments, the magnetic circuit assembly 3300 may generate the first magnetic field, and the first magnetic element 302 may generate the second magnetic field. The magnetic field strength of the first magnetic field within the magnetic gap may exceed the magnetic field strength of the second magnetic field within the magnetic gap. In some embodiments, the fourth magnetic element 312 may generate a fourth magnetic field, and the fourth magnetic field may increase the magnetic field strength of the second magnetic field within the magnetic gap.

In some embodiments, an included angle between the magnetization direction of the first magnetic element 302 and the magnetization direction of the fourth magnetic element 312 may be in a range from 0 to 180 degrees. In some embodiments, the included angle between the magnetization direction of the first magnetic element 302 and the magnetization direction of the fourth magnetic element 312 may be in a range from 45 degrees to 135 degrees. In some embodiments, the included angle between the magnetization direction of the first magnetic element 302 and the magnetization direction of the fourth magnetic element 312 may not be higher than 90 degrees. In some embodiments, the magnetization direction of the first magnetic element 302 may be perpendicular to the lower surface or the upper surface of the first magnetic element 302 vertically upward (the direction denoted by arrow a in the FIG. 3C). The magnetization direction of the fourth magnetic element 312 may be directed from the outer ring of the fourth magnetic element 312 to the inner ring (the direction denoted by arrow d in the FIG. 3C). On the right side of the first magnetic element 302, the magnetization direction of the fourth magnetic element 312 may be same as the magnetization direction of the first magnetic element 302 deflected 270 degrees clockwise.

In some embodiments, at the position of the fourth magnetic element 312, the included angle between the direction of the first magnetic field and the magnetization direction of the fourth magnetic element 312 may not be higher than 90 degrees. In some embodiments, at the position of the fourth magnetic element 312, the included angle between the direction of the magnetic field generated by the first magnetic element 302 and the magnetization direction of the fourth magnetic element 312 may be an included angle that is less than or equal to 90 degrees, such as 0 degrees, 10 degrees, 20 degrees, etc.

Compared with the magnetic circuit assembly 3100, the fourth magnetic element 312 may be added to the magnetic circuit assembly 3300. The fourth magnetic element 312 may further increase the total magnetic flux within the magnetic gap in the magnetic circuit assembly 3300, thereby increasing the magnetic induction intensity within the magnetic gap. In addition, under the action of the fourth magnetic element 312, the magnetic induction line will further converge to the position of the magnetic gap, further increasing the magnetic induction intensity within the magnetic gap.

The above description of the magnetic circuit assembly 3300 may be only a specific example, and should not be considered as the only feasible implementation. Obviously, for a person skilled in the art, after understanding the basic principle of the bone magnetic circuit assembly, it is possible to make various modifications and changes in the form and details of the specific means and steps for implementing the magnetic circuit assembly 3300 without departing from this principle, but these modifications and changes are still within the scope described above. For example, the second magnetic guide element 306 may be the ring structure or the sheet structure. As another example, the magnetic circuit assembly 3300 may not include the second magnetic element 308. As another example, the at least one magnetic element may be added to the magnetic circuit assembly 3300. In some embodiments, the lower surface of the further added magnetic element may be connected with the upper surface of the second magnetic element 308. The magnetization direction of the further added magnetic element may be the same as the magnetization direction of the first magnetic element 302. In some embodiments, the upper surface of the further added magnetic element may be connected with the lower surface of the second magnetic element 308. The magnetization direction of the magnetic element may be opposite to the magnetization direction of the first magnetic element 302.

Figure 3D:
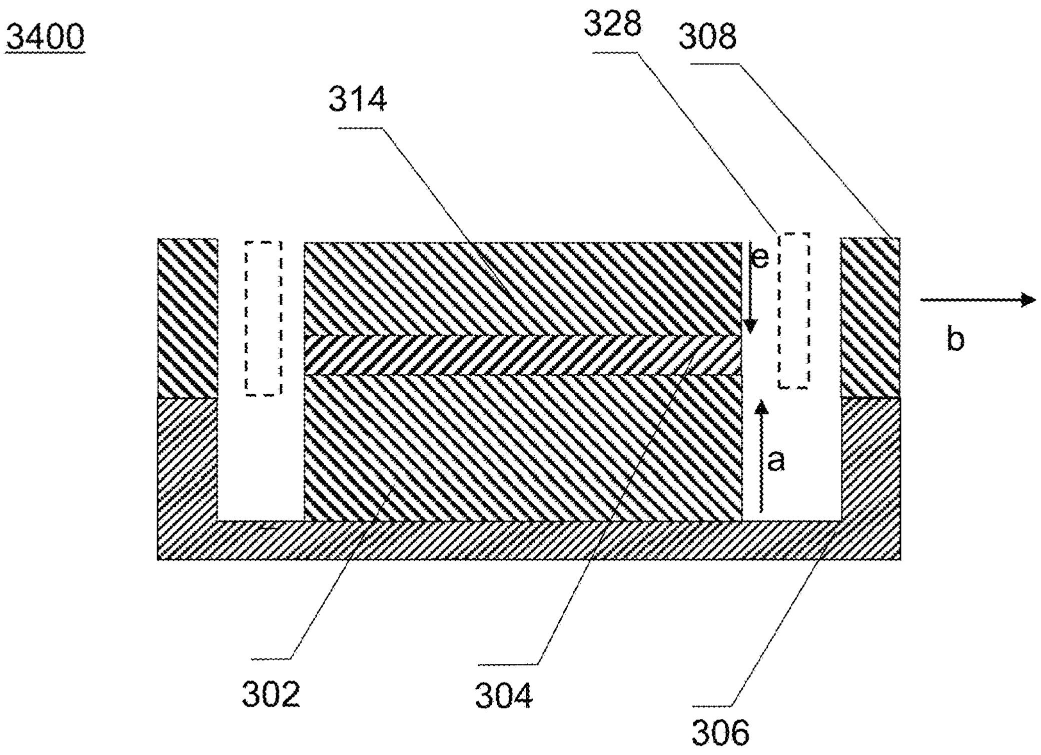
FIG. 3D is a schematic diagram illustrating a longitudinal sectional view of a magnetic circuit assembly according to some embodiments of the present disclosure.

FIG. 3D is a schematic diagram illustrating a longitudinal sectional view of a magnetic circuit assembly 3400 according to some embodiments of the present disclosure. As shown in FIG. 3D, different from the magnetic circuit assembly 3100, the magnetic circuit assembly 3400 may further include a fifth magnetic element 314. The fifth magnetic element 314 may include any one of the magnet materials described in the present disclosure. In some embodiments, the fifth magnetic element 314 may be provided as an axisymmetric structure. For example, the fifth magnetic element 314 may be the cylinder, the cuboid, or the hollow ring (e.g., the cross-section is the shape of a runway). In some embodiments, the first magnetic element 302, the first magnetic guide element 304, and/or the fifth magnetic element 314 may be coaxial cylinders with the same or different diameters. The fifth magnetic element 314 may have the same or different thickness as the first magnetic element 302. The fifth magnetic element 314 may be connected with the first magnetic guide element 304.

In some embodiments, an included angle between the magnetization direction of the fifth magnetic element 314 and the magnetization direction of the first magnetic element 302 may be in a range from 90 degrees to 180 degrees. In some embodiments, the included angle between the magnetization direction of the fifth magnetic element 314 and the magnetization direction of the first magnetic element 302 may be in a range from 150 degrees to 180 degrees. In some embodiments, the magnetization direction of the fifth magnetic element 314 may be opposite to the magnetization direction of the first magnetic element 302 (as shown, in the direction of a and in the direction of e).

Compared with the magnetic circuit assembly 3100, the fifth magnetic element 314 may be added to the magnetic circuit assembly 3400. The fifth magnetic element 314 may suppress the magnetic leakage of the first magnetic element 302 in the magnetization direction in the magnetic circuit assembly 3400, so that the magnetic field generated by the first magnetic element 302 may be more compressed into the magnetic gap, thereby increasing the magnetic induction intensity within the magnetic gap.

The above description of the magnetic circuit assembly 3400 may be only a specific example, and should not be considered as the only feasible implementation. Obviously, for those skilled in the art, after understanding the basic principles of magnetic circuit assembly, it is possible to make various modifications and changes in the form and details of the specific means and steps of implementing the magnetic circuit assembly 3400 without departing from this principle, but these modifications and changes are still within the scope described above. For example, the second magnetic guide element 306 may be the ring structure or the sheet structure. As another example, the magnetic circuit assembly 3400 may not include the second magnetic element 308. As another example, the at least one magnetic element may be added to the magnetic circuit assembly 3400. In some embodiments, the lower surface of the further added magnetic element may be connected with the upper surface of the second magnetic element 308. The magnetization direction of the further added magnetic element may be the same as the magnetization direction of the first magnetic element 302. In some embodiments, the upper surface of the further added magnetic element may be connected with the lower surface of the second magnetic element 308. The magnetization direction of the further added magnetic element may be opposite to the magnetization direction of the first magnetic element 302. In some embodiments, the further added magnetic element may be connected with the first magnetic element 302 and the second magnetic guide element 306, and the magnetization direction of the further added magnetic element may be opposite to the magnetization direction of the second magnetic element 308.

Figure 3E:
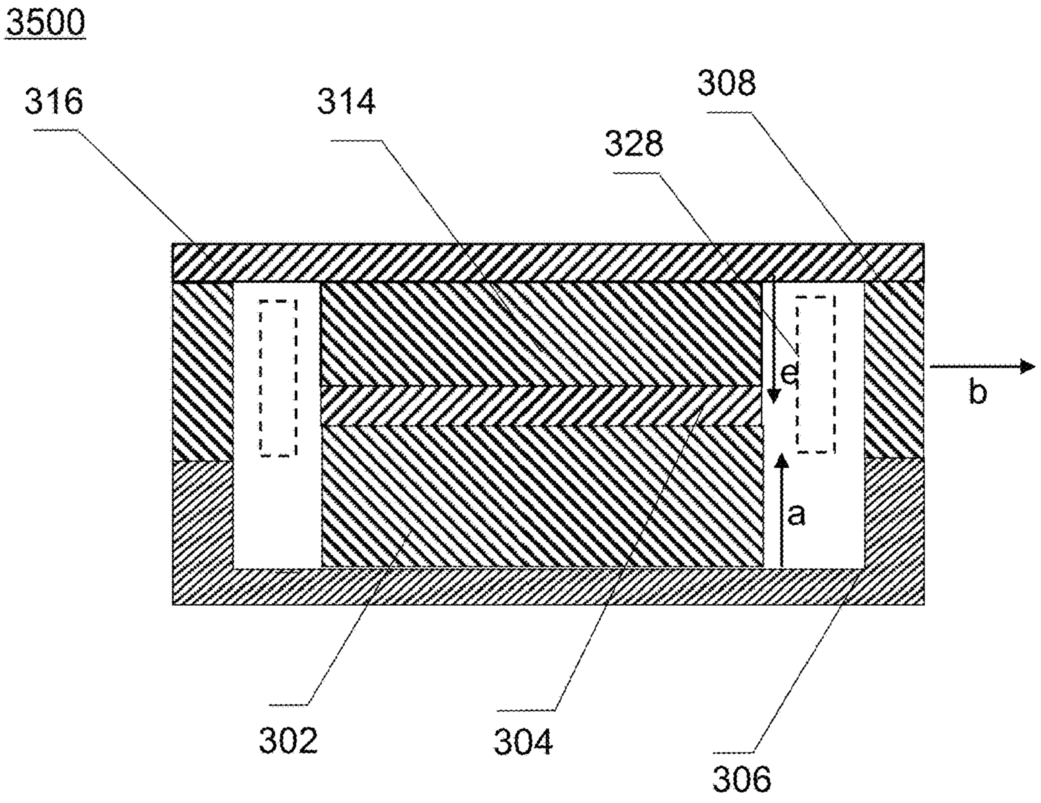
FIG. 3E is a schematic diagram illustrating a longitudinal sectional view of a magnetic circuit assembly according to some embodiments of the present disclosure.

FIG. 3E is a schematic diagram illustrating a longitudinal sectional view of a magnetic circuit assembly 3500 according to some embodiments of the present disclosure. As shown in FIG. 3E, different from the magnetic circuit assembly 3400, the magnetic circuit assembly 3500 may further include a third magnetic guide element 316. In some embodiments, the third magnetic guide element 316 may include any one or more magnetically conductive materials described in the present disclosure. The magnetic conductive materials included in the first magnetic guide element 304, the second magnetic guide element 306, and/or the third magnetic guide element 316 may be the same or different. In some embodiments, the third magnetic guide element 316 may be provided as a symmetrical structure. For example, the third magnetic guide element 316 may be the cylinder. In some embodiments, the first magnetic element 302, the first magnetic guide element 304, the fifth magnetic element 314, and/or the third magnetic guide element 316 may be coaxial cylinders with the same or different diameters. The third magnetic guide element 316 may be connected with the fifth magnetic element 314. In some embodiments, the third magnetic guide element 316 may be connected with the fifth magnetic element 314 and the second magnetic element 308. The third magnetic guide element 316, the second magnetic guide element 306, and the second magnetic element 308 may form a cavity. The cavity may include the first magnetic element 302, the fifth magnetic element 314, and the first magnetic guide element 304.

Compared with the magnetic circuit assembly 3400, the third magnetic guide element 316 may be added to the magnetic circuit assembly 3500 magnetic guide element. The third magnetic guide element 316 may suppress the magnetic leakage of the fifth magnetic element 314 in the magnetization direction in the magnetic circuit assembly 3500, so that the magnetic field generated by the fifth magnetic element 314 may be more compressed into the magnetic gap, thereby increasing the magnetic induction intensity within the magnetic gap.

The above description of the magnetic circuit assembly 3500 may be only a specific example, and should not be considered as the only feasible implementation. Obviously, for those skilled in the art, after understanding the basic principles of magnetic circuit assembly, it is possible to make various modifications and changes in the form and details of the specific means and steps for implementing the magnetic circuit assembly 3500 without departing from this principle, but these modifications and changes are still within the scope described above. For example, the second magnetic guide element 306 may be the ring structure or the sheet structure. As another example, the magnetic circuit assembly 3500 may not include the second magnetic element 308. As another example, the at least one magnetic element may be added to the magnetic circuit assembly 3500. In some embodiments, the lower surface of the further added magnetic element may be connected with the upper surface of the second magnetic element 308. The magnetization direction of the further added magnetic element may be the same as the magnetization direction of the first magnetic element 302. In some embodiments, the upper surface of the further added magnetic element may be connected with the lower surface of the second magnetic element 308. The magnetization direction of the further added magnetic element may be opposite to the magnetization direction of the first magnetic element 302. In some embodiments, the further added magnetic element may be connected with the first magnetic element 302 and the second magnetic guide element 306, and the magnetization direction of the further added magnetic element may be opposite to the magnetization direction of the second magnetic element 308.

Figure 3F:
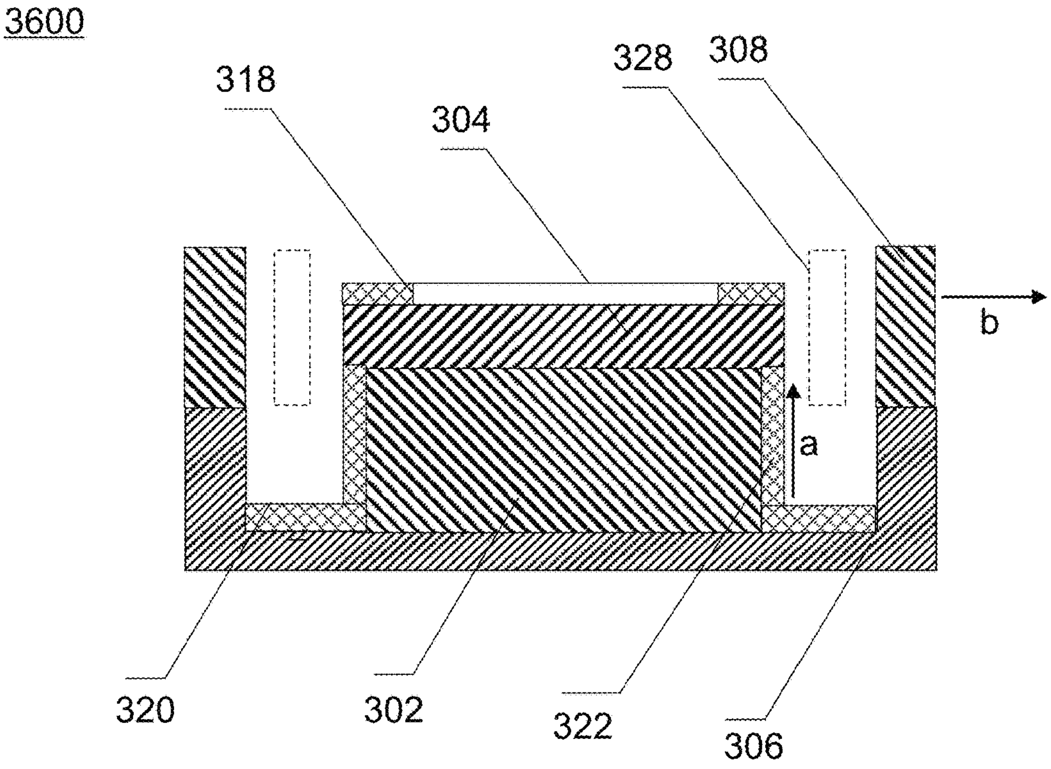
FIG. 3F is a schematic diagram illustrating a longitudinal sectional view of a magnetic circuit assembly according to some embodiments of the present disclosure.

FIG. 3F is a schematic diagram illustrating a longitudinal sectional of a magnetic circuit assembly 3600 according to some embodiments of the present disclosure. As shown in FIG. 3F, different from the magnetic circuit assembly 3100, the magnetic circuit assembly 3600 may further include one or more conductive elements (e.g., a first conductive element 318, a second conductive element 320, and a third conductive element 322).

A conductive element may include a metal material, a metal alloy material, an inorganic non-metal material, or other conductive materials. The metal material may include a gold, a silver, a copper, an aluminum, etc. The metal alloy material may include an iron-based alloy, an aluminum-based alloy material, a copper-based alloy, a zinc-based alloy, etc. The inorganic non-metal material may include a graphite, etc. A conductive element may be in a sheet shape, an annular shape, a mesh shape, or the like. The first conductive element 318 may be located on the upper surface of the first magnetic guide element 304. The second conductive element 320 may be physically connected with the first magnetic element 302 and the second magnetic guide element 306. The third conductive element 322 may be physically connected with the side wall of the first magnetic element 302. In some embodiments, the first magnetic guide element 304 may protrude from the first magnetic element 302 to form a first concave portion, and the third conductive element 322 may be provided on the first concave portion. In some embodiments, the first conductive element 318, the second conductive element 320, and the third conductive element 322 may include the same or different conductive materials. The first conductive element 318, the second conductive element 320 and the third conductive element 322 may be respectively connected with the first magnetic guide element 304, the second magnetic guide element 306 and/or the first magnetic element 302 through one or more connection means as described elsewhere in the present disclosure.

The magnetic gap may be configured between the first magnetic element 302, the first magnetic guide element 304, and the inner ring of the second magnetic element 308. The voice coil 328 may be located within the magnetic gap. The first magnetic element 302, the first magnetic guide element 304, the second magnetic guide element 306, and the second magnetic element 308 may form the magnetic circuit. In some embodiments, the one or more conductive elements may reduce the inductive reactance of the voice coil 328. For example, if a first alternating current flows into the voice coil 328, a first alternating induction magnetic field may be generated near the voice coil 328. Under the action of the magnetic field in the magnetic circuit, the first alternating induction magnetic field may cause the voice coil 328 to generate inductive reactance and hinder the movement of the voice coil 328. When the one or more conductive elements (e.g., the first conductive element 318, the second conductive element 320, and the third conductive element 322) are configured near the voice coil 328, under the action of the first alternating induction magnetic field, the conductive elements may induce a second alternating current. A third alternating current in the conductive elements may generate a second alternating induction magnetic field near the conductive elements. The direction of the second alternating magnetic field may be opposite to the direction of the first alternating induction magnetic field, and the first alternating induction magnetic field may be weakened, thereby reducing the inductive reactance of the voice coil 328, increasing the current in the voice coil, and improving the sensitivity of the bone conduction speaker.

The above description of the magnetic circuit assembly 3600 may be only a specific example, and should not be considered as the only feasible implementation. Obviously, for those skilled in the art, after understanding the basic principles of magnetic circuit assembly, it is possible to make various modifications and changes in form and detail to the specific manner and steps of implementing magnetic circuit assembly 3600 without departing from this principle, but these modifications and changes are still within the scope described above. For example, the second magnetic guide element 306 may be the ring structure or the sheet structure. As another example, the magnetic circuit assembly 3600 may not include the second magnetic element 308. As another example, at least one magnetic element may be added to the magnetic circuit assembly 3500. In some embodiments, the lower surface of the added magnetic element may be physically connected with the upper surface of the second magnetic element 308. The magnetization direction of the added magnetic element may be the same as the magnetization direction of the first magnetic element 302.

Figure 3G:
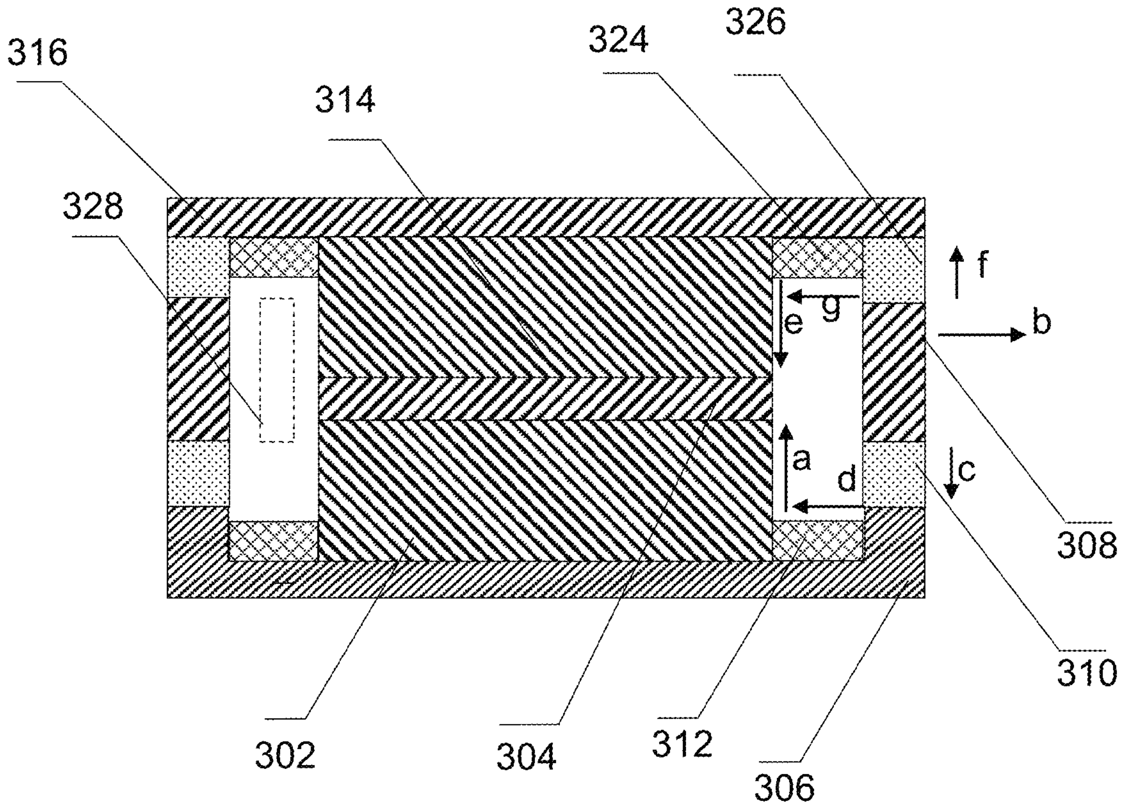
FIG. 3G is a schematic diagram illustrating a longitudinal sectional view of a magnetic circuit assembly according to some embodiments of the present disclosure.

FIG. 3G is a schematic diagram illustrating a longitudinal sectional view of a magnetic circuit assembly 3900 according to some embodiments of the present disclosure. As shown in FIG. 3G, different from the magnetic circuit assembly 3500, the magnetic circuit assembly 3900 may further include the third magnetic element 310, the fourth magnetic element 312, the fifth magnetic element 314, the third magnetic guide element 316, a sixth magnetic element 324, and a seventh magnetic element 326. The third magnetic element 310, the fourth magnetic element 312, the fifth magnetic element 314, the third magnetic guide element 316 and/or the sixth magnetic element 324, and the seventh magnetic element 326 may be provided as coaxial circular cylinders.

In some embodiments, the upper surface of the second magnetic element 308 may be physically connected with the seventh magnetic element 326, and the lower surface of the second magnetic element 308 may be physically connected with the third magnetic element 310. The third magnetic element 310 may be physically connected with the second magnetic guide element 306. The upper surface of the seventh magnetic element 326 may be physically connected with the third magnetic guide element 316. The fourth magnetic element 312 may be physically connected with the second magnetic guide element 306 and the first magnetic element 302. The sixth magnetic element 324 may be physically connected with the fifth magnetic element 314, the third magnetic guide element 316, and the seventh magnetic element 326. In some embodiments, the first magnetic element 302, the first magnetic guide element 304, the second magnetic guide element 306, the second magnetic element 308, the third magnetic element 310, the fourth magnetic element 312, the fifth magnetic element 314, the third magnetic guide element 316, the sixth magnetic element 324, and the seventh magnetic element 326 may form the magnetic circuit and the magnetic gap.

In some embodiments, the magnetization direction of the second magnetic element 308 may be found in FIG. 3A of the present disclosure. The magnetization direction of the third magnetic element 310 may be found in FIG. 3B of the present disclosure. The magnetization direction of the fourth magnetic element 312 may be found in FIG. 3C of the present disclosure.

In some embodiments, an included angle between the magnetization direction of the first magnetic element 302 and the magnetization direction of the sixth magnetic element 324 may be in a range from 0 to 180 degrees. In some embodiments, the included angle between the magnetization direction of the first magnetic element 302 and the magnetization direction of the sixth magnetic element 324 may be in a range from 45 degrees to 135 degrees. In some embodiments, the included angle between the magnetization direction of the first magnetic element 302 and the magnetization direction of the sixth magnetic element 324 may not be higher than 90 degrees. In some embodiments, the magnetization direction of the first magnetic element 302 may be perpendicular to the lower surface or the upper surface of the first magnetic element 302 vertically upward (the direction denoted by arrow a in the FIG. 3C). The magnetization direction of the sixth magnetic element 324 may be directed from the outer ring of the sixth magnetic element 324 to the inner ring (the direction denoted by arrow g in the FIG. 3C). On the right side of the first magnetic element 302, the magnetization direction of the sixth magnetic element 324 may be same as the magnetization direction of the first magnetic element 302 deflected 270 degrees in a clockwise direction. In some embodiments, in the same vertical direction, the magnetization direction of the sixth magnetic element 324 may be the same as the magnetization direction of the fourth magnetic element 312.

In some embodiments, at some positions of the sixth magnetic element 324, the included angle between the direction of the magnetic field generated by the magnetic circuit assembly 3900 and the magnetization direction of the sixth magnetic element 324 may not be higher than 90 degrees. In some embodiments, at the position of the sixth magnetic element 324, the included angle between the direction of the magnetic field generated by the first magnetic element 302 and the magnetization direction of the sixth magnetic element 324 may be an included angle that is less than or equal to 90 degrees, such as 0 degrees, 10 degrees, 20 degrees, etc.

In some embodiments, an included angle between the magnetization direction of the first magnetic element 302 and the magnetization direction of the seventh magnetic element 326 may be in a range from 0 to 180 degrees. In some embodiments, the included angle between the magnetization direction of the first magnetic element 302 and the magnetization direction of the seventh magnetic element 326 may be in a range from 45 degrees to 135 degrees. In some embodiments, the included angle between the magnetization direction of the first magnetic element 302 and the magnetization direction of the seventh magnetic element 326 may not be higher than 90 degrees. In some embodiments, the magnetization direction of the first magnetic element 302 may be perpendicular to the lower surface or the upper surface of the first magnetic element 302 vertically upward (the direction of denoted by arrow a in the FIG. 3G). The magnetization direction of the seventh magnetic element 326 may be directed from the lower surface of the seventh magnetic element 326 to the upper surface (the direction denoted by arrow f in the FIG. 3G). On the right side of the first magnetic element 302, the magnetization direction of the seventh magnetic element 326 may be same as the magnetization direction of the first magnetic element 302 deflected 360 degrees in a clockwise direction. In some embodiments, the magnetization direction of the seventh magnetic element 326 may be opposite to the magnetization direction of the third magnetic element 310.

In some embodiments, at some seventh magnetic element 326, the included angle between the direction of the magnetic field generated by the magnetic circuit assembly 3900 and the magnetization direction of the seventh magnetic element 326 may not be higher than 90 degrees. In some embodiments, at the position of the seventh magnetic element 326, the included angle between the direction of the magnetic field generated by the first magnetic element 302 and the magnetization direction of the seventh magnetic element 326 may be an included angle that is less than or equal to 90 degrees, such as 0 degrees, 10 degrees, 20 degrees, etc.

In the magnetic circuit assembly 3900, the third magnetic guide element 316 may close the magnetic circuit generated by the magnetic circuit assembly 3900, so that more magnetic induction lines are concentrated within the magnetic gap, thereby achieving the effects of suppressing magnetic leakage, increasing magnetic induction intensity within the magnetic gap, and improving the sensitivity of the bone conduction speaker. The above description of the magnetic circuit assembly 3900 may be only a specific example, and should not be considered as the only feasible implementation. Obviously, for those skilled in the art, after understanding the basic principles of magnetic circuit assembly, it is possible to make various modifications and changes in the form and details of the specific means and steps of implementing the magnetic circuit assembly 3900 without departing from this principle, but these modifications and changes are still within the scope described above. For example, the second magnetic guide element 306 may be the ring structure or the sheet structure. As another example, the magnetic circuit assembly 3900 may not include the second magnetic element 308. As another example, the magnetic circuit assembly 3900 may further include at least one conductive element. The conductive element may be physically connected with the first magnetic element 302, the fifth magnetic element 314, the first magnetic guide element 304, the second magnetic guide element 306, and/or the third magnetic guide element 316. In some embodiments, at least one conductive element may be added to the magnetic circuit assembly 3900. The further added conductive element may be physically connected with at least one of the second magnetic element 308, the third magnetic element 310, the fourth magnetic element 312, the sixth magnetic element 324, and the seventh magnetic element 326.

Figure 4A:
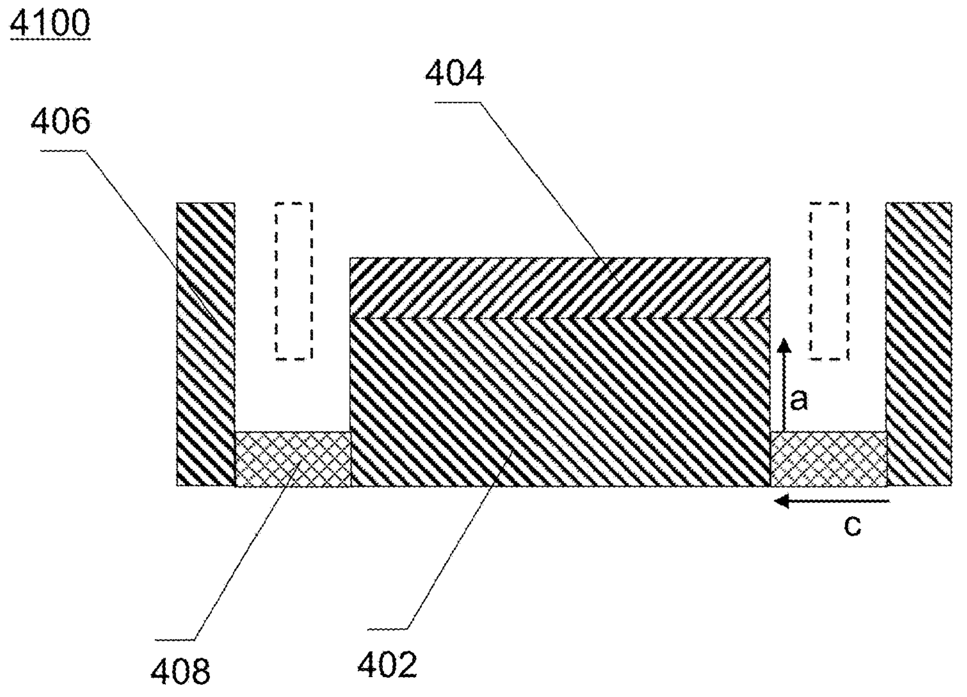
FIG. 4A is a schematic diagram illustrating a longitudinal sectional view of a magnetic circuit assembly according to some embodiments of the present disclosure.

FIG. 4A is a schematic diagram illustrating a longitudinal sectional view of a magnetic circuit assembly 4100 according to some embodiments of the present disclosure. As shown in FIG. 4A, the magnetic circuit assembly 4100 may include a first magnetic element 402, a first magnetic guide element 404, a first magnetic field changing element 406, and a second magnetic element 408. In some embodiments, the first magnetic element 402 and/or the second magnetic element 408 may include any one or more magnets described in the present disclosure. The first magnetic element 402 may include the first magnet, and the second magnetic element 408 may include the second magnet. The first magnet and the second magnet may be the same or different. The first magnetic guide element 404 may include any one or more magnetic conductive materials described in the present disclosure, such as the low carbon steel, the silicon steel sheet, the silicon steel sheet, the ferrite, or the like. In some embodiments, the first magnetic element 402 and/or the first magnetic guide element 404 may be configured as the axisymmetric structure. The first magnetic element 402 and/or the first magnetic guide element 404 may be the cylinder. In some embodiments, the first magnetic element 402 and the first magnetic guide element 404 may be coaxial cylinders with the same or different diameters. In some embodiments, the first magnetic field changing element 406 may be any one of the magnetic element or the magnetic guide element. The first magnetic field changing element 406 and/or the second magnetic element 408 may be provided as the annular shape or the sheet shape. For descriptions of the first magnetic field changing element 406 and the second magnetic element 408 may refer to descriptions elsewhere in the specification (e.g., FIG. 5A and FIG. 5B and related descriptions). In some embodiments, the second magnetic element 408 and the annular cylinder that is coaxial with the first magnetic element 402, the first magnetic guide element 404, and/or the first full magnetic field changing element 406, may contain the inner and/or outer rings with the same or different diameters. The processing means of the first magnetic guide element 404 and/or the first magnetic field changing element 406 may include any one or more processing means as described elsewhere in the present disclosure.

The upper surface of the first magnetic element 402 may be physically connected with the lower surface of the first magnetic guide element 404, and the second magnetic element 408 may be physically connected with the first magnetic element 402 and the first magnetic field changing element 406. The connection means between the first magnetic element 402, the first magnetic guide element 404, the first magnetic field changing element 406, and/or the second magnetic element 408 may be based on any one or more connection means as described elsewhere in the present disclosure. In some embodiments, the first magnetic element 402, the first magnetic guide element 404, the first magnetic field changing element 406, and/or the second magnetic element 408 may form the magnetic circuit and the magnetic gap.

In some embodiments, the magnetic circuit assembly 4100 may generate the first magnetic field, and the first magnetic element 402 may generate the second magnetic field. The magnetic field strength of the first magnetic field within the magnetic gap may exceed the magnetic field strength of the second magnetic field within the magnetic gap. In some embodiments, the second magnetic element 408 may generate a third magnetic field, and the third magnetic field may increase the magnetic field strength of the second magnetic field within the magnetic gap.

In some embodiments, the included angle between the magnetization direction of the first magnetic element 402 and the magnetization direction of the second magnetic element 408 may be in a range from 0 to 180 degrees. In some embodiments, the included angle between the magnetization direction of the first magnetic element 402 and the magnetization direction of the second magnetic element 408 may be in a range from 45 degrees to 135 degrees. In some embodiments, the included angle between the magnetization direction of the first magnetic element 402 and the magnetization direction of the second magnetic element 408 may not be higher than 90 degrees.

In some embodiments, at some locations of the second magnetic element 408, the included angle between the direction of the first magnetic field and the magnetization direction of the second magnetic element 408 may not be higher than 90 degrees. In some embodiments, at the position of the second magnetic element 408, the included angle between the direction of the magnetic field generated by the first magnetic element 402 and the magnetization direction of the second magnetic element 408 may be an included angle that is less than or equal to 90 degrees, such as 0 degrees, 10 degrees, 20 degrees, etc. As another example, the magnetization direction of the first magnetic element 402 may be perpendicular to the lower surface or the upper surface of the first magnetic element 402 vertically upward (the direction denoted by arrow a in the FIG. 4A). The magnetization direction of the second magnetic element 408 may be directed from the outer ring of the second magnetic element 408 to the inner ring (the direction denoted by arrow c in the FIG. 4A). On the right side of the first magnetic element 402, the magnetization direction of the second magnetic element 408 may be same as the magnetization direction of the first magnetic element 402 deflected 270 degrees in a clockwise direction.

Compared with the magnetic circuit assembly of a single magnetic element, the first magnetic field changing element 406 in the magnetic circuit assembly 4100 may increase the total magnetic flux within the magnetic gap, thereby increasing the magnetic induction intensity within the magnetic gap. In addition, under the action of the first magnetic field changing element 406, the magnetic induction lines that are originally divergent may converge to the position of the magnetic gap, further increasing the magnetic induction intensity within the magnetic gap.

The above description of the magnetic circuit assembly 4100 may be only a specific example, and should not be regarded as the only feasible implementation. Obviously, for those skilled in the art, after understanding the basic principles of bone magnetic circuit assembly, it is possible to make various modifications and changes in form and detail to the specific manner and steps of implementing magnetic circuit assembly 4100 without departing from this principle, but these modifications and changes are still within the scope described above. For example, the magnetic circuit assembly 4100 may further include a magnetic shield, the magnetic shield may be configured to encompass the first magnetic element 402, the first magnetic guide element 404, the first magnetic field change element 406, and the second magnetic element 408.

Figure 4B:
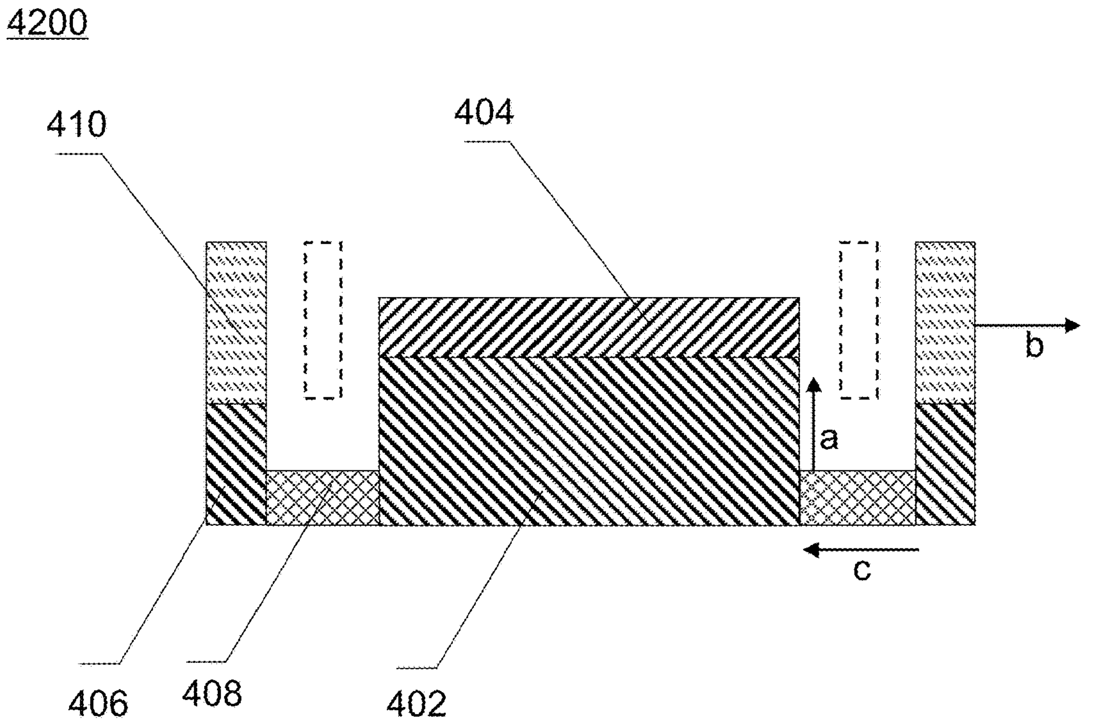
FIG. 4B is a schematic diagram illustrating a longitudinal sectional view of a magnetic circuit assembly according to some embodiments of the present disclosure.

FIG. 4B is a schematic diagram illustrating a longitudinal sectional view of a magnetic circuit assembly 4200 according to some embodiments of the present disclosure. As shown in FIG. 4B, different from the magnetic circuit assembly 4100, the magnetic circuit assembly 4200 may further include a third magnetic element 410.

The lower surface of the third magnetic element 410 may be physically connected with the first magnetic field changing element 406. The connection means between the third magnetic element 410 and the first magnetic field changing element 406 may be based on any one or more connection means as described elsewhere in the present disclosure. In some embodiments, the magnetic gap may be configured between the first magnetic element 402, the first magnetic guide element 404, the first magnetic field changing element 406, the second magnetic element 408, and/or the third magnetic element 410. In some embodiments, the magnetic circuit assembly 4200 may generate the first magnetic field, and the first magnetic element 402 may generate the second magnetic field. The magnetic field strength of the first magnetic field within the magnetic gap may exceed the magnetic field strength of the second magnetic field within the magnetic gap. In some embodiments, the third magnetic element 410 may generate the third magnetic field, and the third magnetic field may increase the magnetic field strength of the second magnetic field within the magnetic gap.

In some embodiments, the included angle between the magnetization direction of the first magnetic element 402 and the magnetization direction of the third magnetic element 410 may be in a range from 0 to 180 degrees. In some embodiments, the included angle between the magnetization direction of the first magnetic element 402 and the magnetization direction of the third magnetic element 410 may be in a range from 45 degrees to 135 degrees. In some embodiments, the included angle between the magnetization direction of the first magnetic element 402 and the magnetization direction of the third magnetic element 410 may be equal to or greater than 90 degrees. In some embodiments, the magnetization direction of the first magnetic element 402 may be perpendicular to the lower surface or the upper surface of the first magnetic element 402 vertically upward (the direction denoted by arrow a in the FIG. 4B). The magnetization direction of the third magnetic element 410 may be directed from the inner ring of the third magnetic element 410 to the outer ring (the direction denoted by arrow b in the FIG. 4B). On the right side of the first magnetic element 402, the magnetization direction of the third magnetic element 410 may be same as the magnetization direction of the first magnetic element 402 deflected 90 degrees clockwise.

In some embodiments, at the position of the third magnetic element 410, the included angle between the direction of the first magnetic field and the magnetization direction of the second magnetic element 408 may not be higher than 90 degrees. In some embodiments, at the position of the third magnetic element 410, the included angle between the direction of the magnetic field generated by the first magnetic element 402 and the magnetization direction of the third magnetic element 410 may be an included angle that is less than or equal to 90 degrees, such as 0 degrees, 10 degrees, 20 degrees, etc.

Compared with the magnetic circuit assembly 4100, the third magnetic element 410 may be added to the magnetic circuit assembly 4200. The third magnetic element 410 may further increase the total magnetic flux within the magnetic gap in the magnetic circuit assembly 4200, thereby increasing the magnetic induction intensity within the magnetic gap. In addition, under the action of the third magnetic element 410, the magnetic induction line will further converge to the position of the magnetic gap, thereby increasing the magnetic induction intensity within the magnetic gap.

The above description of the magnetic circuit assembly 4200 may be only a specific example, and should not be considered as the only feasible implementation. Obviously, for those skilled in the art, after understanding the basic principles of bone magnetic circuit assembly, it is possible to make various modifications and changes in the form and details of the specific means and steps for implementing the magnetic circuit assembly 4200 without departing from this principle, but these modifications and changes are still within the scope described above. For example, magnetic circuit assembly 4200 may further include the magnetic shield. The magnetic shield may be configured to encompass the first magnetic element 402, the first magnetic guide element 404, the first magnetic field changing element 406, the second magnetic element 408, and the third magnetic element 410.

Figure 4C:
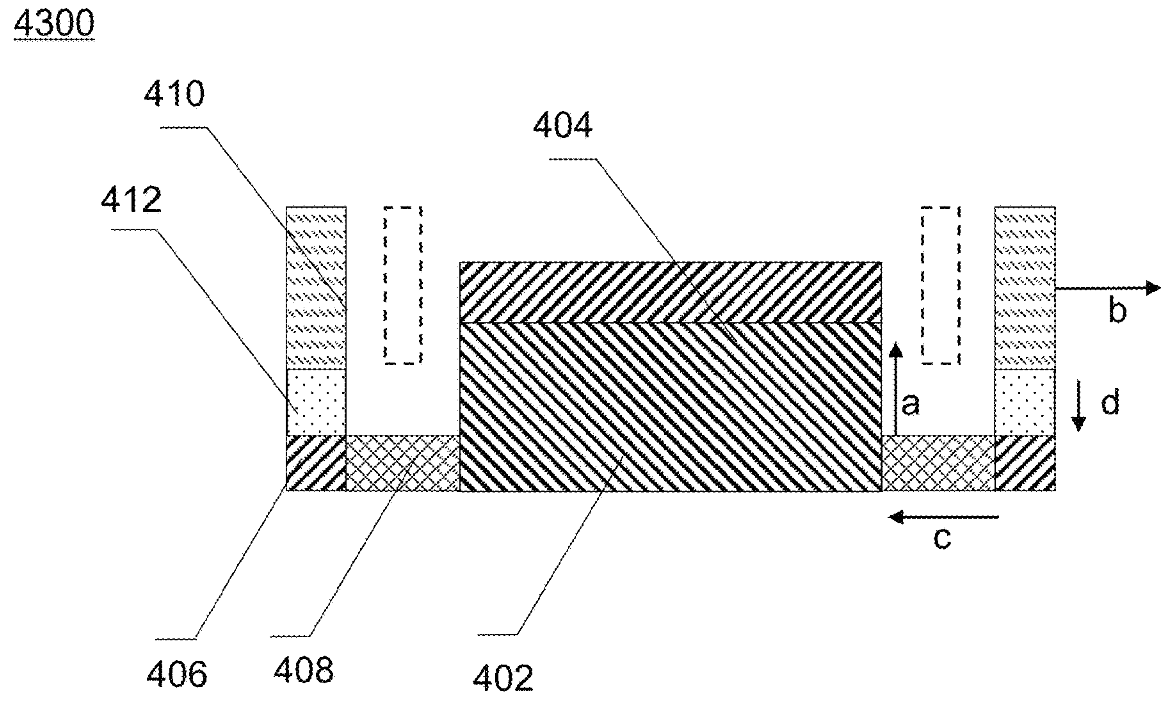
FIG. 4C is a schematic diagram illustrating a longitudinal sectional view of a magnetic circuit assembly according to some embodiments of the present disclosure.

FIG. 4C is a schematic structural diagram illustrating a magnetic circuit assembly 4300 according to some embodiments of the present disclosure. As shown in FIG. 4C, different from the magnetic circuit assembly 4200, the magnetic circuit assembly 4300 may further include a fourth magnetic element 412.

The lower surface of the fourth magnetic element 412 may be physically connected with the upper surface of the first magnetic field changing element 406, and the upper surface of the fourth magnetic element 412 may be physically connected with the lower surface of the second magnetic element 408. The connection manner between the fourth magnetic element 412 and the first magnetic field changing element 406 and the second magnetic element 408 may be based on any one or more connection means as described elsewhere in the present disclosure. In some embodiments, the magnetic gap may be configured between the first magnetic element 402, the first magnetic guide element 404, the first magnetic field changing element 406, the second magnetic element 408, the third magnetic element 410, and/or the fourth magnetic element 412. The magnetization direction of the second magnetic element 408 and the third magnetic element 410 may be found in FIG. 4A and/or FIG. 4B of the present disclosure, respectively.

In some embodiments, the magnetic circuit assembly 4300 may generate the first magnetic field, and the first magnetic element 402 may generate the second magnetic field. The magnetic field strength of the first magnetic field within the magnetic gap may exceed the magnetic field strength of the second magnetic field within the magnetic gap. In some embodiments, the fourth magnetic element 412 may generate the third magnetic field, and the third magnetic field may increase the magnetic field strength of the second magnetic field within the magnetic gap.

In some embodiments, the included angle between the magnetization direction of the first magnetic element 402 and the magnetization direction of the fourth magnetic element 412 may be in a range from 0 to 180 degrees. In some embodiments, the included angle between the magnetization direction of the first magnetic element 402 and the magnetization direction of the fourth magnetic element 412 may be in a range from 45 degrees to 135 degrees. In some embodiments, the included angle between the magnetization direction of the first magnetic element 402 and the magnetization direction of the fourth magnetic element 412 may be equal to or greater than 90 degrees. In some embodiments, the magnetization direction of the first magnetic element 402 may be perpendicular to the lower surface or the upper surface of the first magnetic element 402 vertically upward (the direction denoted by arrow a in the FIG. 4C). The magnetization direction of the fourth magnetic element 412 may be directed from the upper surface of the fourth magnetic element 412 to the lower surface (the direction denoted by arrow d in the FIG. 4C). On the right side of the first magnetic element 402, the magnetization direction of the fourth magnetic element 412 may be same as the magnetization direction of the first magnetic element 402 deflected 180 degrees in a clockwise direction.

In some embodiments, at the position of the fourth magnetic element 412, the included angle between the direction of the first magnetic field and the magnetization direction of the fourth magnetic element 412 may not be higher than 90 degrees. In some embodiments, at the position of the fourth magnetic element 412, the included angle between the direction of the magnetic field generated by the first magnetic element 402 and the magnetization direction of the fourth magnetic element 412 may be an included angle that is less than or equal to 90 degrees, such as 0 degrees, 10 degrees, 20 degrees, etc.

Compared with the magnetic circuit assembly 4200, the fourth magnetic element 412 may be added to the magnetic circuit assembly 4300. The fourth magnetic element 412 may further increase the total magnetic flux within the magnetic gap in the magnetic circuit assembly 4300, thereby increasing the magnetic induction intensity within the magnetic gap. In addition, under the action of the fourth magnetic element 412, the magnetic induction line will further converge to the position of the magnetic gap, thereby increasing the magnetic induction intensity within the magnetic gap.

The above description of the magnetic circuit assembly 4300 may be only a specific example, and should not be considered as the only feasible implementation. Obviously, for a person skilled in the art, after understanding the basic principle of the bone magnetic circuit assembly, it is possible to make various modifications and changes in the form and details of the specific means and steps of implementing the magnetic circuit assembly 4300 without departing from this principle, but these modifications and changes are still within the scope described above. For example, the magnetic circuit assembly 4200 may further include one or more conductive elements. The one or more conductive elements may be physically connected with at least one of the first magnetic element 402, the first magnetic guide element 404, the second magnetic element 408, the third magnetic element 410, and the fourth magnetic element 412.

Figure 4D:
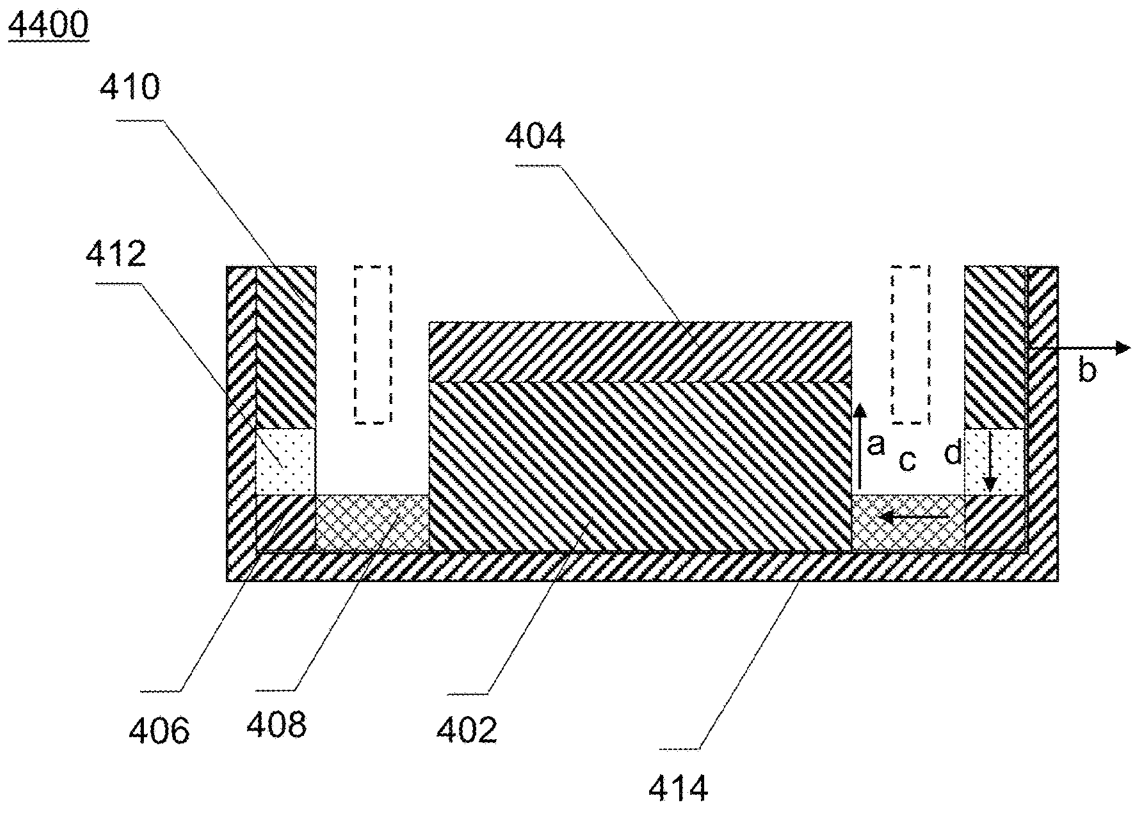
FIG. 4D is a schematic diagram illustrating a longitudinal sectional view of a magnetic circuit assembly according to some embodiments of the present disclosure.

FIG. 4D is a schematic diagram illustrating a longitudinal sectional view of a magnetic circuit assembly 4400 according to some embodiments of the present disclosure. As shown in FIG. 4D, different from the magnetic circuit assembly 4300, the magnetic circuit assembly 4400 may further include a magnetic shield 414.

The magnetic shield 414 may include any one or more magnetically permeable materials described in the present disclosure, such as the low carbon steel, the silicon steel sheet, the silicon steel sheet, the ferrite, or the like. The magnetic shield 414 may be physically connected with the first magnetic field changing element 406, the second magnetic element 408, the third magnetic element 410, and the fourth magnetic element 412 through any one or more connection means as described elsewhere in the present disclosure. The processing means of the magnetic shield 414 may include any one of the processing means as described elsewhere in the present disclosure, for example, the casting, the plastic processing, the cutting processing, the powder metallurgy, or the like, or any combination thereof. In some embodiments, the magnetic shield 414 may include the baseplate and the side wall, and the side wall may be the ring structure. In some embodiments, the baseplate and the side wall may be integrally formed. In some embodiments, the baseplate may be physically connected with the side wall by any one or more connection means as described elsewhere in the present disclosure.

Compared with the magnetic circuit assembly 4300, the magnetic shield 414 may be added to the magnetic circuit assembly 4400. The magnetic shield 414 may suppress the magnetic leakage of the magnetic circuit assembly 4300, effectively reduce the length of the magnetic circuit and the magnetic resistance, so that more magnetic lines may pass through the magnetic gap and increase the magnetic induction intensity within the magnetic gap.

The above description of the magnetic circuit assembly 4400 may be only a specific example, and should not be considered as the only feasible implementation. Obviously, for a person skilled in the art, after understanding the basic principle of bone magnetic circuit assembly, it is possible to make various modifications and changes in the form and details of the specific means and steps of implementing the magnetic circuit assembly 4400 without departing from this principle, but these modifications and changes are still within the scope described above. For example, magnetic circuit assembly 4400 may further include one or more conductive elements. The one or more conductive elements may be physically connected with at least one of the first magnetic element 402, the first magnetic guide element 404, the second magnetic element 408, the third magnetic element 410, and the fourth magnetic element 412. As another example, the magnetic circuit assembly 4200 may further include the fifth magnetic element. The lower surface of the fifth magnetic element may be physically connected with the upper surface of the first magnetic guide element 404, and the magnetization direction of the fifth magnetic element may be opposite to the magnetization direction of the first magnetic element 402.

Figure 4E:
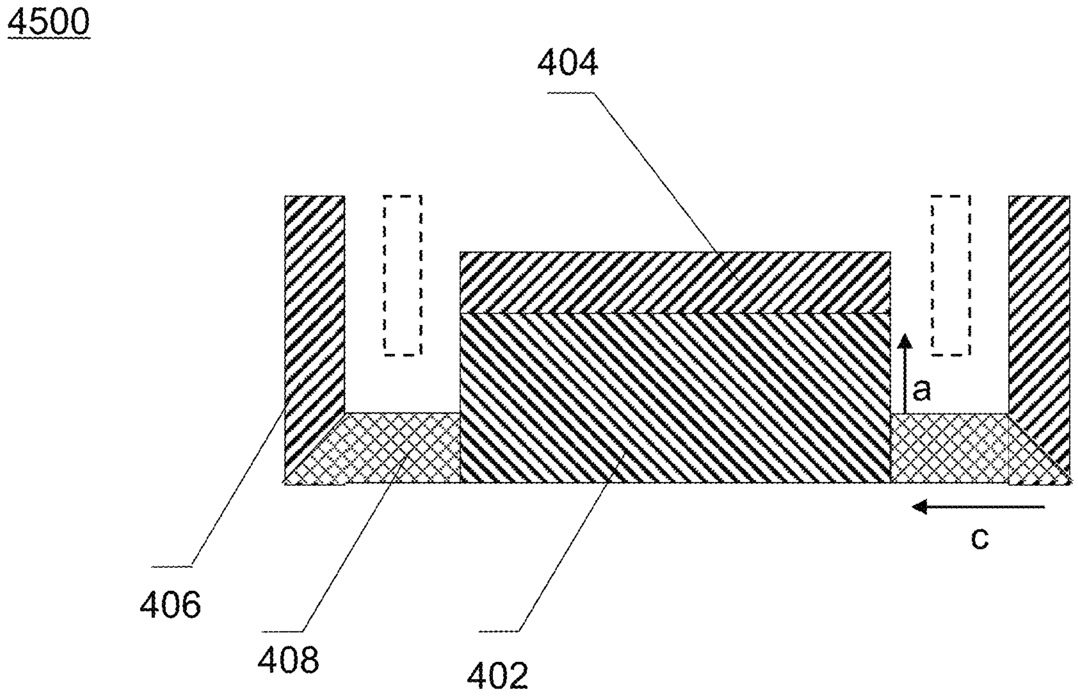
FIG. 4E is a schematic diagram illustrating a longitudinal sectional view of a magnetic circuit assembly according to some embodiments of the present disclosure.

FIG. 4E is a schematic diagram illustrating a longitudinal sectional view of a magnetic circuit assembly 4500 according to some embodiments of the present disclosure. As shown in FIG. 4E, different from the magnetic circuit assembly 4200, the connection surface between the first magnetic field changing element 406 and the second magnetic element 408 of the magnetic circuit assembly 4500 may be a cross section in a wedge shape.

Compared with the magnetic circuit assembly 4100, the connection surface of the first magnetic field changing element 406 and the second magnetic element 408 of the magnetic circuit assembly 4500 may be a cross section in a wedge shape, so that the magnetic induction line can smoothly turn. At the same time, the cross section in a wedge shape may facilitate the assembly of the first magnetic field change element 406 and the second magnetic element 408 and may reduce the count of assembly and reduce the weight of the bone conduction speaker.

The above description of the magnetic circuit assembly 4500 may be only a specific example, and should not be regarded as the only feasible implementation solution. Obviously, for a person skilled in the art, after understanding the basic principle of the bone magnetic circuit assembly, it is possible to make various modifications and changes in the form and details of the specific means and steps of implementing the magnetic circuit assembly 4500 without departing from this principle, but these modifications and changes are still within the scope described above. For example, the magnetic circuit assembly 4500 may further include one or more conductive elements. The conductive element may be physically connected with at least one of the first magnetic element 402, the first magnetic guide element 404, the second magnetic element 408, and the third magnetic element 410. As another example, the magnetic circuit assembly 4500 may further include the fifth magnetic element. The lower surface of the fifth magnetic element may be physically connected with the upper surface of the first magnetic guide element 404, and the magnetization direction of the fifth magnetic element may be opposite to the magnetization direction of the first magnetic element 402. In some embodiments, the magnetic circuit assembly 4500 may further include the magnetic shield. The magnetic shield may be configured to encompass the first magnetic element 402, the first magnetic guide element 404, the first magnetic field changing element 406, the second magnetic element 408, and the third magnetic element 410.

Figure 4F:
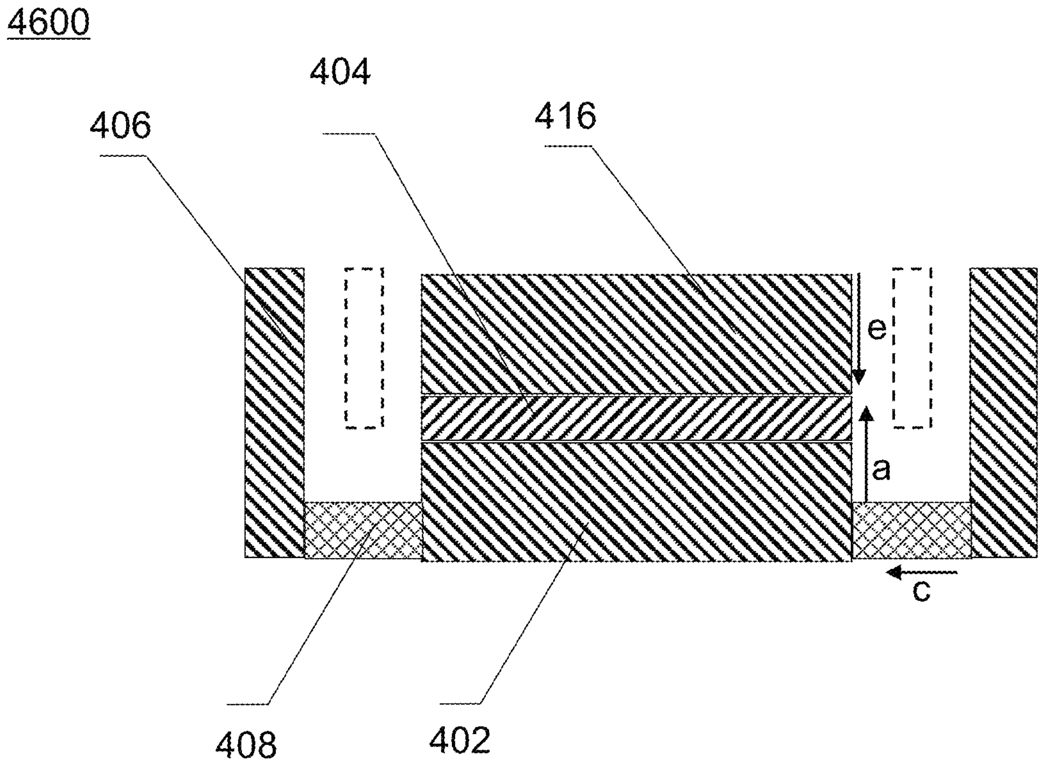
FIG. 4F is a schematic diagram illustrating a longitudinal sectional view of a magnetic circuit assembly according to some embodiments of the present disclosure.

FIG. 4F is a schematic diagram illustrating a longitudinal sectional view of a magnetic circuit assembly 4600 according to some embodiments of the present disclosure. As shown in FIG. 4F, different from the magnetic circuit assembly 4100, the magnetic circuit assembly 4600 may further include a fifth magnetic element 416. In some embodiments, the fifth magnetic element 416 may include one or more magnets. The magnet may include any one or more magnet materials described in the present disclosure. In some embodiments, the fifth magnetic element 416 may include the first magnet, and the first magnetic element 402 may include the second magnet. The first magnet and the second magnet may include the same or different magnetic material. In some embodiments, the fifth magnetic element 416, the first magnetic element 402, and the first magnetic guide element 404 may be provided as the axisymmetric structure. For example, the fifth magnetic element 416, the first magnetic element 402, and the first magnetic guide element 404 may be cylinders. In some embodiments, the fifth magnetic element 416, the first magnetic element 402, and the first magnetic guide element 404 may be coaxial cylinders with the same or different diameters. For example, the diameter of the first magnetic guide element 404 may be larger than the first magnetic element 402 and/or the fifth magnetic element 416. The side wall of the first magnetic element 402 and/or the fifth magnetic element 416 may form the first concave portion and/or the second concave portion. In some embodiments, the ratio of the thickness of the second magnetic element 416 to the sum of the thickness of the first magnetic element 402, the thickness of the second magnetic element 416, and the thickness of the first magnetic guide element 404 may range from 0.4 to 0.6. The ratio of the first magnetic guide element 404 to the sum of the thickness of the first magnetic element 402, the thickness of the second magnetic element 416, and a thickness of the first magnetic guide element 404 may range from 0.5 to 1.5.

In some embodiments, the included angle between the magnetization direction of the fifth magnetic element 416 and the magnetization direction of the first magnetic element 402 may be in a range from 150 to 180 degrees. In some embodiments, the included angle between the magnetization direction of the fifth magnetic element 416 and the magnetization direction of the first magnetic element 402 may be in a range from 90 degrees to 180 degrees. For example, the magnetization direction of the fifth magnetic element 416 may be opposite to the magnetization direction of the first magnetic element 402 (as shown, in the direction of a and in the direction of e).

Compared with the magnetic circuit assembly 4100, the fifth magnetic element 416 may be added to the magnetic circuit assembly 4600. The fifth magnetic element 416 may suppress the magnetic leakage of the first magnetic element 402 in the magnetization direction in the magnetic circuit assembly 4600, so that the magnetic field generated by the first magnetic element 402 may be more compressed into the magnetic gap, thereby increasing the magnetic induction intensity within the magnetic gap.

The above description of the magnetic circuit assembly 4600 may be only a specific example, and should not be considered as the only feasible implementation. Obviously, for those skilled in the art, after understanding the basic principles of bone magnetic circuit assembly, it is possible to make various modifications and changes in the form and details of the specific means and steps for implementing the magnetic circuit assembly 4600 without departing from this principle, but these modifications and changes are still within the scope described above. In some embodiments, magnetic circuit assembly 4600 may further include one or more conductive elements. The one or more conductive elements may be physically connected with at least one of the first magnetic element 402, the first magnetic guide element 404, the second magnetic element 408, and the fifth magnetic element 416. For example, the one or more conductive element may be provided in the first concave portion and/or the second concave portion. In some embodiments, the at least one magnetic element may be added to the magnetic circuit assembly 4600, and the further added magnetic element may be physically connected with the first magnetic field changing element 406. In some embodiments, the magnetic circuit assembly 4600 may further include the magnetic shield. The magnetic shield may be configured to encompass the first magnetic element 402, the first magnetic guide element 404, the first magnetic field changing element 406, the second magnetic element 408, and the fifth magnetic element 416.

Figure 4G:
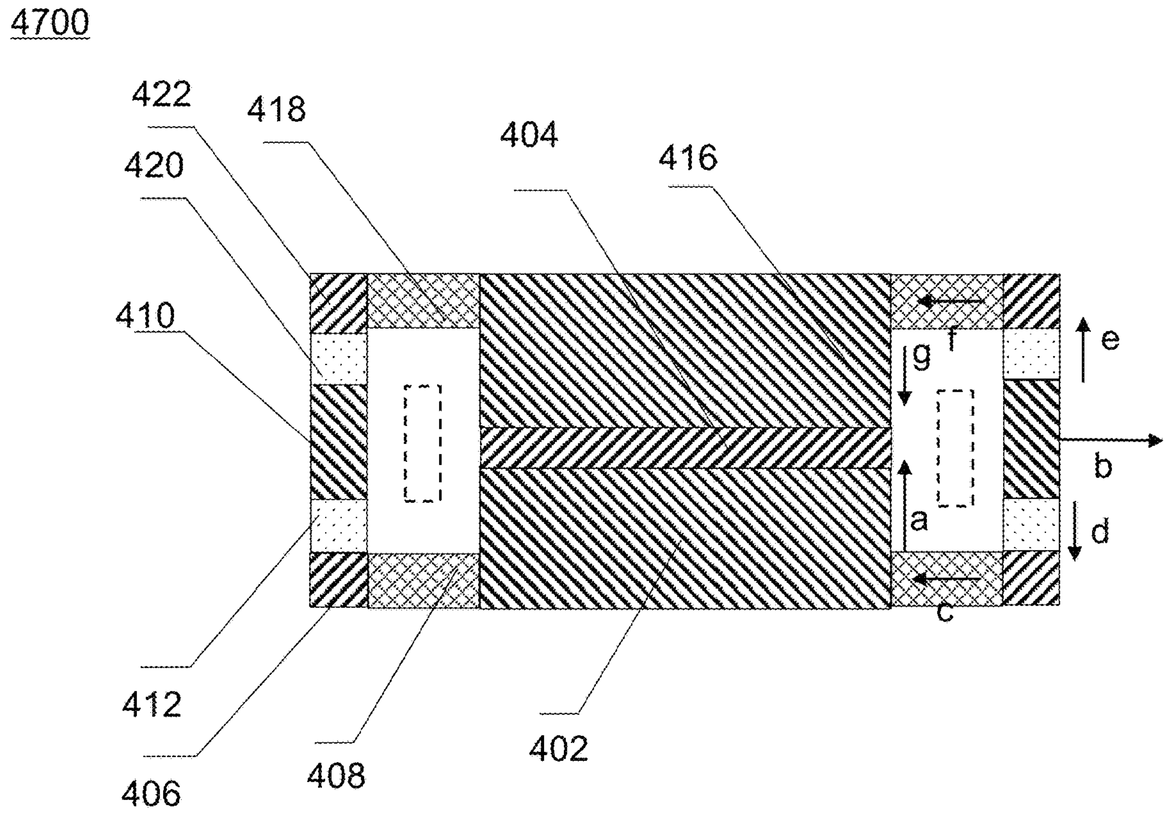
FIG. 4G is a schematic diagram illustrating a longitudinal sectional view of a magnetic circuit assembly according to some embodiments of the present disclosure.

FIG. 4G is a schematic diagram illustrating a longitudinal sectional view of a magnetic circuit assembly 4700 according to some embodiments of the present disclosure. The magnetic circuit assembly 4700 may include the first magnetic element 402, the first magnetic guide element 404, the first magnetic field changing element 406, the second magnetic element 408, the third magnetic element 410, the fourth magnetic element 412, the fifth magnetic element 416, a sixth magnetic element 418, a seventh magnetic element 420, and a second ring element 422. The first magnetic element 402, the first magnetic guide element 404, the first magnetic field changing element 406, the second magnetic element 408, the third magnetic element 410, the third magnetic element 410, the fourth magnetic element 412, and the fifth magnetic element 416 may be found in FIG. 4A, FIG. 4B, FIG. 4C, FIG. 4D, FIG. 4E, and/or FIG. 4F of the present disclosure. In some embodiments, the first magnetic field changing element 406 and/or the second ring element 422 may include the annular magnetic element or an annular magnetic guide element. The annular magnetic element may include any one or more magnetic materials described in the present disclosure, and the annular magnetic guide element may include any one or more magnetically conductive materials described in the present disclosure.

In some embodiments, the sixth magnetic element 418 may be physically connected with the fifth magnetic element 416 and the second ring element 422, and the seventh magnetic element 420 may be physically connected with the third magnetic element 410 and the second ring element 422. In some embodiments, the first magnetic element 402, the fifth magnetic element 416, the second magnetic element 408, the third magnetic element 410, the fourth magnetic element 412, the sixth magnetic element 418, and/or the seventh magnetic element 420, and the first magnetic guide element 404, the first magnetic field changing element 406, and the second ring element 422 may form the magnetic circuit.

The magnetization direction of the second magnetic element 408 may be found in FIG. 4A of the present disclosure. The magnetization directions of the third magnetic element 410, the fourth magnetic element 412, and the fifth magnetic element 416 may be found in FIG. 4B, FIG. 4C, and FIG. 4F of the present disclosure, respectively.

In some embodiments, the included angle between the magnetization direction of the first magnetic element 402 and the magnetization direction of the sixth magnetic element 418 may be in a range from 0 to 180 degrees. In some embodiments, the included angle between the magnetization direction of the first magnetic element 402 and the magnetization direction of the sixth magnetic element 418 may be in a range from 45 degrees to 135 degrees. In some embodiments, the included angle between the magnetization direction of the first magnetic element 402 and the magnetization direction of the sixth magnetic element 418 may not be higher than 90 degrees. In some embodiments, the magnetization direction of the first magnetic element 402 may be perpendicular to the lower surface or the upper surface of the first magnetic element 402 vertically upward (the direction denoted by arrow a in the FIG. 4F). The magnetization direction of the sixth magnetic element 418 may be directed from the outer ring of the sixth magnetic element 418 to the inner ring (the direction denoted by arrow f in the FIG. 4F). On the right side of the first magnetic element 402, the magnetization direction of the sixth magnetic element 418 may be same as the magnetization direction of the first magnetic element 402 deflected 270 degrees in a clockwise direction. In some embodiments, in the same vertical direction, the magnetization direction of the sixth magnetic element 418 may be the same as the magnetization direction of the second magnetic element 408. In some embodiments, the magnetization direction of the first magnetic element 402 may be perpendicular to the lower surface or the upper surface of the first magnetic element 402 vertically upward (the direction denoted by arrow a in the FIG. 4F). The magnetization direction of the seventh magnetic element 420 may be directed from the lower surface of the seventh magnetic element 420 to the upper surface (the direction denoted by arrow e in the FIG. 4F). On the right side of the first magnetic element 402, the magnetization direction of the seventh magnetic element 420 may be same as the magnetization direction of the first magnetic element 402 deflected 360 degrees in a clockwise direction. In some embodiments, the magnetization direction of the seventh magnetic element 420 may be the same as the magnetization direction of the third magnetic element 412.

In some embodiments, at the position of the sixth magnetic element 418, the included angle between the direction of the magnetic field generated by the magnetic circuit assembly 4700 and the magnetization direction of the sixth magnetic element 418 may not be higher than 90 degrees. In some embodiments, at the position of the sixth magnetic element 418, the included angle between the direction of the magnetic field generated by the first magnetic element 402 and the magnetization direction of the sixth magnetic element 418 may be an included angle that is less than or equal to 90 degrees, such as 0 degrees, 10 degrees, 20 degrees, etc.

In some embodiments, the included angle between the magnetization direction of the first magnetic element 402 and the magnetization direction of the seventh magnetic element 420 may be in a range from 0 to 180 degrees. In some embodiments, the included angle between the magnetization direction of the first magnetic element 402 and the magnetization direction of the seventh magnetic element 420 may be in a range from 45 degrees to 135 degrees. In some embodiments, the included angle between the magnetization direction of the first magnetic element 402 and the magnetization direction of the seventh magnetic element 420 may not be higher than 90 degrees.

In some embodiments, at the position of the seventh magnetic element 420, the included angle between the direction of the magnetic field generated by the magnetic circuit assembly 4700 and the magnetization direction of the seventh magnetic element 420 may not be higher than 90 degrees. In some embodiments, at the position of the seventh magnetic element 420, the included angle between the direction of the magnetic field generated by the first magnetic element 402 and the magnetization direction of the seventh magnetic element 420 may be an included angle that is less than or equal to 90 degrees, such as 0 degrees, 10 degrees, 20 degrees, etc.

In some embodiments, the first magnetic field changing element 406 may be the annular magnetic element. In this case, the magnetization direction of the first magnetic field changing element 406 may be the same as the magnetization direction of the second magnetic element 408 or the fourth magnetic element 412. For example, on the right side of the first magnetic element 402, the magnetization direction of the first magnetic field changing element 406 may be directed from the outer ring of the first magnetic field changing element 406 to the inner ring. In some embodiments, the second ring element 422 may be the annular magnetic element. In this case, the magnetization direction of the second ring element 422 may be the same as that of the sixth magnetic element 418 or the seventh magnetic element 420. For example, on the right side of the first magnetic element 402, the magnetization direction of the second ring element 422 may be directed from the outer ring of the second ring element 422 to the inner ring.

In the magnetic circuit assembly 4700, a plurality of magnetic elements may increase the total magnetic flux, the interaction of the different magnetic elements may suppress the leakage of magnetic induction lines, increase magnetic induction intensity within the magnetic gap, and improve the sensitivity of the bone conduction speaker.

The above description of the magnetic circuit assembly 4700 may be only a specific example, and should not be considered as the only feasible implementation. Obviously, for a person skilled in the art, after understanding the basic principles of bone magnetic circuit assembly, it is possible to make various modifications and changes in the form and details of the specific means and steps of implementing the magnetic circuit assembly 4700 without departing from this principle, but these modifications and changes are still within the scope described above. In some embodiments, the magnetic circuit assembly 4700 may further include one or more conductive elements. The one or more conductive elements may be physically connected with at least one of the first magnetic element 402, the first magnetic guide element 404, the second magnetic element 408, the third magnetic element 410, the fourth magnetic element 412, the fifth magnetic element 416, the sixth magnetic element 418, and the seventh magnetic element 420.

Figure 4H:
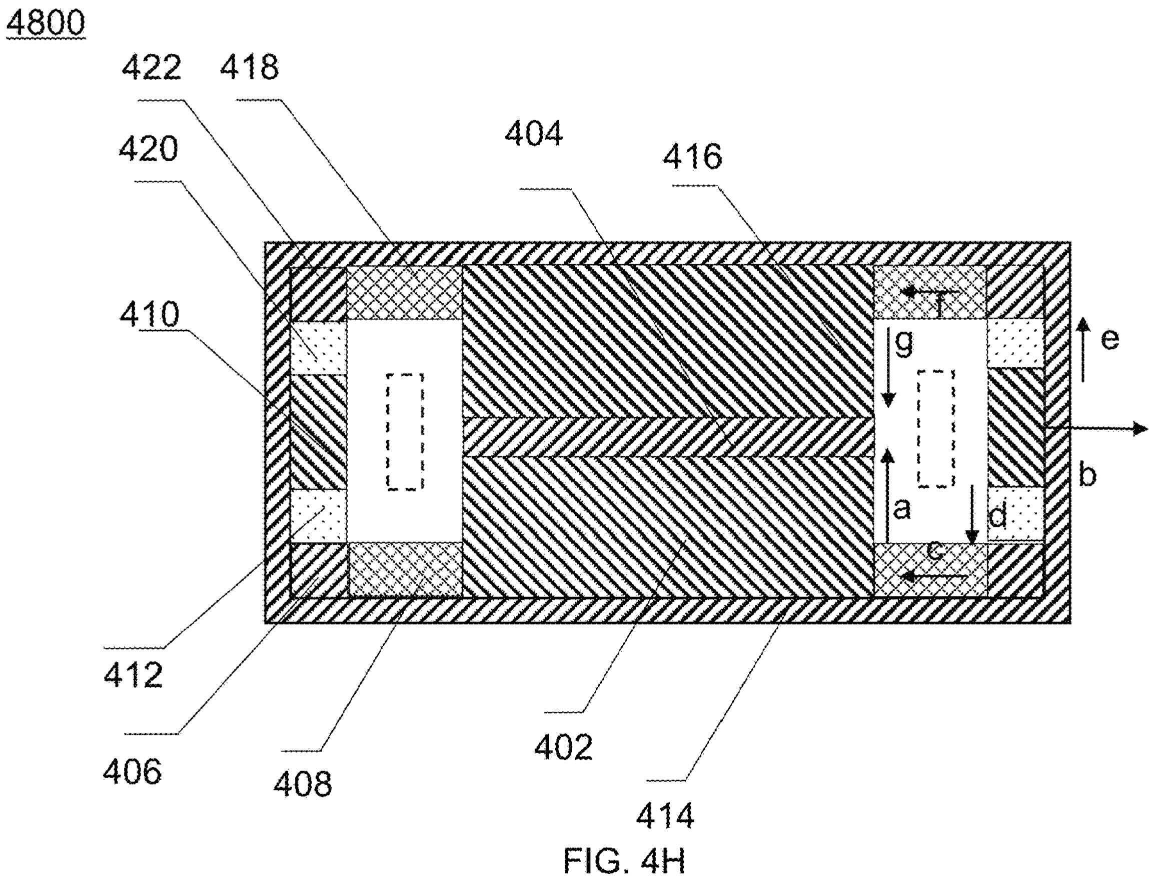
FIG. 4H is a schematic diagram illustrating a longitudinal sectional view of a magnetic circuit assembly according to some embodiments of the present disclosure.

FIG. 4H is a schematic diagram illustrating a longitudinal sectional view of a magnetic circuit assembly 4800 according to some embodiments of the present disclosure. As shown in FIG. 4H, different from the magnetic circuit assembly 4700, the magnetic circuit assembly 4800 may further include the magnetic shield 414.

The magnetic shield 414 may include any one or more magnetically permeable materials described in the present disclosure, such as the low carbon steel, the silicon steel sheet, the silicon steel sheet, the ferrite, or the like. The magnetic shield 414 may be physically connected with the first magnetic element 402, the first magnetic field changing element 406, the second magnetic element 408, the third magnetic element 410, the fourth magnetic element 412, the fifth magnetic element 416, the sixth magnetic element 418, the seventh magnetic element 420, and the second ring element 422 through any one or more connection means as described elsewhere in the present disclosure. The processing means of the magnetic shield 414 may include any one of the processing means as described elsewhere in the present disclosure, for example, the casting, the plastic processing, the cutting processing, the powder metallurgy, or the like, or any combination thereof. In some embodiments, the magnetic shield may include at least one baseplate and the side wall, and the side wall may be the ring structure. In some embodiments, the baseplate and the side wall may be integrally formed. In some embodiments, the baseplate may be physically connected with the side wall through any one or more connection means as described elsewhere in the present disclosure. For example, the magnetic shield 414 may include a first baseplate, a second baseplate, and the side wall. The first baseplate and the side wall may be integrally formed, and the second baseplate may be physically connected with the side wall through any one or more connection means as described elsewhere in the present disclosure.

In the magnetic circuit assembly 4800, the magnetic shield 414 may close the magnetic circuit generated by the magnetic circuit assembly 4800, so that more magnetic induction lines are concentrated within the magnetic gap in the magnetic circuit assembly 4800, thereby suppressing magnetic leakage, increasing magnetic induction intensity within the magnetic gap, and improving the sensitivity of the bone conduction speaker.

The above description of the magnetic circuit assembly 4800 may be only a specific example, and should not be considered as the only feasible implementation solution. Obviously, for a person skilled in the art, after understanding the basic principle of the bone magnetic circuit assembly, it is possible to make various modifications and changes in the form and details of the specific means and steps for implementing magnetic circuit assembly 4800 without departing from this principle, but these modifications and changes are still within the scope described above. For example, the magnetic circuit assembly 4800 may further include one or more conductive elements, the one or more conductive elements may be physically connected with at least one of the first magnetic element 402, the first magnetic guide element 404, the second magnetic element 408, the third magnetic element 410, the fourth magnetic element 412, the fifth magnetic element 416, the sixth magnetic element 418, and the seventh magnetic element 420.

Figure 4M:
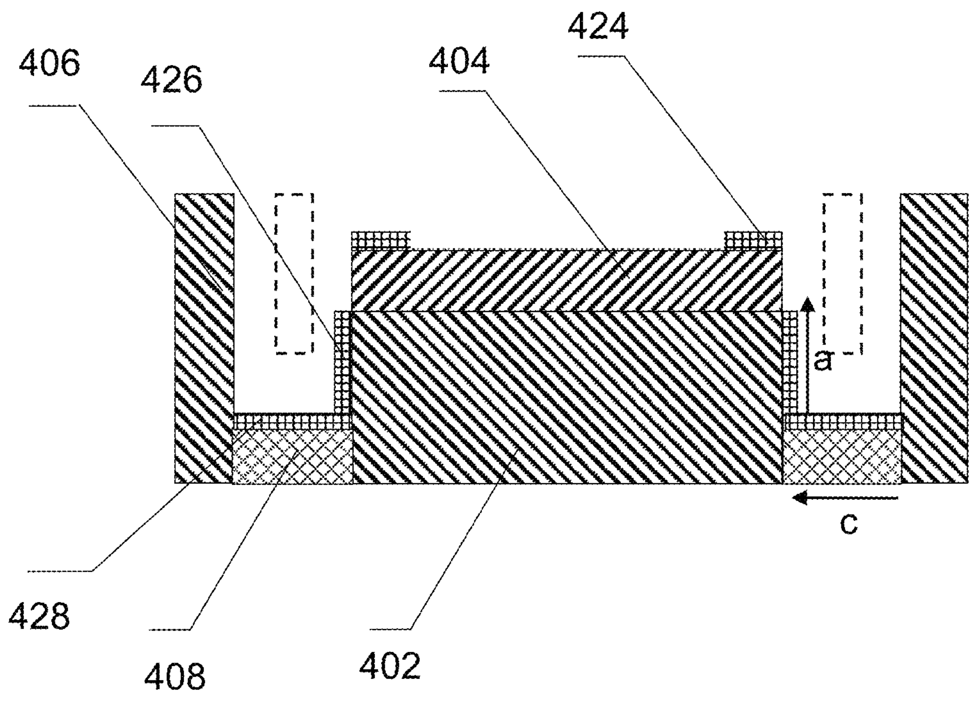
FIG. 4M is a schematic diagram illustrating a longitudinal sectional view of a magnetic circuit assembly according to some embodiments of the present disclosure.

FIG. 4M is a schematic diagram illustrating a longitudinal sectional view of a magnetic circuit assembly 4900 according to some embodiments of the present disclosure. As shown in FIG. 4M, different from the magnetic circuit assembly 4100, the magnetic circuit assembly 4900 may further include one or more conductive elements (e.g., first conductive element 424, second conductive element 426, and third conductive element 428).

The description of the conductive element is similar to the conductive element 318, the conductive element 320 and the conductive element 322, and the related description is not repeated here.

The above description of the magnetic circuit assembly 4900 may be only a specific example and should not be considered as the only feasible implementation. Obviously, for those skilled in the art, after understanding the basic principle of bone magnetic circuit assembly, it is possible to make various modifications and changes in form and detail to the specific manner and steps of implementing magnetic circuit assembly 4900 without departing from this principle, but these modifications and changes are still within the scope described above. For example, the magnetic circuit assembly 4900 may further include at least one magnetic element and/or magnetic guide element.

Figure 5A:
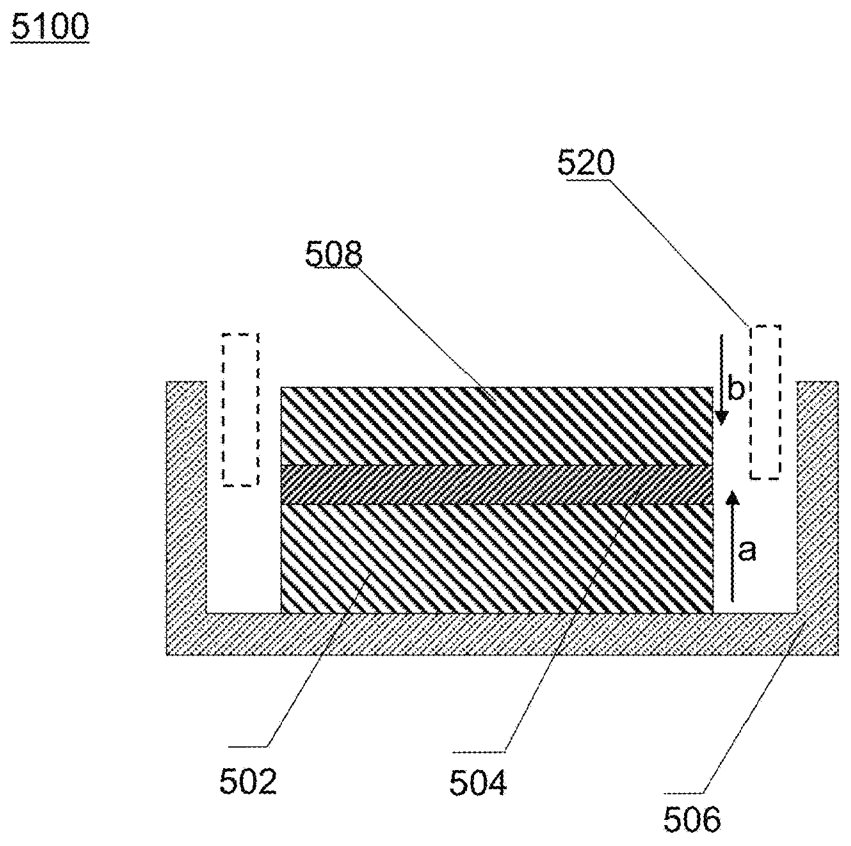
FIG. 5A is a schematic diagram illustrating a longitudinal sectional view of a magnetic circuit assembly according to some embodiments of the present disclosure.

FIG. 5A is a schematic diagram illustrating a longitudinal sectional view of a magnetic circuit assembly 5100 according to some embodiments of the present disclosure. As shown in FIG. 5A the magnetic circuit assembly 5100 may include a first magnetic element 502, a first magnetic guide element 504, a second magnetic guide element 506, and a second magnetic element 508.

In some embodiments, the first magnetic element 502 and/or the second magnetic element 508 may include any one or more magnets described in the present disclosure. In some embodiments, the first magnetic element 502 may include the first magnet, and the second magnetic element 508 may include the second magnet. the first magnet may be the same as or different from the second magnet. The first magnetic guide element 504 and/or the second magnetic guide element 506 may include any one or more magnetic conductive materials described in the present disclosure. The processing means of the first magnetic guide element 504 and/or the second magnetic guide element 506 may include any one or more processing means as described elsewhere in the present disclosure. In some embodiments, the first magnetic element 502, the first magnetic guide element 504, and/or the second magnetic element 508 may be provided as the axisymmetric structure. For example, the first magnetic element 502, the first magnetic guide element 504, and/or the second magnetic element 508 may be cylinders. In some embodiments, the first magnetic element 502, the first magnetic guide element 504, and/or the second magnetic element 508 may be coaxial cylinders with the same or different diameters. The thickness of the first magnetic element 502 may exceed or equal to the thickness of the second magnetic element 508. In some embodiments, the second magnetic guide element 506 may be the groove-type structure. The groove-type structure may include the U-shaped cross section (as shown in FIG. 5A). The groove-type second magnetic guide element 506 may include the baseplate and the side wall. In some embodiments, the baseplate and the side wall may be integrally formed. For example, the side wall may be formed by extending the baseplate in the direction perpendicular to the baseplate. In some embodiments, the baseplate may be physically connected with the side wall through one or more connection means as described elsewhere in the present disclosure. The second magnetic element 508 may be provided in the annular shape or the sheet shape. Regarding the shape of the second magnetic element 508, reference may be made to descriptions elsewhere in the specification (e.g., FIG. 6A and FIG. 6B and related descriptions). In some embodiments, the second magnetic element 508 may be coaxial with the first magnetic element 502 and/or the first magnetic guide element 504.

The upper surface of the first magnetic element 502 may be physically connected with the lower surface of the first magnetic guide element 504. The lower surface of the first magnetic element 502 may be physically connected with the baseplate of the second magnetic guide element 506. The lower surface of the second magnetic element 508 may be physically connected with the upper surface of the first magnetic guide element 504. The connection means between the first magnetic element 502, the first magnetic guide element 504, the second magnetic guide element 506 and/or the second magnetic element 508 may include the bonding, the snapping, the welding, the riveting, the bolting, or the like, or any combination thereof.

The magnetic gap may be configured between the first magnetic element 502, the first magnetic guide element 504, and/or the second magnetic element 508 and the side wall of the second magnetic guide element 506. The voice coil 520 may be located within the magnetic gap. In some embodiments, the first magnetic element 502, the first magnetic guide element 504, the second magnetic guide element 506, and the second magnetic element 508 may form the magnetic circuit. In some embodiments, the magnetic circuit assembly 5100 may generate the first magnetic field, and the first magnetic element 502 may generate the second magnetic field. The first magnetic field may be jointly formed by magnetic fields generated by all components (e.g., the first magnetic element 502, the first magnetic guide element 504, the second magnetic guide element 506, and the second magnetic element 508) in the magnetic circuit assembly 5100. The magnetic field strength of the first magnetic field within the magnetic gap (may also be referred to as magnetic induction intensity or magnetic flux density) may exceed the magnetic field strength of the second magnetic field within the magnetic gap. In some embodiments, the second magnetic element 508 may generate the third magnetic field, and the third magnetic field may increase the magnetic field strength of the second magnetic field within the magnetic gap.

In some embodiments, the included angle between the magnetization direction of the second magnetic element 508 and the magnetization direction of the first magnetic element 502 may be in a range from 90 degrees to 180 degrees. In some embodiments, the included angle between the magnetization direction of the second magnetic element 508 and the magnetization direction of the first magnetic element 502 may be in a range from 150 degrees to 180 degrees. In some embodiments, the magnetization direction of the second magnetic element 508 may be opposite to the magnetization direction of the first magnetic element 502 (as shown, in the direction of a and in the direction of b).

Compared with the magnetic circuit assembly of the single magnetic element, the magnetic circuit assembly 5100 may add the second magnetic element 508. The magnetization direction of the second magnetic element 508 may be opposite to the magnetization direction of the first magnetic element 502, which can suppress the magnetic leakage of the first magnetic element 502 in the magnetization direction, so that the magnetic field generated by the first magnetic element 502 may be more compressed into the magnetic gap, thereby increasing the magnetic induction intensity within the magnetic gap.

The above description of the magnetic circuit assembly 5100 may be only a specific example, and should not be considered as the only feasible implementation. Obviously, for a person skilled in the art, after understanding the basic principles of bone magnetic circuit assembly, it is possible to make various modifications and changes in the form and details of the specific means and steps of implementing the magnetic circuit assembly 5100 without departing from this principle, but these modifications and changes are still within the scope described above. For example, the second magnetic guide element 506 may be the ring structure or the sheet structure. As another example, the magnetic circuit assembly 5100 may further include a conductive element. The conductive element may be physically connected with the first magnetic element 502, the first magnetic guide element 504, the second magnetic guide element 506, and the second magnetic element 508.

Figure 5B:
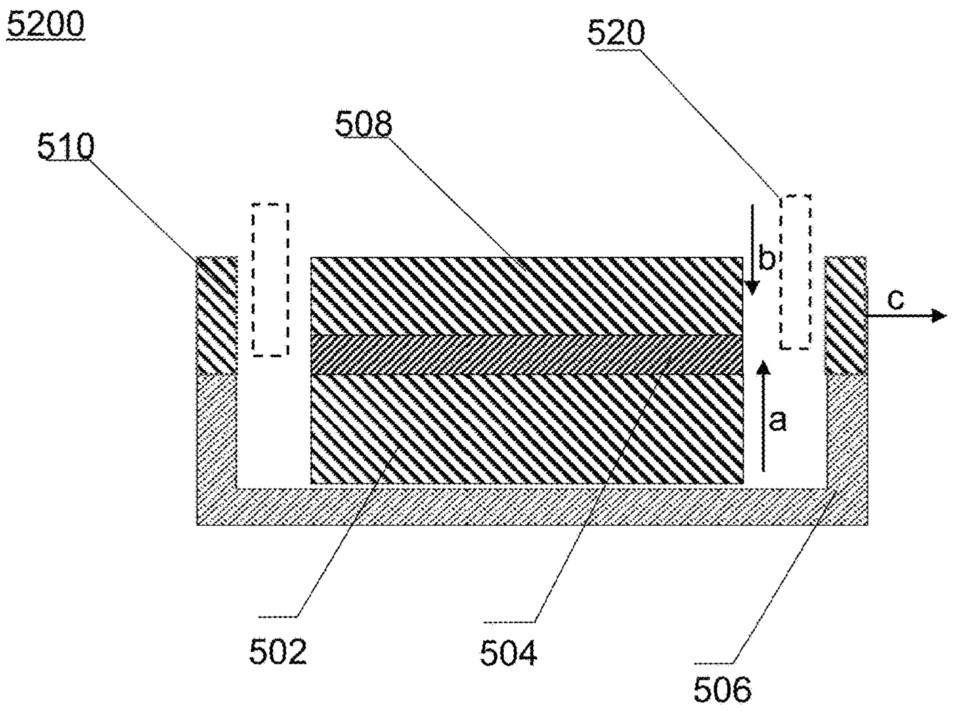
FIG. 5B is a schematic diagram illustrating a longitudinal sectional view of a magnetic circuit assembly according to some embodiments of the present disclosure.

FIG. 5B is a schematic diagram illustrating a longitudinal sectional view of a magnetic circuit assembly 5200 according to some embodiments of the present disclosure. As shown in FIG. different from the magnetic circuit assembly 5100, the magnetic circuit assembly 5200 may further include a third magnetic element 510.

The lower surface of the third magnetic element 510 may be physically connected with the side wall of the second magnetic guide element 506. The magnetic gap may be configured between the first magnetic element 502, the first magnetic guide element 504, the second magnetic element 508, and/or the third magnetic element 510. The voice coil 520 may be located within the magnetic gap. In some embodiments, the first magnetic element 502, the first magnetic guide element 504, the second magnetic guide element 506, the second magnetic element 508, and the third magnetic element 510 may form the magnetic circuit. In some embodiments, the magnetization direction of the second magnetic element 508 may refer to the detailed descriptions in FIG. 3A of the present disclosure.

In some embodiments, the magnetic circuit assembly 5200 may generate the first magnetic field, and the first magnetic element 502 may generate the second magnetic field. The magnetic field strength of the first magnetic field within the magnetic gap may be greater than the magnetic field strength of the second magnetic field within the magnetic gap. In some embodiments, the third magnetic element 510 may generate the third magnetic field, and the third magnetic field may increase the magnetic field strength of the second magnetic field within the magnetic gap.

In some embodiments, the included angle between the magnetization direction of the first magnetic element 502 and the magnetization direction of the third magnetic element 510 may be in a range from 0 to 180 degrees. In some embodiments, the included angle between the magnetization direction of the first magnetic element 502 and the magnetization direction of the third magnetic element 510 may be in a range from 45 degrees to 135 degrees. In some embodiments, the included angle between the magnetization direction of the first magnetic element 502 and the magnetization direction of the third magnetic element 510 may equal or exceed 90 degrees. In some embodiments, the magnetization direction of the first magnetic element 502 may be perpendicular to the lower surface or the upper surface of the first magnetic element 502 vertically upwards (the direction denoted by arrow a in the FIG. 5B). The magnetization direction of the third magnetic element 510 may be directed from the inner ring of the third magnetic element 510 to the outer ring (the direction denoted by arrow c in the FIG. 5B). On the right side of the first magnetic element 502, the magnetization direction of the third magnetic element 510 may be the same as the magnetization direction of the first magnetic element 502 deflected 90 degrees in a clockwise direction.

In some embodiments, at the position of the third magnetic element 510, the included angle between the direction of the first magnetic field and the magnetization direction of the third magnetic element 510 may not be higher than 90 degrees. In some embodiments, at the position of the third magnetic element 510, the included angle between the direction of the magnetic field generated by the first magnetic element 502 and the magnetization direction of the third magnetic element 510 may be an included angle that is less than or equal to 90 degrees, such as 0 degrees, 10 degrees, 20 degrees, etc.

Compared with the magnetic circuit assembly 5100, the third magnetic element 510 may be added to the magnetic circuit assembly 5200. The third magnetic element 510 may further increase the total magnetic flux within the magnetic gap in the magnetic circuit assembly 5200, thereby increasing the magnetic induction intensity within the magnetic gap. And, under the action of the third magnetic element 510, the magnetic induction line will further converge to the position of the magnetic gap, further increasing the magnetic induction intensity within the magnetic gap.

Figure 5C:
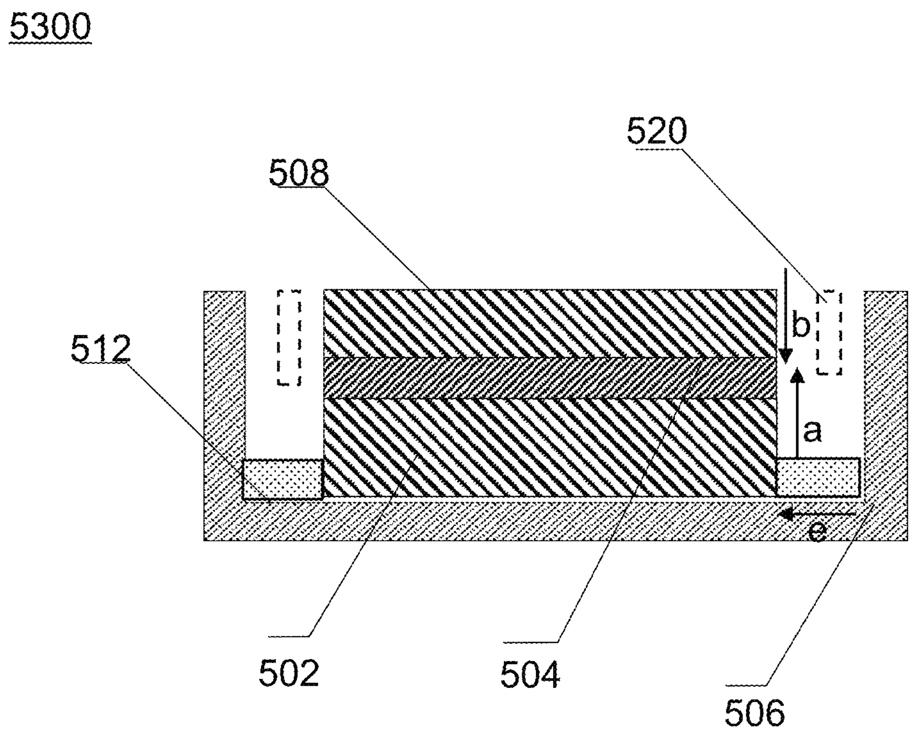
FIG. 5C is a schematic diagram illustrating a longitudinal sectional view of a magnetic circuit assembly according to some embodiments of the present disclosure.

FIG. 5C is a schematic diagram illustrating a longitudinal sectional view of a magnetic circuit assembly 5300 according to some embodiments of the present disclosure. As shown in FIG. different from the magnetic circuit assembly 5100, the magnetic circuit assembly 5300 may further include a fourth magnetic element 512.

The fourth magnetic element 512 may be physically connected with the side wall of the first magnetic element 502 and the second magnetic guide element 506 by the bonding, the snapping, the welding, the riveting, the bolting, or the like, or any combination thereof. In some embodiments, the magnetic gap may be configured between the first magnetic element 502, the first magnetic guide element 504, the second magnetic guide element 506, the second magnetic element 508, and the fourth magnetic element 512. In some embodiments, the magnetization direction of the second magnetic element 508 may be found in FIG. 5A of the present disclosure.

In some embodiments, the magnetic circuit assembly 5200 may generate the first magnetic field, and the first magnetic element 502 may generate the second magnetic field. The magnetic field strength of the first magnetic field within the magnetic gap may exceed the magnetic field strength of the second magnetic field within the magnetic gap. In some embodiments, the fourth magnetic element 512 may generate the fourth magnetic field, and the fourth magnetic field may increase the magnetic field strength of the second magnetic field within the magnetic gap.

In some embodiments, the included angle between the magnetization direction of the first magnetic element 502 and the magnetization direction of the fourth magnetic element 512 may be in a range from 0 to 180 degrees. In some embodiments, the included angle between the magnetization direction of the first magnetic element 502 and the magnetization direction of the fourth magnetic element 512 may be in a range from 45 degrees to 135 degrees. In some embodiments, the included angle between the magnetization direction of the first magnetic element 502 and the magnetization direction of the fourth magnetic element 512 may not be higher than 90 degrees. In some embodiments, the magnetization direction of the first magnetic element 502 may be perpendicular to the lower surface or the upper surface of the first magnetic element 502 vertically upward (the direction denoted by arrow a in the FIG. 5C). The magnetization direction of the fourth magnetic element 512 may be directed from the outer ring of the fourth magnetic element 512 to the inner ring (the direction denoted by arrow e in the FIG. 5C). On the right side of the first magnetic element 502, the magnetization direction of the fourth magnetic element 512 may be the same as the magnetization direction of the first magnetic element 502 deflected 270 degrees in a clockwise direction.

In some embodiments, at the position of the fourth magnetic element 512, the included angle between the direction of the first magnetic field and the magnetization direction of the fourth magnetic element 512 may not be higher than 90 degrees. In some embodiments, at the position of the fourth magnetic element 512, the included angle between the direction of the magnetic field generated by the first magnetic element 502 and the magnetization direction of the fourth magnetic element 512 may be an included angle that is less than or equal to 90 degrees, such as 0 degrees, 10 degrees, 20 degrees, etc.

Compared with the magnetic circuit assembly 5200, the fourth magnetic element 512 may be added to the magnetic circuit assembly 5300. The fourth magnetic element 512 may further increase the total magnetic flux within the magnetic gap in the magnetic circuit assembly 5300, thereby increasing the magnetic induction intensity within the magnetic gap. In addition, under the action of the fourth magnetic element 512, the magnetic induction line will further converge to the position of the magnetic gap, further increasing the magnetic induction intensity within the magnetic gap.

Figure 5D:
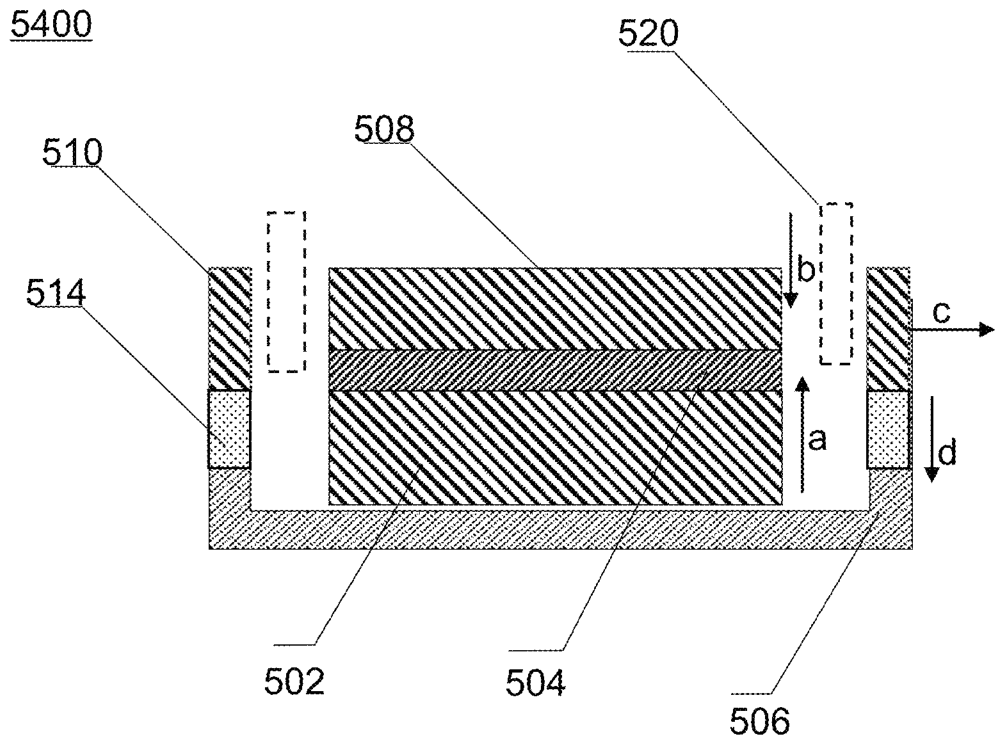
FIG. 5D is a schematic diagram illustrating a longitudinal sectional view of a magnetic circuit assembly according to some embodiments of the present disclosure.

FIG. 5D is a schematic diagram illustrating a longitudinal sectional view of a magnetic circuit assembly 5400 according to some embodiments of the present disclosure. As shown in FIG. different from the magnetic circuit assembly 5200, the magnetic circuit assembly 5400 may further include a fifth magnetic element 514.

The lower surface of the third magnetic element 510 may be physically connected with the fifth magnetic element 514, and the lower surface of the fifth magnetic element 514 may be physically connected with the side wall of the second magnetic guide element 506. The magnetic gap may be configured between the first magnetic element 502, the first magnetic guide element 504, the second magnetic element 508, and/or the third magnetic element 510. The voice coil 520 may be located within the magnetic gap. In some embodiments, the first magnetic element 502, the first magnetic guide element 504, the second magnetic guide element 506, the second magnetic element 508, the third magnetic element 510, and the fifth magnetic element 514 may form the magnetic circuit. In some embodiments, the magnetization direction of the second magnetic element 508 and the third magnetic element 510 may be found in FIG. 5A and FIG. 5B of the present disclosure.

In some embodiments, magnetic circuit assembly 5400 may generate the first magnetic field. The first magnetic element 502 may generate the second magnetic field, and the magnetic field strength of the first magnetic field within the magnetic gap may exceed the magnetic field strength of the second magnetic field within the magnetic gap. In some embodiments, the fifth magnetic element 514 may generate the fifth magnetic field, and the fifth magnetic field may increase the magnetic field strength of the second magnetic field within the magnetic gap.

In some embodiments, the included angle between the magnetization direction of the first magnetic element 502 and the magnetization direction of the fifth magnetic element 514 may be in a range from 0 degrees to 180 degrees. In some embodiments, the included angle between the magnetization direction of the first magnetic element 502 and the magnetization direction of the fifth magnetic element 514 may be in a range from 45 degrees to 135 degrees. In some embodiments, the included angle between the magnetization direction of the first magnetic element 502 and the magnetization direction of the fifth magnetic element 514 may equal or exceed 90 degrees.

In some embodiments, at some positions of the fifth magnetic element 514, the included angle between the direction of the first magnetic field and the magnetization direction of the fifth magnetic element 514 may not be higher than 90 degrees. In some embodiments, at the position of the fifth magnetic element 514, the included angle between the direction of the magnetic field generated by the first magnetic element 502 and the magnetization direction of the fifth magnetic element 514 may be an included angle that is less than or equal to 90 degrees, such as 0 degrees, 10 degrees, 20 degrees, etc. In some embodiments, the magnetization direction of the first magnetic element 502 may be perpendicular to the lower surface or the upper surface of the first magnetic element 502 vertically upward (the direction denoted by arrow a in the FIG. 5D). The magnetization direction of the fifth magnetic element 514 may be directed from the upper surface of the fifth magnetic element 514 to the lower surface (the direction denoted by arrow d in the FIG. On the right side of the first magnetic element 502, the magnetization direction of the fifth magnetic element 514 may be the same as the magnetization direction of the first magnetic element 502 deflected 180 degrees in a clockwise direction.

Compared with the magnetic circuit assembly 5200, the fifth magnetic element 514 may be added to the magnetic circuit assembly 5400. The fifth magnetic element 514 may further increase the total magnetic flux within the magnetic gap in the magnetic circuit assembly 5400, thereby increasing the magnetic induction intensity within the magnetic gap. In addition, under the action of the fourth magnetic element 514, the magnetic induction line will further converge to the position of the magnetic gap, further increasing the magnetic induction intensity within the magnetic gap.

Figure 5E:
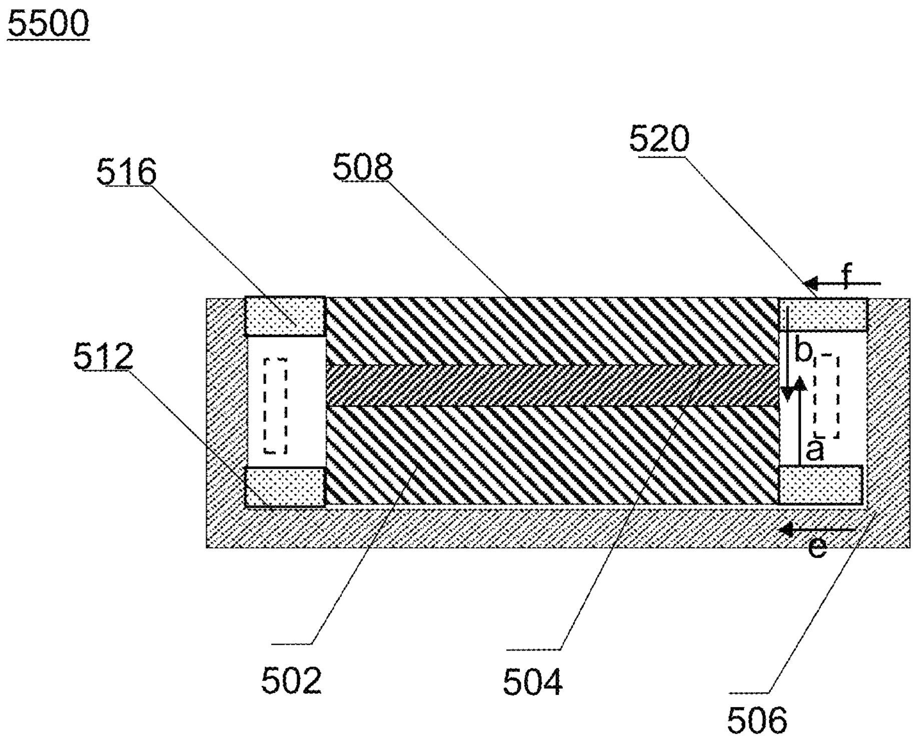
FIG. 5E is a schematic diagram illustrating a longitudinal sectional view of a magnetic circuit assembly according to some embodiments of the present disclosure.

FIG. 5E is a schematic diagram illustrating a longitudinal sectional view of a magnetic circuit assembly 5500 according to some embodiments of the present disclosure. As shown in FIG. different from the magnetic circuit assembly 5300, the magnetic circuit assembly 5500 may further include a sixth magnetic element 516.

The sixth magnetic element 516 may be physically connected with the side wall of the second magnetic element 508 and the second magnetic guide element 506 by the bonding, the snapping, the welding, the riveting, the bolting, or the like, or any combination thereof. In some embodiments, the magnetic gap may be configured between the first magnetic element 502, the first magnetic guide element 504, the second magnetic guide element 506, the second magnetic element 508, the fourth magnetic element 512, and the sixth magnetic element 516. In some embodiments, the magnetization direction of the second magnetic element 508 and the fourth magnetic element 512 may be found in FIG. 5A and FIG. 5C of the present disclosure.

In some embodiments, magnetic circuit assembly 5500 may generate the first magnetic field, and the first magnetic element 502 may generate the second magnetic field. The magnetic field strength of the first magnetic field within the magnetic gap may exceed the magnetic field strength of the second magnetic field within the magnetic gap. In some embodiments, the sixth magnetic element 516 may generate a sixth magnetic field, and the sixth magnetic field may increase the magnetic field strength of the second magnetic field within the magnetic gap.

In some embodiments, the included angle between the magnetization direction of the first magnetic element 502 and the magnetization direction of the sixth magnetic element 516 may be in a range from 0 degrees to 180 degrees. In some embodiments, the included angle between the magnetization direction of the first magnetic element 502 and the magnetization direction of the sixth magnetic element 516 may be in a range from 45 degrees to 135 degrees. In some embodiments, the included angle between the magnetization direction of the first magnetic element 502 and the magnetization direction of the sixth magnetic element 516 may not be higher than 90 degrees. In some embodiments, the magnetization direction of the first magnetic element 502 may be perpendicular to the lower surface or the upper surface of the first magnetic element 502 vertically upward (the direction denoted by arrow a in the FIG. 5E). The magnetization direction of the sixth magnetic element 516 may be directed from the outer ring of the sixth magnetic element 516 to the inner ring (the direction denoted by arrow fin the FIG. 5E). On the right side of the first magnetic element 502, the magnetization direction of the sixth magnetic element 516 may be the same as the magnetization direction of the first magnetic element 502 deflected 270 degrees in a clockwise direction.

In some embodiments, at the position of the sixth magnetic element 516, the included angle between the direction of the first magnetic field and the magnetization direction of the sixth magnetic element 516 may not be higher than 90 degrees. In some embodiments, at the position of the sixth magnetic element 516, the included angle between the direction of the magnetic field generated by the first magnetic element 502 and the magnetization direction of the sixth magnetic element 516 may be an included angle exceed 90 degrees, such as 90 degrees, 110 degrees, and 120 degrees.

Compared with the magnetic circuit assembly 5100, the fourth magnetic element 512 and the sixth magnetic element 516 may be added to the magnetic circuit assembly 5500. The fourth magnetic element 512 and the sixth magnetic element 516 may increase the total magnetic flux within the magnetic gap in the magnetic circuit assembly 5500, increase the magnetic induction intensity within the magnetic gap, thereby increasing the sensitivity of the bone conduction speaker.

Figure 5F:
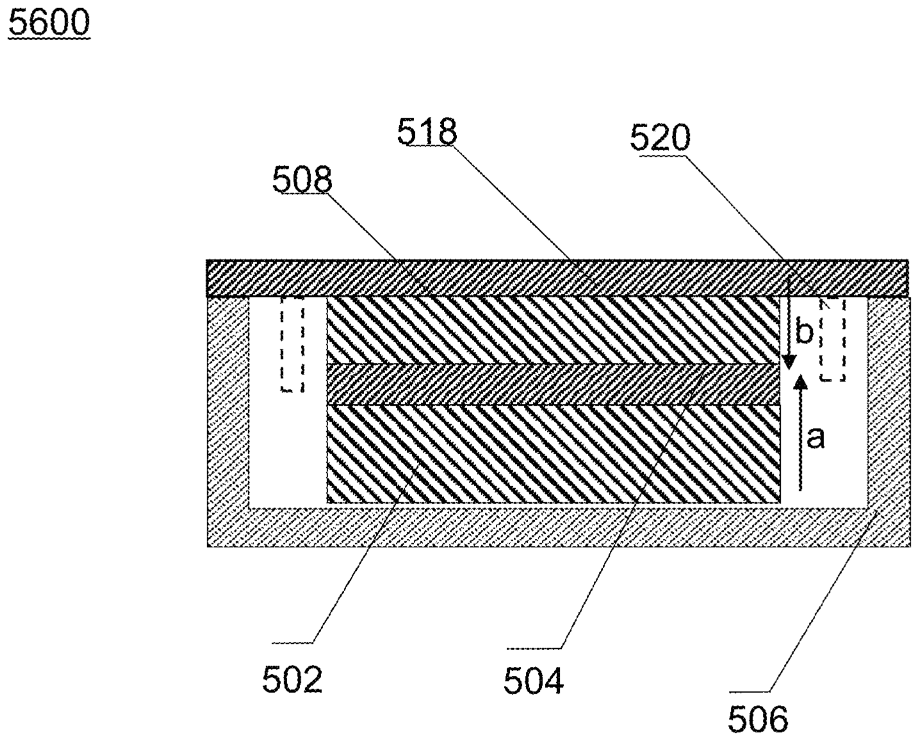
FIG. 5F is a schematic diagram illustrating a longitudinal sectional view of a magnetic circuit assembly according to some embodiments of the present disclosure.

FIG. 5F is a schematic diagram illustrating a longitudinal sectional view of a magnetic circuit assembly 5600 according to some embodiments of the present disclosure. As shown in FIG. different from the magnetic circuit assembly 5100, the magnetic circuit assembly 5600 may further include a third magnetic guide element 518.

In some embodiments, the third magnetic guide element 518 may include any one or more magnetically conductive materials described in the present disclosure. The magnetic conductive materials included in the first magnetic guide element 504, the second magnetic guide element 506, and/or the third magnetic guide element 518 may be the same or different. In some embodiments, the third magnetic guide element 5186 may be provided as the symmetrical structure. For example, the third magnetic guide element 518 may be cylinders. In some embodiments, the first magnetic element 502, the first magnetic guide element 504, the second magnetic element 508, and/or the third magnetic guide element 518 may be coaxial cylinders with the same or different diameters. The third magnetic guide element 518 may be physically connected with the second magnetic element 508. In some embodiments, the third magnetic guide element 518 may be physically connected with the second magnetic element 5084 and the second magnetic guide element 506 so that the third magnetic guide element 518 and the second magnetic guide element 506 form a cavity. The cavity may include the first magnetic element 502, the second magnetic element 508, and the first magnetic guide element 504.

Compared with the magnetic circuit assembly 5100, the third magnetic guide element 518 may be added to the magnetic circuit assembly 5600 magnetic guide element. The third magnetic guide element 518 may suppress the magnetic leakage of the second magnetic element 508 in the magnetization direction in the magnetic circuit assembly 5600, so that the magnetic field generated by the second magnetic element 508 may be more compressed into the magnetic gap, thereby increasing the magnetic induction intensity within the magnetic gap.

Figure 6A:
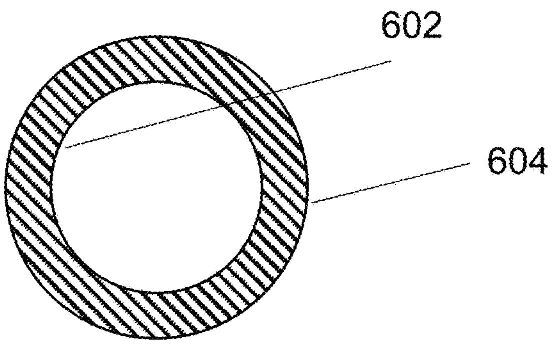
FIG. 6A is a schematic diagram illustrating a cross-section of a magnetic element according to some embodiments of the present disclosure.

FIG. 6A is a schematic diagram illustrating a cross-section of a magnetic element according to some embodiments of the present disclosure. The magnetic element 600 may be applicable to any magnetic circuit assembly in the present disclosure (e.g., the magnetic circuit assembly shown in FIG. 3A to FIG. 3G, FIG. 4A to FIG. 4M, or FIG. 5A to FIG. 5F). As shown, the magnetic element 600 may be in an annular shape. The magnetic element 600 may include an inner ring 602 and an outer ring 604. In some embodiments, the shape of the inner ring 602 and/or the outer ring 604 may be a circle, an ellipse, a trigon, a quadrangle, or any other polygon.

Figure 6B:
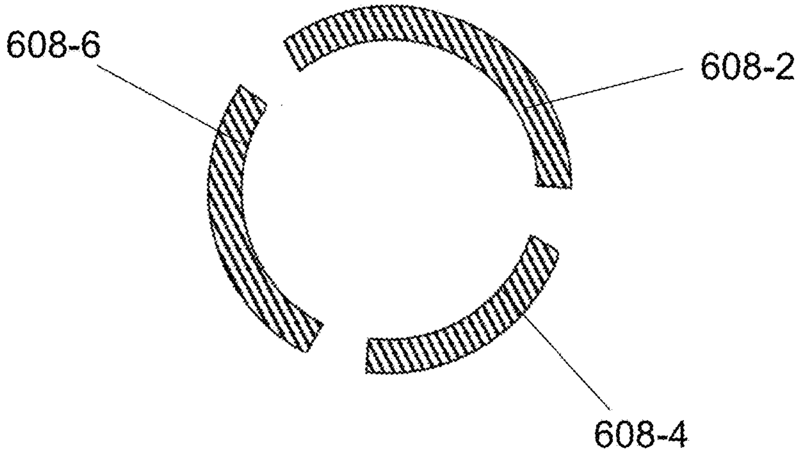
FIG. 6B is a schematic diagram illustrating a magnetic element according to some embodiments of the present disclosure.

FIG. 6B is a schematic diagram illustrating a magnetic element according to some embodiments of the present disclosure. The magnetic element may be applied to any magnetic circuit assembly in the present disclosure (e.g., the magnetic circuit assembly shown in FIG. 3A to FIG. 3G, FIG. 4A to FIG. 4M, or FIG. 5A to FIG. 5F). As shown, the magnetic element may be composed of a plurality of magnets s arranged one by one. Each of the two ends of any one of the plurality of magnets may be physically connected with or have a certain spacing from an end of an adjacent magnet. The spacing between two adjacent magnets may be the same or different. In some embodiments, the magnetic element may be composed of two or three sheet-shaped magnets (e.g., the magnet 608-2, the magnet 608-4, and the magnet 608-6) that are arranged equidistantly. The shape of the sheet-shaped magnets may be a fan shape, a quadrangular shape, or the like.

Figure 6C:
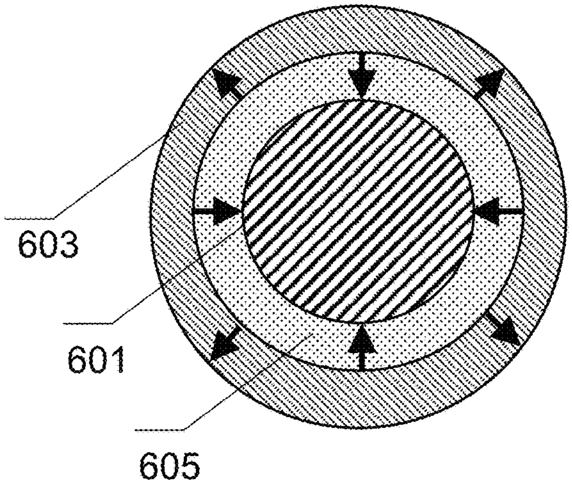
FIG. 6C is a schematic diagram illustrating a magnetization direction of a magnetic element in a magnetic circuit assembly according to some embodiments of the present disclosure.

FIG. 6C is a schematic diagram illustrating the magnetization direction of a magnetic element in a magnetic circuit assembly according to some embodiments of the present disclosure. FIG. 6C shows a cross section of the magnetic circuit assembly. As shown, the magnetic circuit assembly may include a first magnetic element 601, a second magnetic element 603, and a third magnetic element 605. The first magnetic element 601 (e.g., the first magnetic element 302 in the magnetic circuit assembly 3300 as shown in FIG. 3C), the second magnetic element 603 (e.g., the second magnetic element 308 in the magnetic circuit assembly 3300 as shown in FIG. 3C), and the third magnetic element 605 (e.g., the third magnetic element 312 in the magnetic circuit assembly 3300 as shown in FIG. 3C) may be coaxial cylinders. The magnetization direction of the first magnetic element 601 may be directed from the lower surface of the first magnetic element 601 to the upper surface (i.e., a direction perpendicular to the paper and pointing out). The second magnetic element 603 may encompass the first magnetic element 601. The magnetic gap may be configured between the inner ring of the second magnetic element 603 and the outer ring of the first magnetic element 601. The magnetization direction of the second magnetic element 603 may be directed from the inner ring of the second magnetic element 603 to the outer ring of the second magnetic element 603. The inner ring of the third magnetic element 605 may be physically connected with the outer ring of the first magnetic element 601, and the outer ring of the third magnetic element 605 may be physically connected with the inner ring of the second magnetic element 603. The magnetization direction of the third magnetic element 605 may be directed from the outer ring of the third magnetic element 603 to the inner ring of the third magnetic element 605.

Figure 6D:
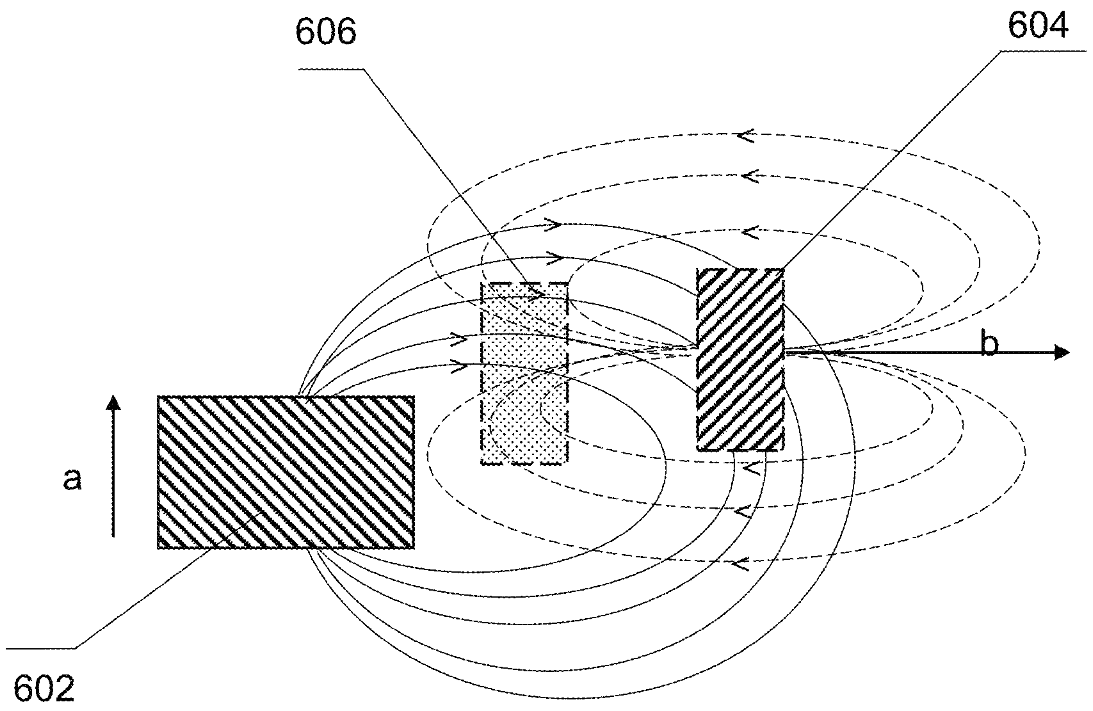
FIG. 6D is a schematic diagram illustrating magnetic induction lines of a magnetic element in a magnetic circuit assembly according to some embodiments of the present disclosure.

FIG. 6D is a schematic diagram illustrating magnetic induction lines of a magnetic element in a magnetic circuit assembly according to some embodiments of the present disclosure. As shown, the magnetic circuit assembly 600 (e.g., the magnetic circuit assembly in FIG. 3A to FIG. 3G, FIG. 4A to FIG. 4M, or FIG. 5A to FIG. 5F) may include a first magnetic element 602 and a second magnetic element 604. The magnetization direction of the first magnetic element 602 may be directed from the lower surface of the first magnetic element 602 to the upper surface (denoted by arrow a in FIG. 6D) of the first magnetic element 602. The first magnetic element 602 may generate a second magnetic field, and the second magnetic field may be represented by magnetic induction lines (denoted by solid lines in FIG. 6D that represent the distribution of the second magnetic field in the absence of the second magnetic element 604). The direction of the magnetic field of the second magnetic field at a certain point may be the tangent direction of the point on the magnetic induction line. The magnetization direction of the second magnetic element 604 may be that the inner ring of the second magnetic element 604 points to the outer ring (as shown by arrow b). The second magnetic element 604 may generate the third magnetic field. The third magnetic field may be represented by a magnetic induction line (denoted by dotted lines in FIG. 6D that indicate the distribution of the third magnetic field in the absence of the first magnetic element 602). The magnetic field direction of the third magnetic field at a certain point may be the tangent direction of the point on the third magnetic induction line. Under the interaction of the second magnetic field and the third magnetic field, the magnetic circuit assembly 600 may generate a first magnetic field (or total magnetic field). The magnetic field strength of the first magnetic field at the voice coil 606 may exceed the magnetic field strength of the second magnetic field or the third magnetic field at the voice coil 606. As shown, the included angle between the magnetic field direction of the second magnetic field at the voice coil 606 and the magnetization direction of the second magnetic element 604 may be less than or equal to 90 degrees.

Figure 7A:
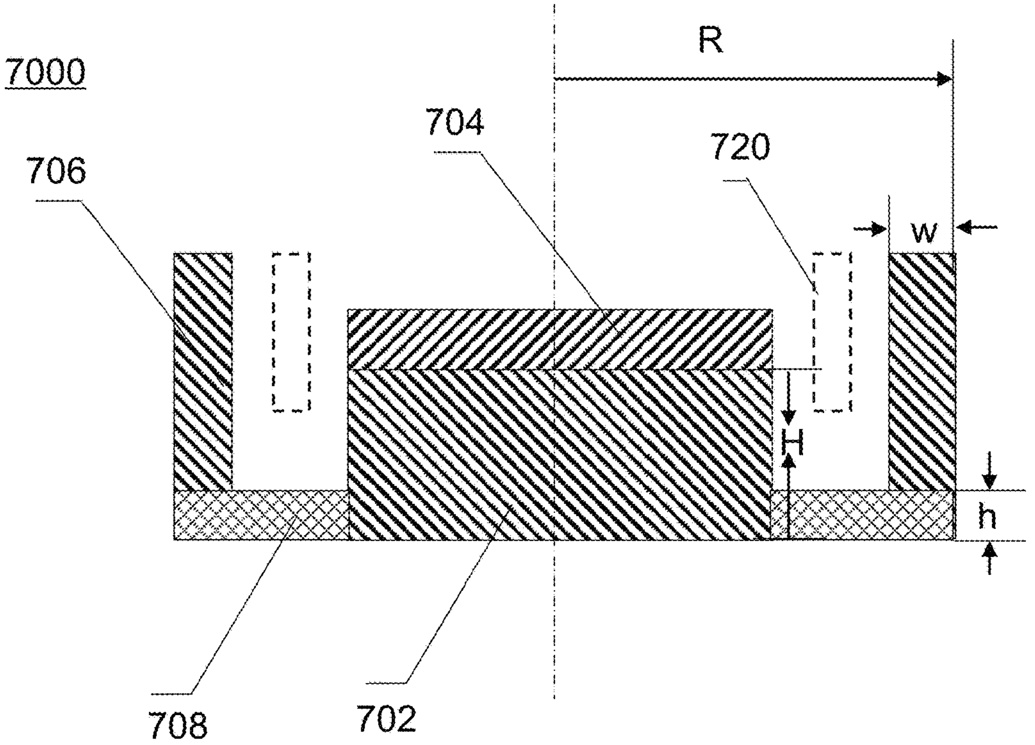
FIG. 7A is a schematic diagram illustrating a magnetic circuit assembly according to some embodiments of the present disclosure.

FIG. 7A is a schematic diagram illustrating a magnetic circuit assembly 7000 according to some embodiments of the present disclosure. As shown, the magnetic circuit assembly 7000 may include a first magnetic element 702, a first magnetic guide element 704, a first annular magnetic element 706, and a second annular magnetic element 708. The first annular magnetic element 706 may also be referred to as the first magnetic field changing element (such as the first magnetic field changing element 406 described in FIG. 4A). The first magnetic element 702, the first magnetic guide element 704, the first annular magnetic element 706, and the second annular magnetic element 708 may be similar or same as the first magnetic element 702, the first magnetic element 402, the first magnetic guide element 404, the first magnetic field changing element 406, and the second magnetic element 408, respectively as described in FIG. 4A, FIG. 4B, FIG. 4C, FIG. 4D, FIG. 4E, FIG. 4F, FIG. 4G, FIG. 4H, and/or FIG. 4M. For example, the first annular magnetic element 706 may be integrally formed of a magnetic material, or may be a combination of a plurality of magnetic elements. The second annular magnetic element 708 may be integrally formed of the magnetic material, or may be a combination of a plurality of magnetic elements. As another example, the second annular magnetic element 708 may be physically connected with the first annular magnetic element 702 and the first annular magnetic element 706. Further, the first annular magnetic element 706 may be physically connected with the upper surface of the second annular magnetic element 708, and the inner wall of the second annular magnetic element 708 may be physically connected with the outer wall of the first magnetic element 702.

The first magnetic element 702, the first magnetic guide element 704, the first annular magnetic element 706, and the second annular magnetic element 708 may form a magnetic circuit and a magnetic gap. The voice coil 720 may be located within the magnetic gap. The voice coil 720 may be in a circular shape or non-circular shape. As used herein, the shape of the voice coil 720 may refer to the shape of a cross section of the voice coil 720. The non-circular shape may include an ellipse, a trigon, a quadrangle, a pentagon, other polygons, or other irregular shapes. When an alternating current including sound information is passed through the voice coil 720, the voice coil 720 within the magnetic gap may vibrate driven by the ampere force under the magnetic field in the magnetic circuit, thereby converting the sound information into a vibration signal. The vibration signal may be transmitted to the auditory nerve through human tissues and bones through other components (e.g., the vibration assembly 104 shown in FIG. 1) in a bone conduction headset, so that a person can hear the sound. The magnitude of the ampere force on the voice coil 720 may affect the vibration of the voice coil, thereby further affecting the sensitivity of the bone conduction headset. The magnitude of the ampere force on the voice coil may be related to the magnetic induction intensity within the magnetic gap. Further, the magnetic induction intensity within the magnetic gap may be changed by adjusting the parameters of the magnetic circuit assembly.

The parameters of the magnetic circuit assembly 7000 may include the thickness H (i.e., the height H of the first magnetic element 702 as shown in FIG. 7A) of the first magnetic element 702, the thickness w of the first annular magnetic element 706, the height h of the second magnetic element 708, the radius R of the magnetic circuit (also referred to as magnetic circuit radius R) formed by the magnetic circuit assembly 7000, or the like. In some embodiments, the radius R of the magnetic circuit (i.e., magnetic return path) may refer to the average half-width of the magnetic circuit, i.e., the distance between the central axis (denoted by a dashed line in FIG. 7A) of the magnetic circuit assembly 7000 and the outer wall of the first annular magnetic element 706. In some embodiments, the parameters of the magnetic circuit assembly 7000 may include a ratio of the magnetic circuit radius R to the thickness H of the first magnetic element 702 (denoted as R/H), the ratio of the thickness w of the first annular magnetic element 706 to the magnetic circuit radius R (denoted as w/R), the ratio of the height h of the second annular magnetic element 708 to the thickness H of the first magnetic element 702 (denoted as h/H), etc. In some embodiments, the ratio R/H of the magnetic circuit radius R to the thickness H of the first magnetic element 702 may range from 2.0 to 4.0. For example, the ratio R/H of the magnetic circuit radius R to the thickness H of the first magnetic element 702 may be 2.0, 2.4, 2.8, 3.2, 3.6, or 4.0. The ratio h/H of the height h of the second annular magnetic element 708 to the thickness H of the first magnetic element 702 may not be greater than 0.8, or not greater than 0.6, or not greater than 0.5, or the like. For example, the ratio h/H of the height h of the second magnetic element 708 to the thickness H of the first magnetic element 702 may be equal to 0.4. The ratio w/R of the thickness w of the first annular magnetic element 706 to the magnetic circuit radius R may be in a range of 0.05-0.50, or 0.1-0.35, or 0.1-0.3, or 0.1-0.25, or 0.1-0.20. For example, the ratio w/R of the thickness w of the first annular magnetic element 706 and the magnetic circuit radius R may be in the range of 0.16-0.18.

In some embodiments, when the ratio of the thickness H of the first magnetic element 702 to the magnetic circuit radius R is constant (i.e., R/H is constant), values of the two parameters w/R and h/H may be optimized, which makes the magnetic induction intensity (or strength) within the magnetic gap and the ampere force on the voice coil the largest, i.e., the driving force coefficient BL the largest. More descriptions about the relationship between the parameters w/R, h/H and the driving force coefficient BL may be found in FIG. 7B. In some embodiments, by setting different values of R/H and adjusting values of w/R and h/H, the magnetic induction intensity (or strength) within the magnetic gap and the ampere force of the coil can be maximized, i.e., the driving force coefficient BL has the largest value. More descriptions about the relationship between the parameters R/H, w/R, h/H and the driving force coefficient BL may be found in FIG. 7C to FIG. 7E.

Figure 7B:
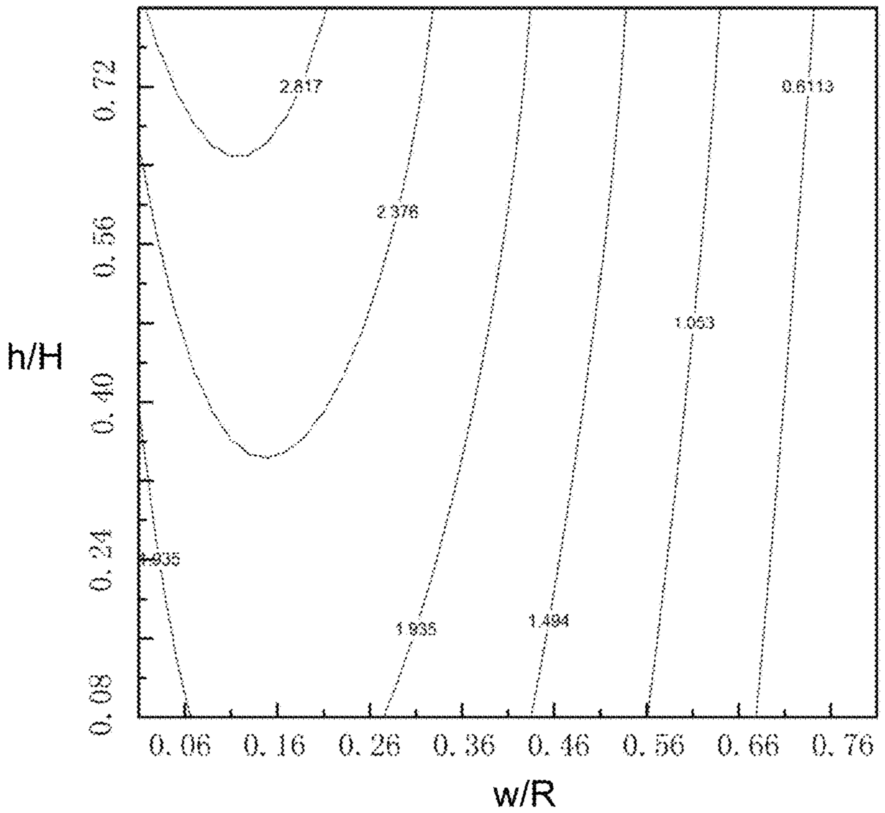
FIG. 7B to FIG. 7E are schematic diagrams illustrating the relationship curves between the driving force coefficient at the voice coil and parameters of the magnetic circuit assembly in FIG. 7A according to some embodiments of the present disclosure.

FIG. 7B is a schematic diagram illustrating an exemplary relationship curve between the driving force coefficient at the voice coil 720 and the parameters of the magnetic circuit assembly in FIG. 7A according to some embodiments of the present disclosure. As shown in FIG. 7B, when the ratio of the magnetic circuit radius R to the thickness H of the first magnetic element 702 is constant (i.e., R/H is constant), the driving force coefficient BL changes with values of the parameter w/R and h/H. In some embodiments, when the ratio w/R of the thickness w of the first annular magnetic element 706 to the magnetic circuit radius R is constant, the greater the ratio h/H of the height h of the second annular magnetic element 708 to the thickness H of the first magnetic element 702, the larger the driving force coefficient BL may be. Further, if the size of the magnetic circuit (i.e., the radius R of the magnetic circuit) is constant, the larger the height h of the second annular magnetic element 708 is, the greater the ratio h/H may of the height h of the second annular magnetic element 708 to the thickness H of the first magnetic element 702 may be, and the larger the driving force coefficient BL may be. But as the height h of the second annular magnetic element 708 increases, the distance between the second annular magnetic element 708 and the voice coil 720 becomes smaller. During the vibration process, the voice coil 720 and the second annular magnetic element 708 may be likely to collide with each other, resulting in a broken sound, thereby affecting the sound quality of the bone conduction headset including the magnetic circuit assembly 7000 and the voice coil 720. As shown in FIG. 7B, the ratio h/H of the height h of the second annular magnetic element 708 to the thickness H of the first magnetic element 702 may not be greater than 0.8, or not greater than 0.6, or not greater than 0.5, or the like. For example, the ratio h/H of the height h of the second annular magnetic element 708 to the thickness H of the first magnetic element 702 may be equal to 0.4.

In some embodiments, when the ratio h/H of the height h of the second annular magnetic element 708 to the thickness H of the first magnetic element 702 is constant, the driving force coefficient BL may first increase and then decrease as the ratio w/R of the thickness w of the first annular magnetic element 706 to the magnetic circuit radius R increases. The ratio w/R corresponding to the maximum driving force coefficient BL may be within a certain range. For example, when the ratio h/H of the height h of the second magnetic element 708 to the thickness H of the first magnetic element 702 is 0.4, if the driving force coefficient BL is maximized, the ratio w/R of the thickness w of the first annular magnetic element 706 to the magnetic circuit radius R may be in the range of 0.08-0.25. When the ratio h/H of the height h of the second magnetic element 708 and the thickness H of the first magnetic element 702 changes, the range of the ratio w/R corresponding to the maximum driving force coefficient BL may change. For example, when the ratio h/H of the height h of the second magnetic element 708 to the thickness H of the first magnetic element 702 is 0.72, if the driving force coefficient BL is maximized, the ratio w/R of the thickness w of the first annular magnetic element 706 to the magnetic circuit radius R may be in the range of 0.04-0.20. More descriptions of the value range of the ratio w/R of the thickness w of the first annular magnetic element 706 to the magnetic circuit radius R corresponding to the maximum driving force coefficient BL may be found in FIG. 7C to FIG. 7E.

Figure 7C:
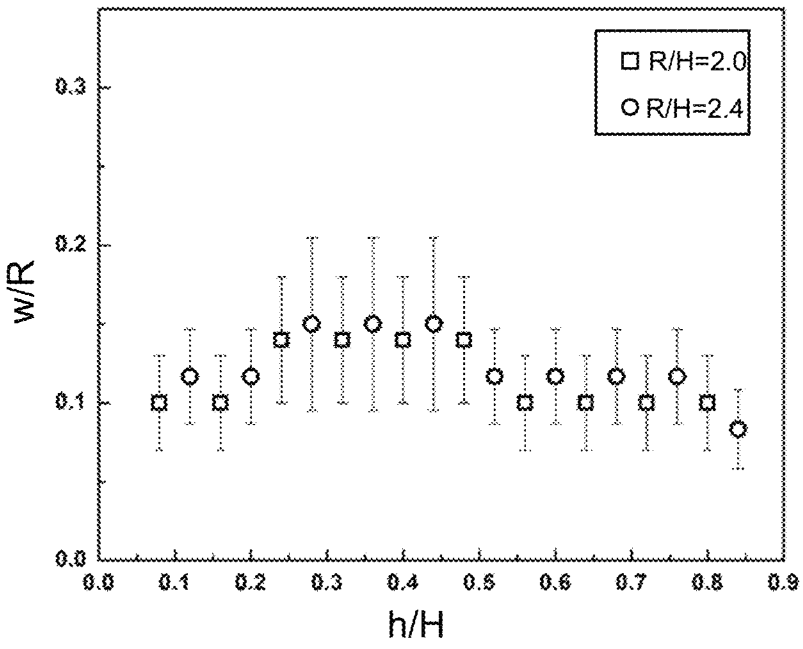
Figure 7D:
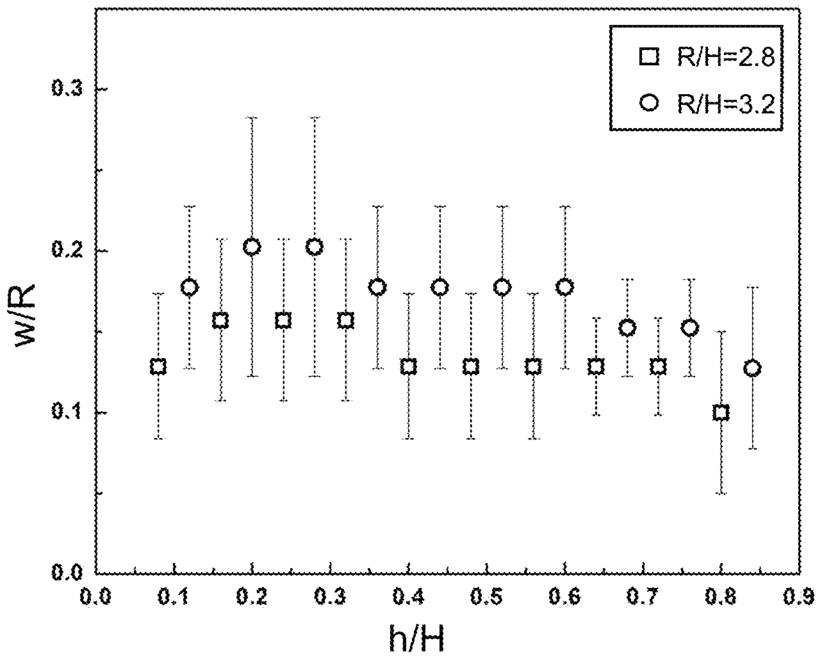
Figure 7E:
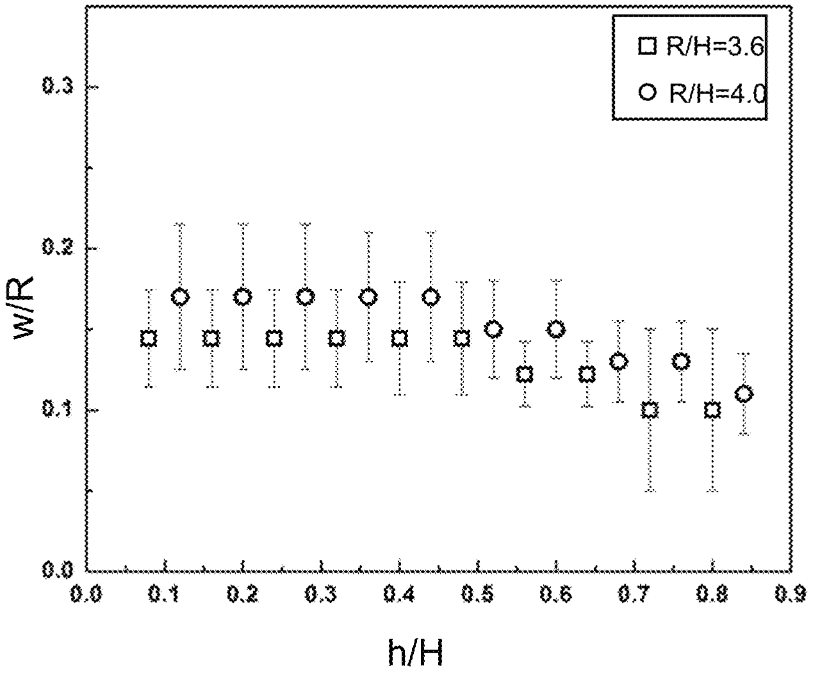

FIG. 7C to FIG. 7E are schematic diagrams illustrating the relationship curves between the driving force coefficient at the voice coil 720 and parameters of the magnetic circuit assembly in FIG. 7A according to some embodiments of the present disclosure. As shown in FIG. 7C to FIG. 7E, the driving force coefficient BL of the voice coil 720 located in the magnetic circuit assembly 7000 varies with the parameter R/H, w/R, and h/H of the magnetic circuit assembly 7000. As shown in FIG. 7C, when the ratio R/H of the magnetic circuit radius R to the thickness H of the first magnetic element 702 is 2.0 and 2.4, if the driving force coefficient BL is maximized, the ratio w/R of the thickness w of the first annular magnetic element 706 to the magnetic circuit radius R may be in a range of 0.05-0.20, or 0.05-0.15, or 0.05-0.25, or 0.1-0.25, or 0.1-0.18. As shown in FIG. 7D, when the ratio R/H of the magnetic circuit radius R to the thickness H of the first magnetic element 702 is 2.8 and 3.2, if the driving force coefficient BL is maximized, the ratio w/R of the thickness w of the first annular magnetic element 706 to the magnetic circuit radius R may be in the range of or 0.1-0.20, or 0.05-0.30, or 0.10-0.25. As shown in FIG. 7E, when the ratio R/H of the magnetic circuit radius R to the thickness H of the first magnetic element 702 is 3.6 and 4.0, if the driving force coefficient BL is maximized, the ratio w/R of the thickness w of the first annular magnetic element 706 to the magnetic circuit radius R may be in the range of 0.05-0.20, or 0.10-0.15, or 0.05-0.25, or 0.10-0.20.

With reference to FIG. 7C to FIG. 7E, when the ratio h/H of the height h of the second annular magnetic element 708 to the thickness H of the first magnetic element 702 is 0.4, if the driving force coefficient BL is maximized, the ratio w/R of the thickness w of the first annular magnetic element 706 to the magnetic circuit radius R may be in the range of 0.15-0.20, or 0.16-0.18.

Figure 8A:
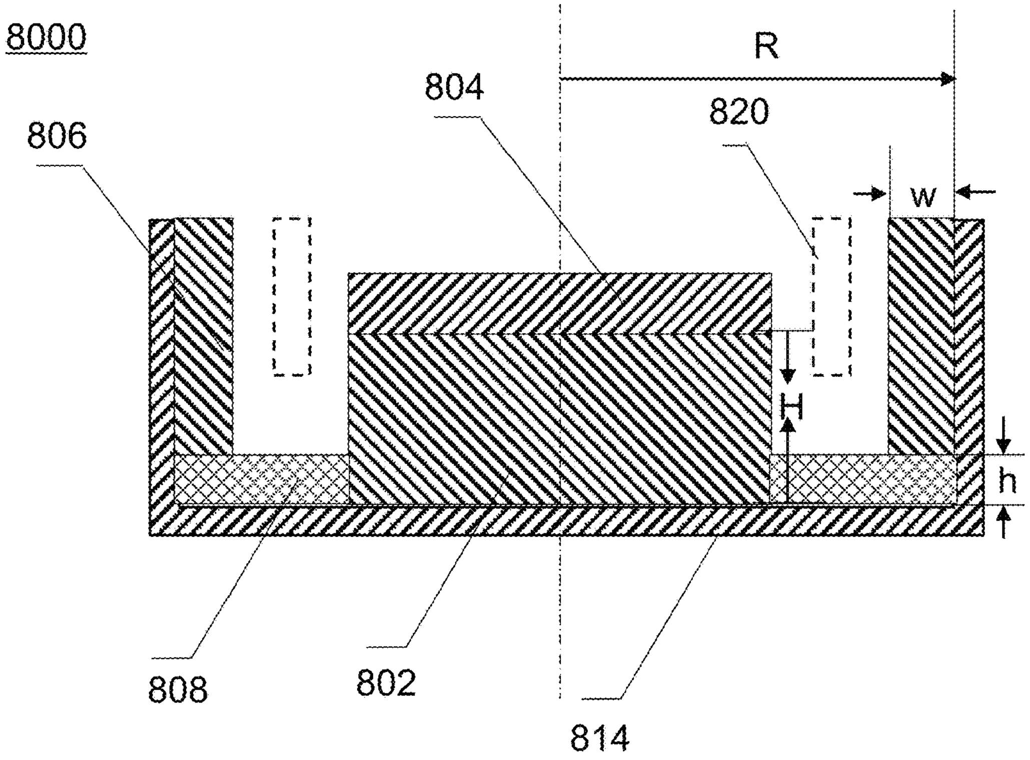
FIG. 8A is a schematic structural diagram illustrating a magnetic circuit assembly according to some embodiments of the present disclosure.

FIG. 8A is a schematic diagram illustrating a magnetic circuit assembly 8000 according to some embodiments of the present disclosure. As shown, the magnetic circuit assembly 8000 may include a first magnetic element 802, a first magnetic guide element 804, a first annular magnetic element 806, a second annular magnetic element 808, and a magnetic shield 814. The first annular magnetic element 806 may also be referred to as the first magnetic field changing element (e.g., the first magnetic field changing element 406 described in FIG. 4A). The first magnetic element 802, the first magnetic guide element 804, the first annular magnetic element 806, the second annular magnetic element 808, the magnetic shield 804 may refer to the present disclosure for detailed descriptions in FIG. 4A, FIG. 4B, FIG. 4C, FIG. 4D, FIG. 4E, FIG. 4F, FIG. 4G, FIG. 4H, and/or FIG. 4M. For example, the first annular magnetic element 806 may be integrally formed of magnetic materials, or may be a combination of a plurality of magnetic elements. The second annular magnetic element 808 may be integrally formed of magnetic materials, or may be a combination of a plurality of magnetic elements. As another example, the magnetic shield 814 may be configured to encompass the first magnetic element 802, the first annular magnetic element 806, and the second annular magnetic element 808. In some embodiments, the magnetic shield 814 may include the baseplate and the side wall, and the side wall may be the ring structure. In some embodiments, the baseplate and the side wall may be integrally formed. The first magnetic element 802, the first magnetic guide element 804, the first annular magnetic element 806, and the second annular magnetic element 808 may form the magnetic circuit and the magnetic gap. The voice coil 820 may be located within the magnetic gap. The voice coil 820 may be in a circular shape or non-circular shape. The non-circular shape may include the oval, the trigon, the quadrangle, the pentagon, other polygons, or other irregular shapes.

The parameters of the magnetic circuit assembly 8000 may include a thickness H of the first magnetic element 802 (as shown in FIG. 8A, i.e., a height H of the first magnetic element 802), the thickness w of the first annular magnetic element 806, the height h of the second annular magnetic element 808, the magnetic circuit radius R, or the like. In some embodiments, the radius R of the magnetic circuit (i.e., magnetic circuit) may be equal to the distance between the central axis of the magnetic circuit assembly 8000 (shown as a dotted line in FIG. 8A) and the outer wall of the first annular magnetic element 806. In some embodiments, the parameters of the magnetic circuit assembly 8000 may also include the ratio of the magnetic circuit radius R to the thickness H of the first magnetic element 802 (may be expressed as R/H), the ratio of the thickness w of the first annular magnetic element 806 to the magnetic circuit radius R (may be expressed as w/R), the ratio of height h of second annular magnetic element 808 to thickness H of first magnetic element 802 (may be expressed as h/H), or the like. In some embodiments, the ratio R/H of the magnetic circuit radius R to the thickness H of the first magnetic element 802 may range from 2.0 to 4.0. For example, the ratio R/H of the magnetic circuit radius R to the thickness H of the first magnetic element 802 may be 2.0, 2.4, 2.8, 3.2, 3.6, and 4.0. The ratio h/H of the height h of the second annular magnetic element 808 to the thickness H of the first magnetic element 802 may not be greater than 0.8, or not greater than 0.6, or not greater than 0.5, and so on. For example, the ratio h/H of the height h of the second annular magnetic element 808 to the thickness H of the first magnetic element 702 may be equal to 0.4. The ratio w/R of the thickness w of the first annular magnetic element 806 to the magnetic circuit radius R may be in a range of 0.02-0.50, or 0.05-0.35, or 0.05-0.25, or 0.1-0.25, or 0.1-0.20. For example, the ratio w/R of the thickness w of the first annular magnetic element 806 to the magnetic circuit radius R may be in the range of 0.16-0.18. When the thickness H of the first magnetic element 802 and the magnetic circuit radius R are constant (e.g., R/H is constant), the two parameters w/R and h/H are optimized, so that the magnetic induction intensity within the magnetic gap and the ampere force of the coil are maximized, i.e., the driving force coefficient BL has the largest value. The relationship between the parameter w/R and h/H and the driving force coefficient BL may be found in FIG. 8B. In some embodiments, in the case of changing R/H, the two parameters w/R and h/H can be optimized, so that the magnetic induction intensity within the magnetic gap and the ampere force of the coil are maximized, i.e., the driving force coefficient BL has the largest value. The relationship between the parameter R/H, w/R, h/H and the driving force coefficient BL may be found in FIG. 8C to FIG. 8E.

Figure 8B:
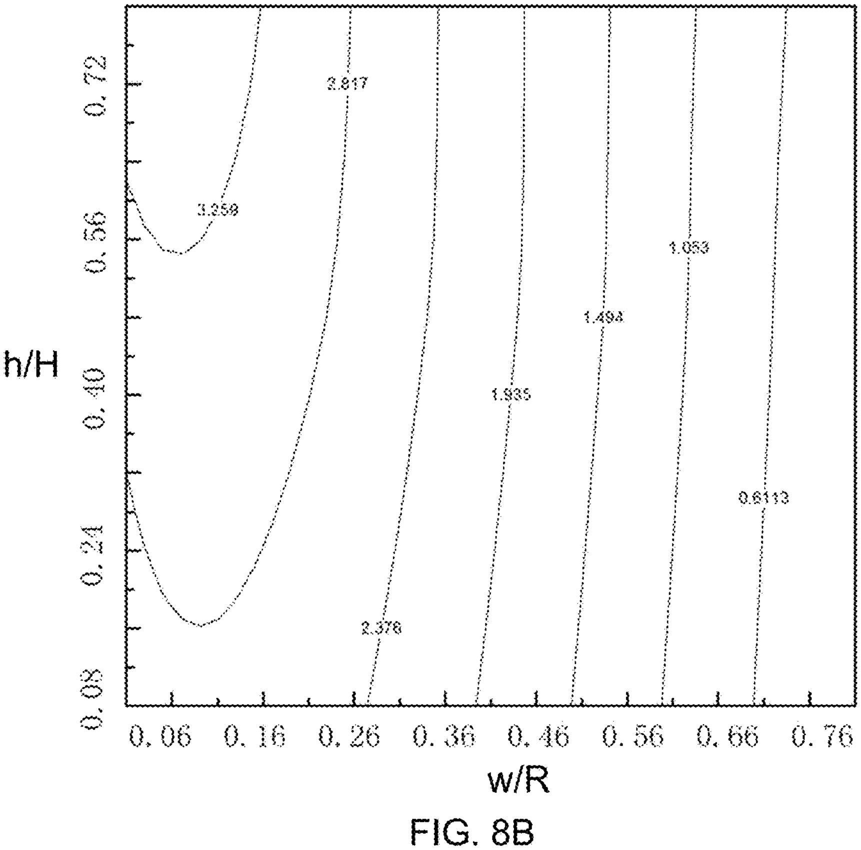
FIG. 8B to FIG. 8E are the relationship curves between the driving force coefficient at the voice coil shown according to some embodiments of the present disclosure and the parameters of the magnetic circuit assembly shown in FIG. 8A.

FIG. 8B is a relationship curve between the driving force coefficient at the voice coil 820 and the parameters of the magnetic circuit assembly in FIG. 8A according to some embodiments of the present disclosure. As shown in FIG. 8B, when the ratio of the magnetic circuit radius R to the thickness H of the first magnetic element 802 is constant (i.e., R/H is constant), the driving force coefficient BL may change with the parameter w/R and h/H. In some embodiments, when the ratio w/R of the thickness w of the first annular magnetic element 806 to the magnetic circuit radius R is constant, the greater the ratio h/H of the height h of the second annular magnetic element 808 to the thickness H of the first magnetic element 802, the larger the driving force coefficient BL. Further, the greater the height h of the second annular magnetic element 808 is, the greater the ratio h/H may be between the height h of the second annular magnetic element 808 and the thickness H of the first magnetic element 702, and the larger the driving force coefficient BL. As shown in FIG. 8B, the ratio h/H of the height h of the second annular magnetic element 808 to the thickness H of the first magnetic element 802 may not be greater than 0.8, or not greater than 0.6, or not greater than 0.5. For example, the ratio h/H of the height h of the second annular magnetic element 808 to the thickness H of the first magnetic element 802 may be equal to 0.4.

In some embodiments, when the ratio h/H of the height h of the second annular magnetic element 808 to the thickness H of the first magnetic element 802 is constant, the driving force coefficient BL may change as the ratio w/R of the thickness w of the first annular magnetic element 806 to the magnetic circuit radius R changes. For example, when the ratio h/H of the height h of the second magnetic element 808 to the thickness H of the first magnetic element 802 is 0.4, the driving force coefficient BL may decrease as the ratio w/R of the thickness w of the first annular magnetic element 806 to the magnetic circuit radius R increases first. When the ratio h/H of the height h of the second magnetic element 808 and the thickness H of the first magnetic element 802 changes, the range of the ratio w/R corresponding to the maximum driving force coefficient BL may change. For example, when the ratio h/H of the height h of the second magnetic element 808 to the thickness H of the first magnetic element 802 is 0.4, if the driving force coefficient BL is maximized, the ratio w/R of the thickness w of the first annular magnetic element 806 to the magnetic circuit radius R may be in the range of 0.02-0.22. When the ratio h/H of the height h of the second annular magnetic element 808 to the thickness H of the first magnetic element 802 is 0.72, if the driving force coefficient BL is maximized, the ratio w/R of the thickness w of the first annular magnetic element 806 to the magnetic circuit radius R may be in the range of 0.02-0.16.

With reference to FIG. 7B, when the parameters R/H, w/R, h/H of the magnetic circuit assembly 8000 and 7000 are the same, the driving force coefficient BL of the voice coil located in the magnetic circuit assembly 8000 with the magnetic shield may be larger than that in the magnetic circuit assembly 7000 without the magnetic shield, i.e., the ampere force of the voice coil located in the magnetic circuit assembly 8000 may be greater than that of the magnetic circuit assembly 7000. For example, as shown in FIG. 7B and FIG. 8B, if w/R and h/H are about 0.21 and 0.4, respectively, the driving force coefficient BL of the voice coil located in the magnetic circuit assembly 8000 may be 2.817, and the driving force coefficient BL of the magnetic circuit assembly 7000 may be 2.376.

Figure 8C:
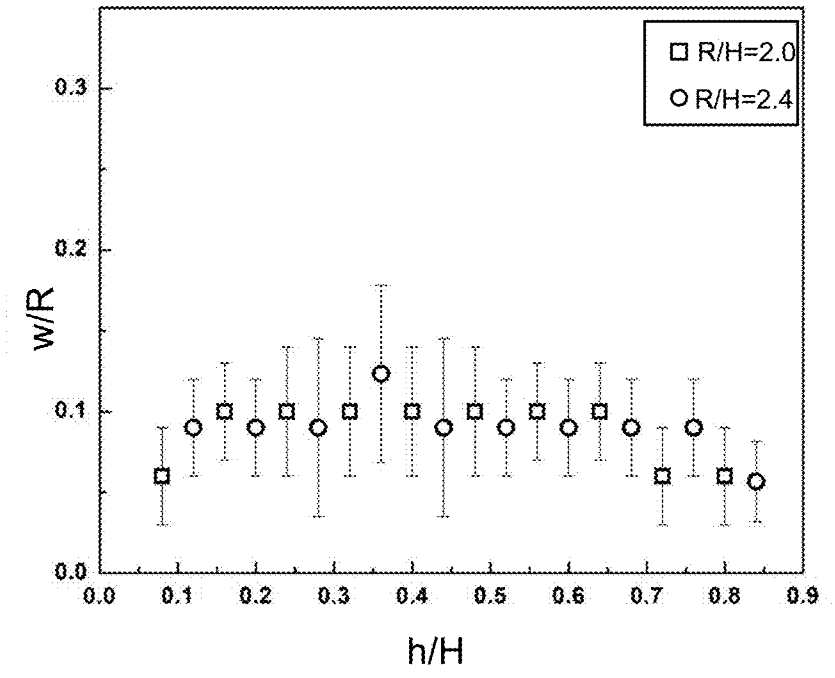
Figure 8D:
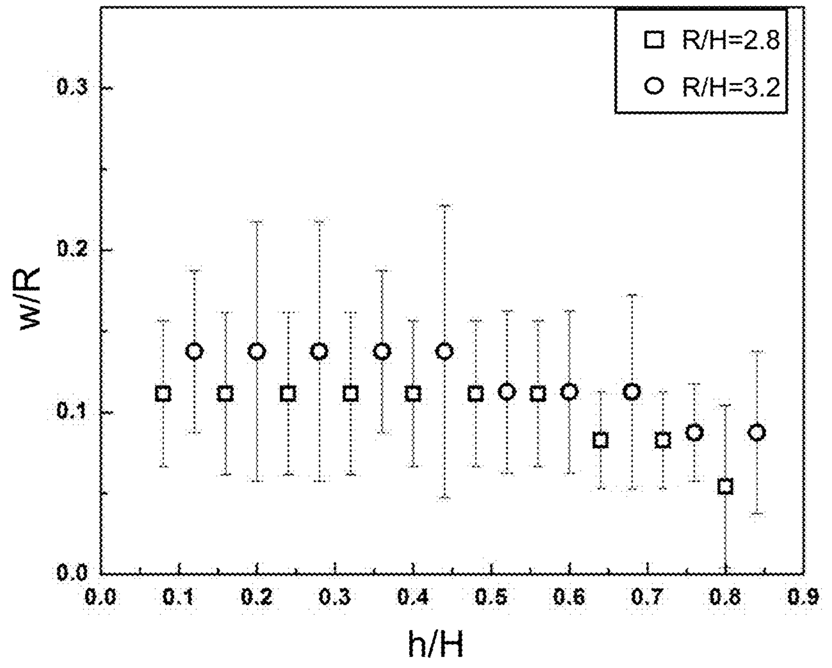
Figure 8E:
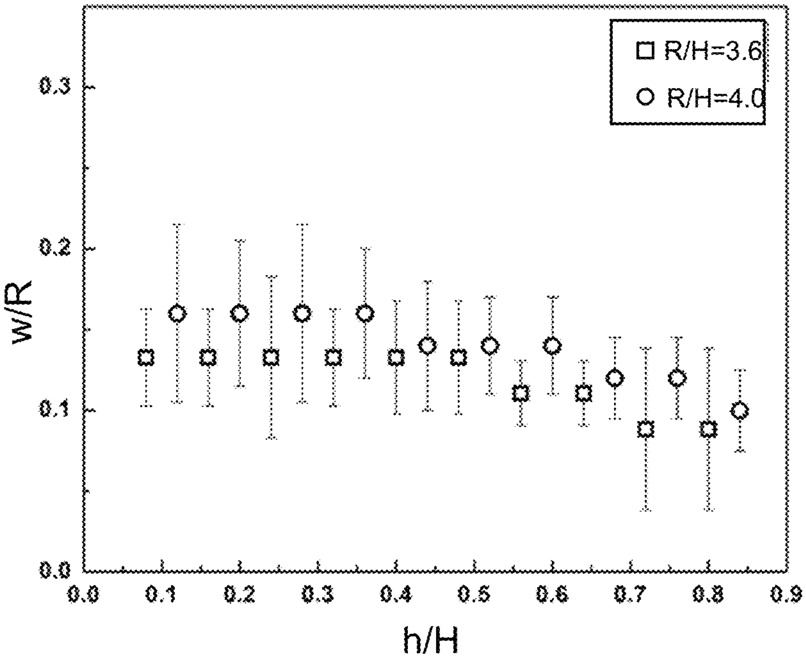

FIG. 8C to FIG. 8E are the relationship curves between the driving force coefficient at the voice coil 820 and the magnetic circuit assembly parameters in FIG. 8A according to some embodiments of the present disclosure. As shown in FIG. 8C to FIG. 8E, the driving force coefficient BL of the voice coil 820 in the magnetic circuit assembly 8000 varies with the parameter R/H, w/R, and h/H of the magnetic circuit assembly 8000. As shown in FIG. 8C, when the ratio R/H of the magnetic circuit radius R to the thickness H of the first magnetic element 802 is 2.0 and 2.4, if the driving force coefficient BL is maximized, the ratio w/R of the thickness w of the first annular magnetic element 806 to the magnetic circuit radius R may be in the range of 0.02-0.15, or or 0.02-0.20. As shown in FIG. 8D, when the ratio R/H of the magnetic circuit radius R to the thickness H of the first magnetic element 802 is 2.8 and 3.2, if the driving force coefficient BL is maximized, the ratio w/R of the thickness w of the first annular magnetic element 806 to the magnetic circuit radius R may be 0.01-0.20, or 0.05-0.15, or 0.02-0.25, or 0.10-0.15. As shown in FIG. 8E, when the ratio R/H of the magnetic circuit radius R to the thickness H of the first magnetic element 802 is 3.6 and 4.0, if the driving force coefficient BL is maximized, the ratio w/R of the thickness w of the first annular magnetic element 806 to the magnetic circuit radius R may be in the range of 0.02-0.20, or 0.05-0.15, or 0.05-0.25, or 0.10-0.20.

With reference to FIG. 8C to FIG. 8E, when the ratio h/H of the height h of the second annular magnetic element 808 to the thickness H of the first magnetic element 802 is 0.4, if the driving force coefficient BL is maximized, the ratio w/R of the thickness w of the first annular magnetic element 806 to the magnetic circuit radius R may be in the range of 0.05-0.20 or 0.16-0.18. Comparing FIG. 7C and FIG. 8C, FIG. 7D and FIG. 8D, and FIG. 7E and FIG. 8E, respectively, when the ratio R/H of the magnetic circuit radius R to the thickness H of the first magnetic element 802 is the same, if the driving force coefficient BL is maximized, the ratio w/R of thickness w to the magnetic circuit radius R of the first annular magnetic element 806 in the magnetic component 8000 having the magnetic shield may change along a decreasing trend relative to the magnetic component 7000. For example, when the ratio R/H of the magnetic circuit radius R to the thickness H of the first magnetic element 802 (or 702) is 2.0, if the driving force coefficient BL is maximized, the ratio w/R of the thickness w of the first annular magnetic element 806 in the magnetic component 8000 with the magnetic shield to the magnetic circuit radius R may be in the range of 0.02-0.15. The ratio w/R of the thickness w of the first annular magnetic element 706 in the magnetic component 7000 without the magnetic shield to the magnetic circuit radius R may be in the range of 0.05-0.25.

Figure 9A:
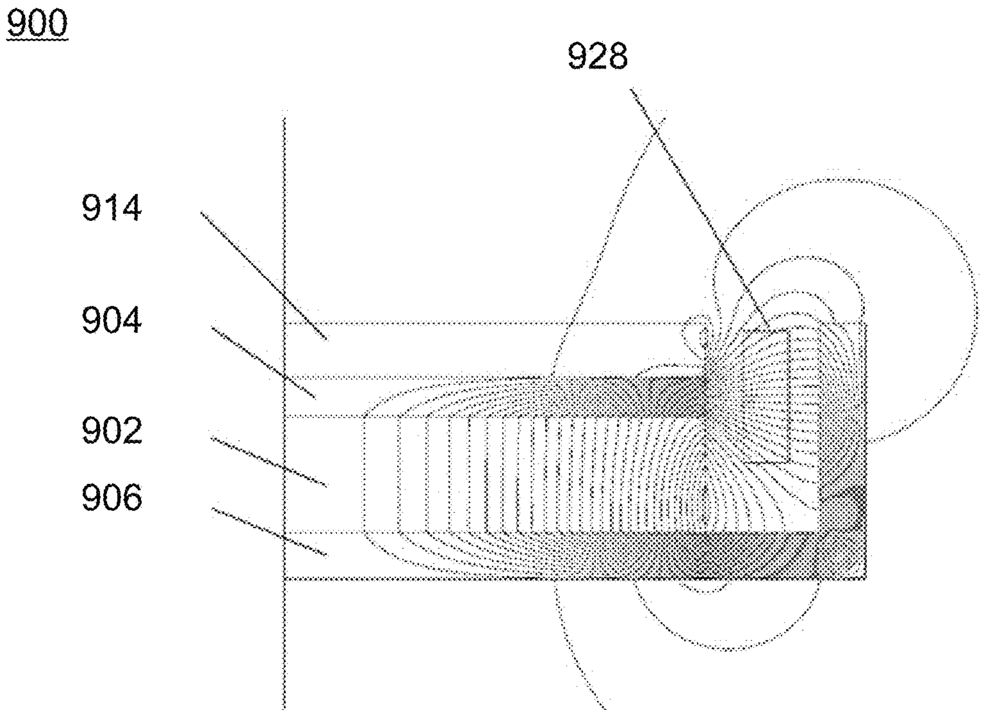
FIG. 9A is a schematic diagram illustrating a distribution of magnetic induction lines of a magnetic circuit assembly according to some embodiments of the present disclosure.

FIG. 9A is a schematic diagram illustrating a distribution of magnetic induction lines of a magnetic circuit assembly 900 according to some embodiments of the present disclosure. As shown, the magnetic circuit assembly 900 may include a first magnetic element 902, a first magnetic guide element 904, a second magnetic guide element 906, and a second magnetic element 914. The first magnetic element 902, the first magnetic guide element 904, the second magnetic guide element 906 and the second magnetic element 914 may be similar to or same as the first magnetic element 302, the first magnetic guide element 304, the second magnetic guide element 306, and the second magnetic element 314, respectively, in FIG. 3D. The magnetization direction of the first magnetic element 902 may be opposite to the magnetization direction of the second magnetic element 914. And magnetic induction lines generated by the first magnetic element 902 may interact with magnetic induction lines generated by the second magnetic element 914, so that more magnetic induction lines generated by the first magnetic element 902 and more magnetic induction lines generated by the second magnetic element 914 may pass through the voice coil 928 perpendicularly, thereby reducing leakage of magnetic lines of the first magnetic element 902 at the voice coil 928.

Figure 9B:
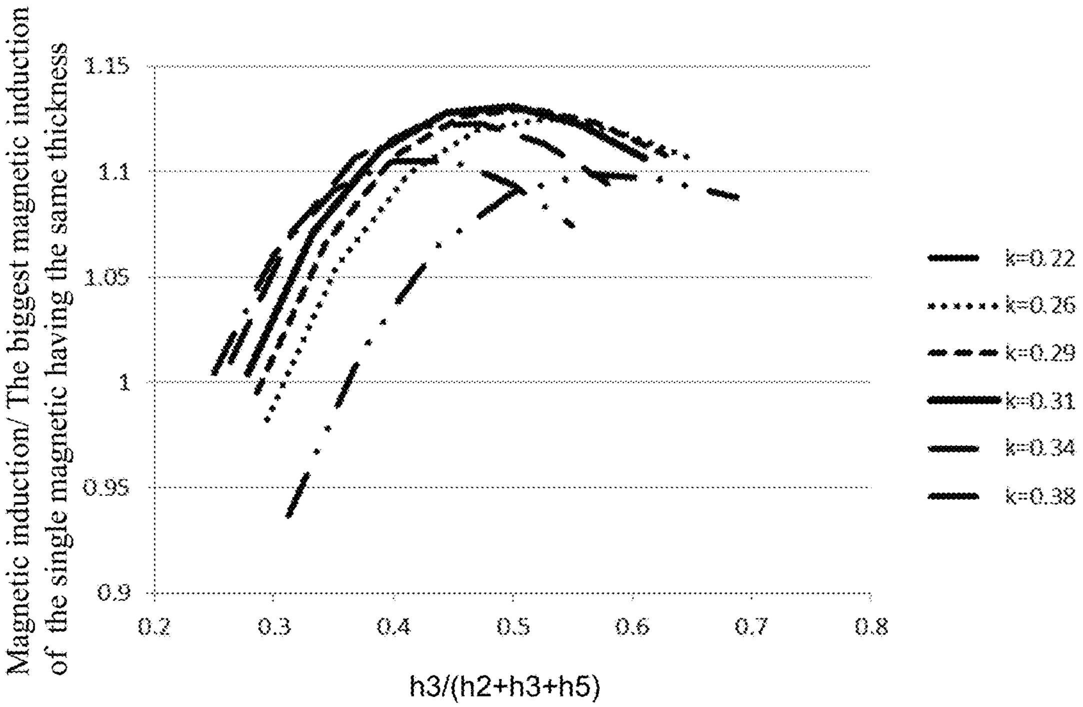
FIG. 9B is a schematic diagram illustrating a relationship curve between a magnetic induction intensity at the voice coil and a thickness of one or more components in the magnetic circuit assembly in FIG. 9A according to some embodiments of the present disclosure.

FIG. 9B is a schematic diagram illustrating a relationship curve between a magnetic induction intensity at the voice coil and a thickness of one or more components in the magnetic circuit assembly 900 in FIG. 9A according to some embodiments of the present disclosure. The abscissa is the ratio of the thickness (denoted by h3) of the first magnetic element 902 to the sum (i.e., h2+h3+h5) of the thickness h3 of the first magnetic element 902, the thickness of the first magnetic guide element 904 (denoted by h2), and the thickness of the second magnetic element 914 (denoted by h5), which may also be referred to as a first thickness ratio. The ordinate is the normalized magnetic induction intensity at the voice coil 928. The normalized magnetic induction intensity may be the ratio of the actual magnetic induction intensity at the voice coil 928 to the largest magnetic inductive intensity a magnetic circuit is formed by a magnetic circuit assembly including one single magnetic element (also referred to as a single magnetic circuit assembly). For example, the single magnetic circuit assembly may include the first magnetic element, the first magnetic guide element, and the second magnetic guide element. The volume of the magnetic element in the single magnetic circuit assembly may be equal to the sum of the volumes of the magnetic elements in a multiple magnetic circuit assembly including multiple magnetic elements (e.g., the first magnetic element 902 and the second magnetic element 914 in magnetic circuit assembly 900) corresponding to the single magnetic circuit assembly. The k is a ratio of the thickness h2 of the first magnetic guide element 904 to the sum (h2+h3+h5) of the thicknesses of the first magnetic element 902, the first magnetic guide element 904, and the second magnetic element 914, which may also be referred to as a second thickness ratio (indicated by "k" in FIG. 9B). As shown, as the first thickness ratio gradually increases, the magnetic induction intensity at the voice coil 928 may gradually increase, and may gradually decrease after reaching a certain value, i.e., the magnetic induction intensity at the voice coil 928 may have a maximum value, and a range of the first thickness ratio corresponding to the maximum value of the magnetic induction intensity may be between 0.4 and 0.6. The range of the second thickness ratio corresponding to the maximum value of the magnetic induction intensity may be between 0.26-0.34.

Figure 10A:
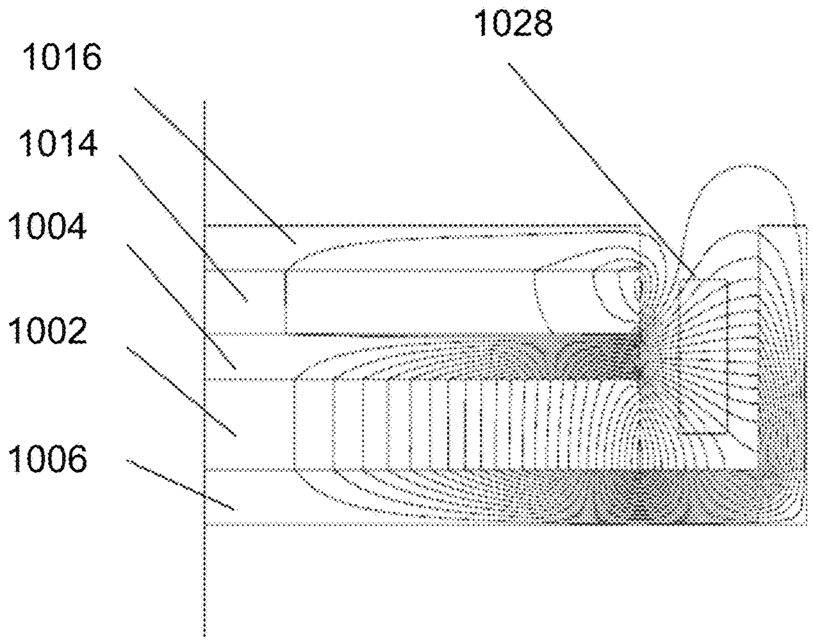
FIG. 10A is a schematic diagram illustrating a magnetic induction line distribution of a magnetic circuit assembly according to some embodiments of the present disclosure.

FIG. 10A is a schematic diagram illustrating a magnetic induction line distribution of a magnetic group 1000 according to some embodiments of the present disclosure. As shown, the magnetic circuit assembly 1000 may include a first magnetic element 1002, a first magnetic guide element 1004, a second magnetic guide element 1006, a second magnetic element 1014, and a third magnetic guide element 1016. The first magnetic element 1002, the first magnetic guide element 1004, the second magnetic guide element 1006, the second magnetic element 1014, and the third magnetic guide element 1016 may be same or similar to the first magnetic element 302, the first magnetic guide element 304, the second magnetic guide element 306, the second magnetic element 308, the second magnetic element 314 and the third magnetic guide element 316 in FIG. 3E of the present disclosure. The third magnetic guide element 1016 may not be connected to the second magnetic guide element 1006. The magnetization direction of the first magnetic element 1002 may be opposite to the magnetization direction of the second magnetic element 1014. The magnetic induction lines generated by the first magnetic element 1002 interact with the magnetic induction lines generated by the second magnetic element 1014 so that the magnetic induction lines generated by the first magnetic element 1002 and the magnetic induction lines generated by the second magnetic element 1014 may pass through the voice coil 1028 more perpendicularly, thereby reducing the leaked magnetic induction lines of the first magnetic element 1002 at the voice coil 1028. The third magnetically permeable plate 1016 may further reduce the leakage magnetic lines of the first magnetic element 1002 at the voice coil 1028.

Figure 10B:
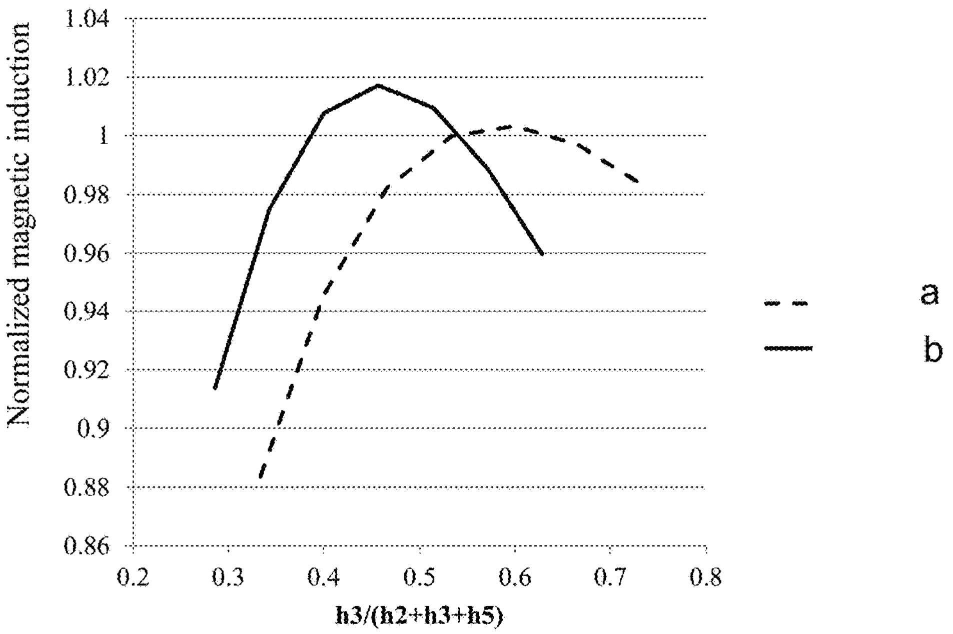
FIG. 10B is a relationship curve between magnetic induction intensity at the voice coil and the thickness of each element in the magnetic circuit assembly in FIG. 10A according to some embodiments of the present disclosure.

FIG. 10B is a relationship curve between magnetic induction intensity at a voice coil and the thickness of a component in a magnetic circuit assembly according to some embodiments of the present disclosure. The curve a corresponds to the magnetic circuit assembly 900 in FIG. 9A, and the curve b corresponds to the magnetic circuit assembly 1000 in FIG. 10A. The abscissa may be the first thickness ratio, and the ordinate may be the normalized magnetic induction intensity at the voice coil 928 or 1028. The first thickness ratio and the normalized magnetic induction intensity may be described in detail in FIG. 9B of the present disclosure. The curve a may be the relationship between the magnetic induction intensity of the voice coil 928 in the magnetic circuit assembly 900 and the first thickness ratio, and curve b may be the relationship between the magnetic induction intensity of the voice coil 1028 in the magnetic circuit assembly 1000 and the first thickness ratio. As shown in FIG. 10B, a magnetic circuit assembly 1000 of a third magnetic guide element 1016 is provided. When the range of the first thickness is between 0-0.55, the magnetic induction intensity at voice coil 1028 is significantly stronger than the magnetic induction intensity at voice coil 928 (e.g., the magnetic induction intensity corresponding to curve b is higher than the magnetic induction intensity corresponding to curve a). When the range of the first thickness ratio is between 0.55-1, the magnetic induction intensity at voice coil 1028 is significantly lower than the magnetic induction intensity at voice coil 928 (e.g., the magnetic induction intensity corresponding to curve b is lower than the magnetic induction intensity corresponding to curve a).

Figure 11A:
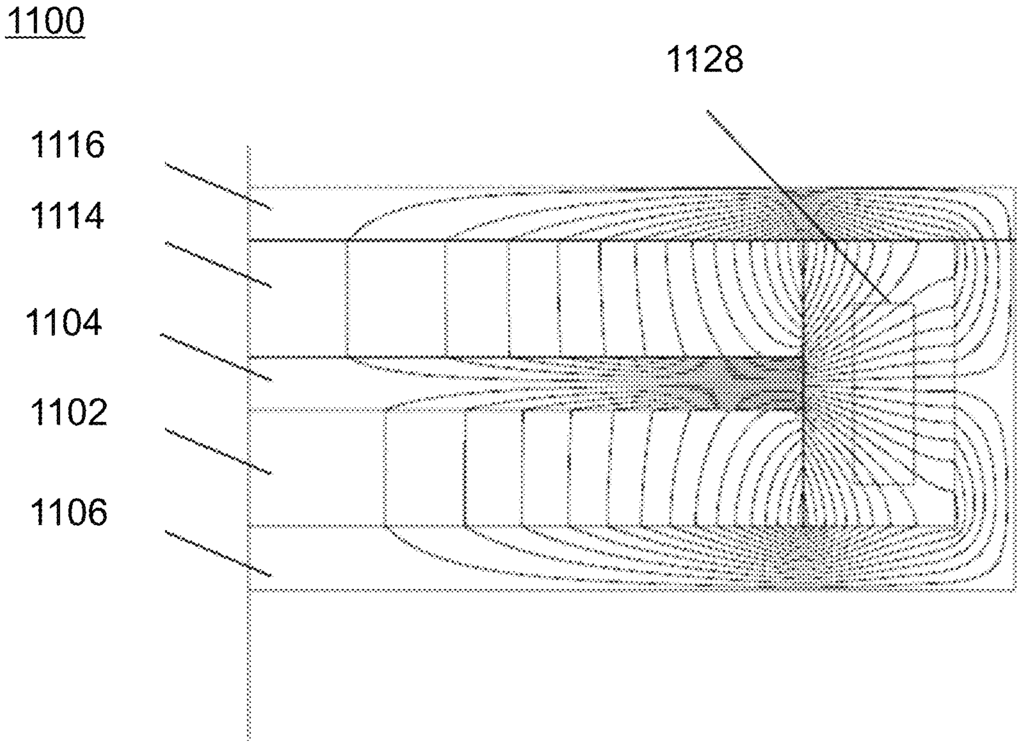
FIG. 11A is a schematic diagram illustrating a magnetic induction line distribution of a magnetic circuit assembly according to some embodiments of the present disclosure.

FIG. 11A is a schematic diagram illustrating a magnetic induction line distribution of a magnetic circuit assembly 1100 according to some embodiments of the present disclosure. As shown, the magnetic circuit assembly 1100 may include a first magnetic element 1102, a first magnetic guide element 1104, a second magnetic guide element 1106, a second magnetic element 1114, and a third magnetic guide element 1116. The first magnetic element 1102, the first magnetic guide element 1104, the second magnetic guide element 1106, the second magnetic element 1114, and the third magnetic guide element 1116 may be similar to or same as the first magnetic element 302, the first magnetic guide element 304, the second magnetic guide element 306, the second magnetic element 308, the fifth magnetic element 314, and the third magnetic guide element 316, respectively, in FIG. 3E. The third magnetic guide element 1116 may be physically connected with the second magnetic guide element 1106. The magnetization direction of the first magnetic element 1102 may be opposite to the magnetization direction of the second magnetic element 1114. The magnetic field of the first magnetic element 1102 and the magnetic field of the second magnetic element 1114 may be mutually exclusive at the junction of the first magnetic element 1102 and the second magnetic element 1114, so that the magnetic field that is originally divergent may pass through the voice coil 1128 under the effect of the mutually exclusive magnetic field (e.g., a magnetic field generated only by the first magnetic element 1102 or a magnetic field generated only by the second magnetic element 1114), thereby increasing the magnetic field strength at 1128 of the voice coil. The third magnetically conductive plate 1116 may be physically connected with the second magnetic guide element 1106, so that the magnetic field of the second magnetic element 1114 and the first magnetic element 1102 is bound to a magnetic circuit formed by the second magnetic guide element 1106 and the third magnetic guide element 1116, thereby further increasing the magnetic induction intensity at 1128 of the voice coil.

Figure 11B:
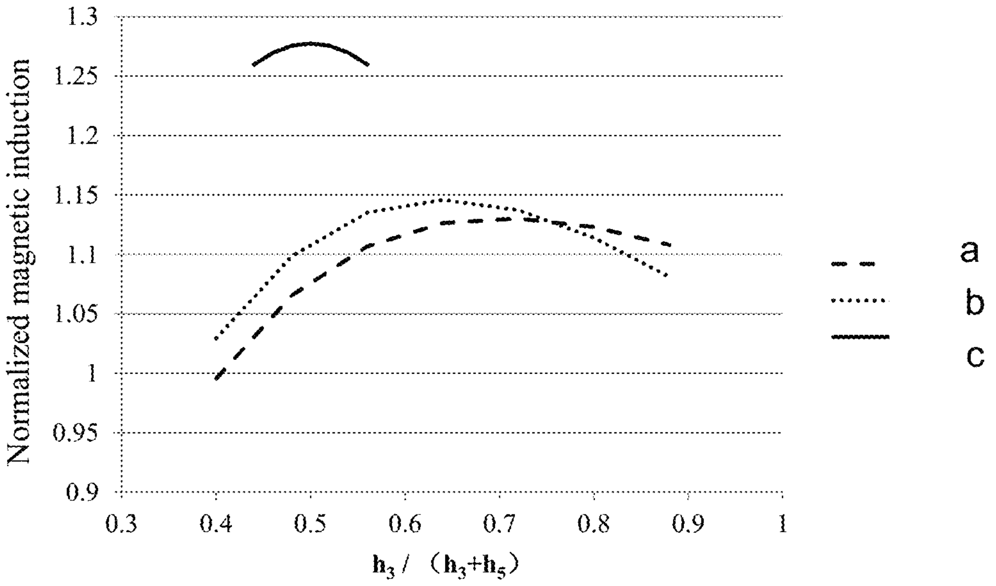
FIG. 11B is a relationship curve between magnetic induction intensity and magnetic element thickness of the magnetic circuit assembly in FIG. 9A, FIG. 10A, and FIG. 11A according to some embodiments of the present disclosure.

FIG. 11B is a relationship curve between the magnetic induction intensity and the thickness of each element in the magnetic circuit assembly according to some embodiments of the present disclosure. The curve a corresponds to the magnetic circuit assembly 900 in FIG. 9A. The curve b corresponds to the magnetic circuit assembly 1000 in FIG. 10A. The curve c corresponds to the magnetic circuit assembly 1100 shown in FIG. 11A. The abscissa may be the ratio of the thickness (h3) of the first magnetic element (902, 1002, 1102) to the sum (h3+h5) of the thickness of the first magnetic element (902, 1002, 1102) and the second magnetic element (914, 1014, 1114). Hereinafter referred to as the third thickness ratio. The ordinate may be the normalized magnetic induction intensity at the voice coil (928, 1028, 1128). For the normalized magnetic induction intensity may be found in FIG. 9B of the present disclosure. The curve a may be the relationship between the magnetic induction intensity of the voice coil 928 in the magnetic circuit assembly 900 and the first thickness ratio. The curve b may be the relationship between the magnetic induction intensity of the voice coil 1028 in the magnetic circuit assembly 1000 and the first thickness ratio. The curve c may be the relationship between the magnetic induction intensity of the voice coil 1128 in the magnetic circuit assembly 1100 and the first thickness ratio. As shown in FIG. 11B, the magnetic circuit assembly 1000 and 1100 including a third magnetic guide element (e.g., a magnetic guide element 1014, a magnetic guide element 1114), in the case that the first thickness is less than 0.7, the magnetic induction intensity at the corresponding voice coil (e.g., voice coil 1028, voice coil 1128) may be stronger than the magnetic induction intensity at voice coil 928 in magnetic circuit assembly 900 that does not contain a third magnetic guide element (e.g., the magnetic induction intensity corresponding to curve b and curve c is higher than the magnetic induction intensity corresponding to curve a). When the third magnetic guide element and the second magnetic guide element are connected to each other (e.g., the third magnetic guide element 1116 and the second magnetic guide element 1106 in the magnetic circuit assembly 1100 are connected to each other), the magnetic induction intensity at voice coil 1128 may be stronger than the magnetic induction intensity at voice coil 1028 (e.g., the magnetic induction intensity corresponding to curve c is higher than the magnetic induction intensity corresponding to curve b).

Figure 11C:
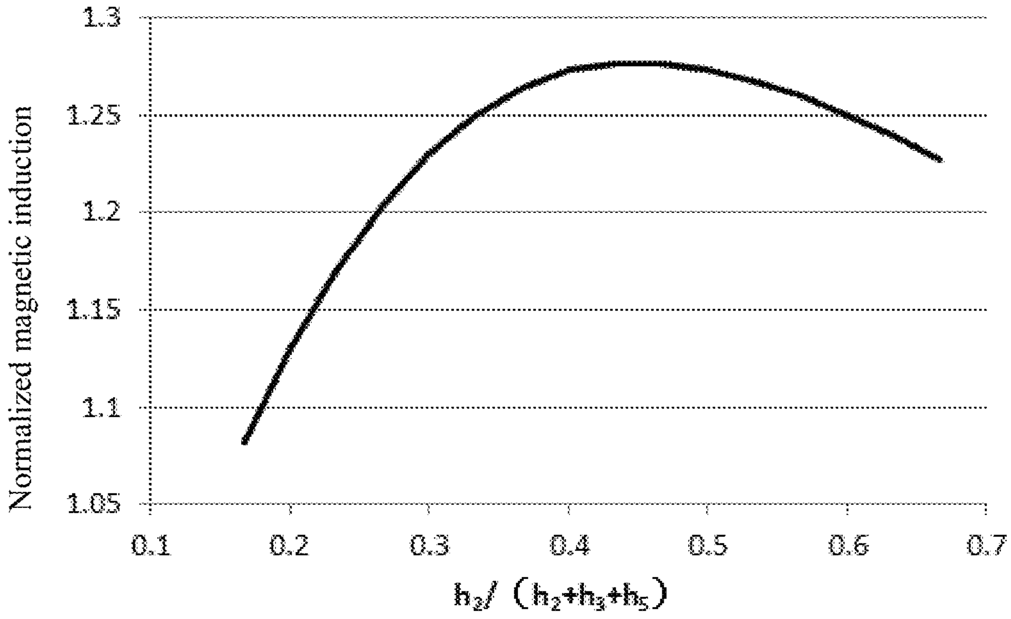
FIG. 11C is a relationship curve between magnetic induction intensity at the voice coil and the thickness of each component in the magnetic circuit assembly in FIG. 11A according to some embodiments of the present disclosure.

FIG. 11C is a relationship curve between magnetic induction intensity at the voice coil and the element thickness in the magnetic circuit assembly 1100 shown in FIG. 11A according to some embodiments of the present disclosure. The abscissa may be the second thickness ratio (represented by "h2/(h2+h3+h5)" in the figure). The ordinate may be the normalized magnetic induction intensity at the voice coil 1128, and the second thickness ratio and the normalized magnetic induction intensity may be found in FIG. 9B of the present disclosure. As shown in FIG. 11C, as the second thickness ratio gradually increases, the magnetic induction intensity at the voice coil 1128 gradually increases to a maximum value and then decreases. The range of the second thickness ratio corresponding to the maximum value of the magnetic induction intensity may be between 0.3-0.6.

Figure 12A:
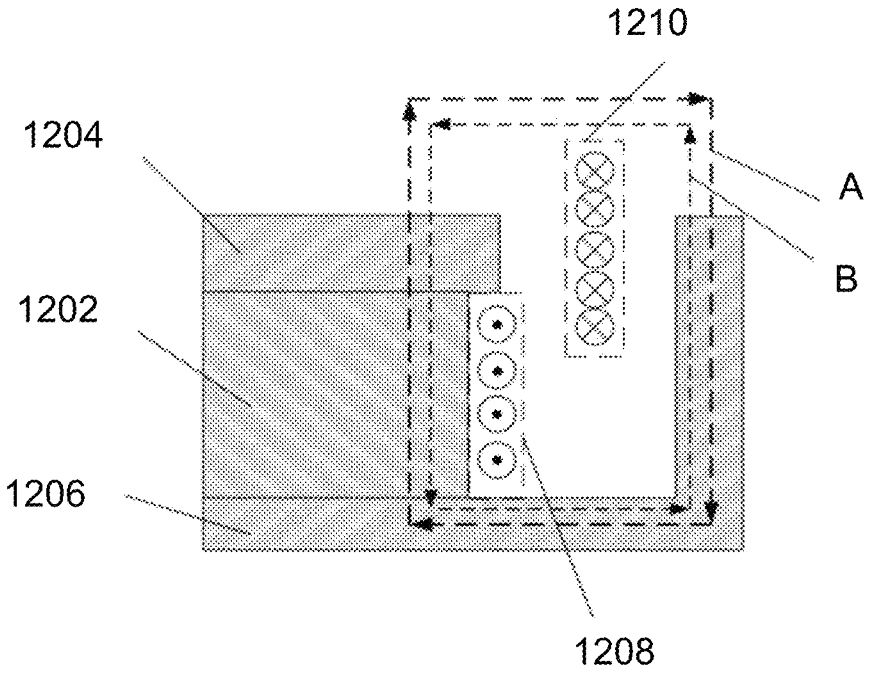
FIG. 12A is a structural schematic diagram illustrating a magnetic circuit assembly according to some embodiments of the present disclosure.

FIG. 12A is a schematic diagram illustrating a magnetic circuit assembly 1200 according to some embodiments of the present disclosure. As shown, the magnetic circuit assembly 1200 may include a first magnetic element 1202, a first magnetic guide element 1204, a second magnetic guide element 1206, and a first conductive element 1208. More descriptions for the first magnetic element 1202, the first magnetic guide element 1204, the second magnetic guide element 1206, and the first conductive element 1208 may be found elsewhere in the present disclosure (e.g., FIGS. 3A-3G, and the descriptions thereof). For example, the first magnetic element 1202, the first magnetic guide element 1204, the second magnetic guide element 1206, and the first conductive element 1208 may be similar to or same as the first magnetic element 302, the first magnetic guide element 304, the second magnetic guide element 306, and the second magnetic element 308, respectively as described in FIGS. 3A-3G. In some embodiments, the first conductive element 1204 may have an overhang portion above the first magnetic element 1202. The overhang portion of the first conductive element 1204, the first magnetic element 1202, and the second magnetic guide element 1206 may form a first concave portion, and the first conductive element 1208 may be located in the first concave portion and connected with the first magnetic element 1202.

The first magnetic element 1202, the first magnetic guide element 1204, and the second magnetic guide element 1206 may form a magnetic gap. A voice coil 1210 may be located within the magnetic gap. The cross-sectional shape of the voice coil 1210 may be in a circular shape or non-circular shape, such as the oval, the rectangle, the square, the pentagon, other polygons, or other irregular shapes. In some embodiments, an alternating current may flow into the voice coil 1210. The direction of the alternating current may be perpendicular to the paper surface and point to the paper surface as shown in FIG. 12A. In the magnetic circuit formed by the first magnetic element 1202, the first magnetic guide element 1204, and the second magnetic guide element 1206, the voice coil 1210 may generate an alternating induction magnetic field A (also referred to as a "first alternating induction magnetic field") under the action of a magnetic field in the magnetic circuit. The direction of the induction magnetic field A may be counterclockwise as shown in FIG. 12A. The alternating induction magnetic field A may cause a reverse induction current in the voice coil 1210, thereby reducing the current in the voice coil 1210. The first conductive element 1208 may generate an alternating induced current under the action of the alternating induction magnetic field A. Under the action of the magnetic field in the magnetic circuit, the alternating induced current may generate an alternating induction magnetic field B (also referred to as a "second alternating induction magnetic field"). The direction of the induction magnetic field B may be counterclockwise as shown in FIG. 12A. Because the direction of the induction magnetic field A and the direction of the induction magnetic field B are opposite, the reverse induction current in the voice coil 1210 may be reduced, i.e., the inductive reactance caused by the reverse induction current in the voice coil 1210 may be reduced, and the current in the voice coil 1210 may be increased.

The above description of the magnetic circuit assembly 1200 may be only a specific example and should not be considered as the only feasible implementation. Obviously, for those skilled in the art, after understanding the basic principle of bone conduction speaker, it is possible to make various modifications and changes in form and detail to the specific manner and steps of implementing the magnetic circuit assembly 1200 without departing from this principle, but these modifications and changes are still within the scope described above. For example, the first conductive element 1208 may be provided near the voice coil 1210, such as near the inner wall, the outer wall, the upper surface and/or lower surface of the voice coil 1210.

Figure 12B:
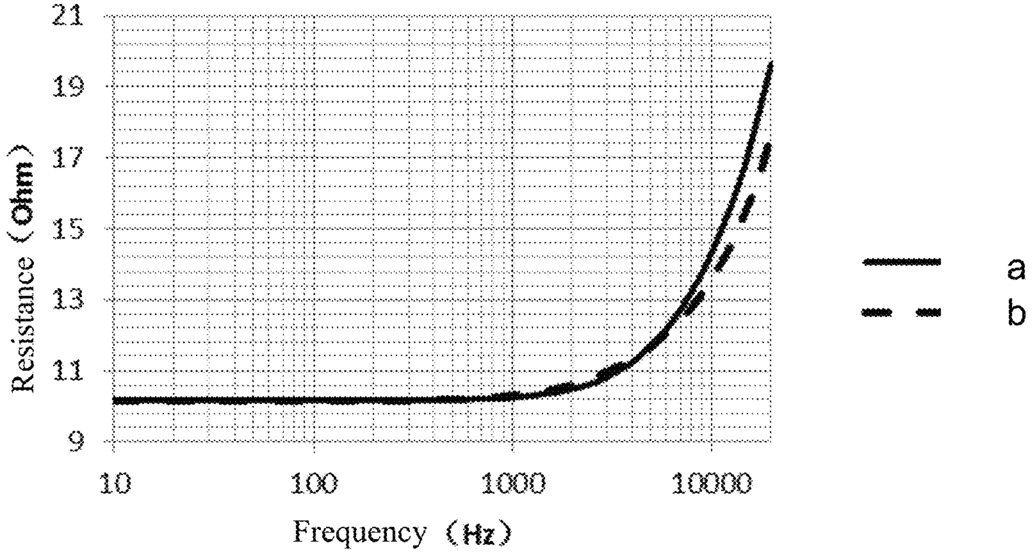
FIG. 12B is a relationship curve between the inductive reactance in the voice coil and the conductive element in the magnetic circuit assembly shown in FIG. 12A according to some embodiments of the present disclosure.

FIG. 12B is a schematic diagram illustrating a curve indicating an effect of the conductive elements on the inductive reactance in the voice coil in the magnetic circuit assembly 1200 in FIG. 12A according to some embodiments of the present disclosure. The curve a corresponds to the magnetic circuit assembly 1200 that does not include the first conductive element 1208, and the curve b corresponds to the magnetic circuit assembly 1200 that includes the first conductive element 1208. The abscissa represents the alternating current frequency in the voice coil 1210, and the ordinate represents the inductive reactance in the voice coil 1210. As shown in FIG. 12B, the inductive reactance in the voice coil 1210 may increase as the alternating current frequency increases, especially, after the alternating current frequency exceeds 1200 HZ. When the first conductive element 1208 is provided in the magnetic circuit assembly 1200, the inductive reactance in the voice coil may significantly be lower than the inductive reactance in the voice coil when the first conductive element 1208 is not provided in the magnetic circuit assembly 1200 (e.g., the inductive reactance corresponding to curve b is lower than the inductive reactance corresponding to curve a when the alternating current frequency is the same).

Figure 13A:
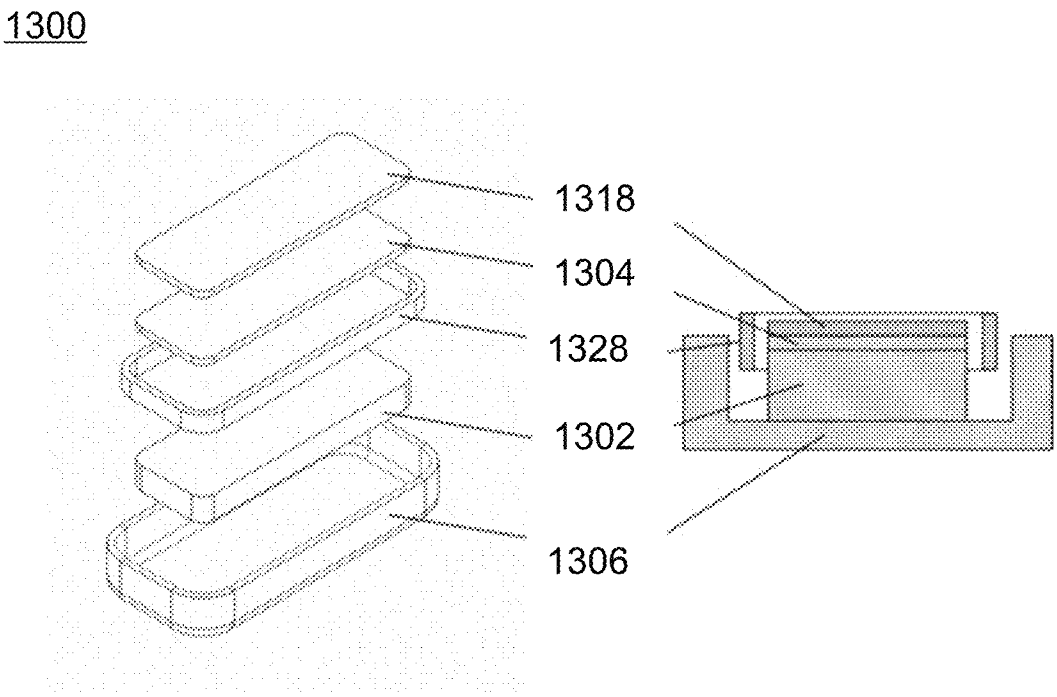
FIG. 13A is a schematic structural diagram illustrating a magnetic circuit assembly according to some embodiments of the present disclosure.

FIG. 13A is a schematic structural diagram illustrating a magnetic circuit assembly 1300 according to some embodiments of the present disclosure. As shown, the magnetic circuit assembly 1300 may include a first magnetic element 1302, a first magnetic guide element 1304, a second magnetic guide element 1306, and a first conductive element 1318. The first magnetic element 1302, the first magnetic guide element 1304, the second magnetic guide element 1306, and the first conductive element 1318 may refer to related descriptions in the present disclosure. The first conductive element 1318 may be physically connected with the upper surface of the first magnetic guide element 1304. The shape of the first conductive element 1318 may be in the sheet shape, the annular shape, the mesh shape, the orifice plate, or the like.

The first magnetic element 1302, the magnetic gap may be configured between the first magnetic guide element 1304 and the second magnetic guide element 1306. A voice coil 1328 may be located within the magnetic gap. The cross-sectional shape of the voice coil 1328 may be in a circular shape or non-circular shape. The non-circular shape may include the oval, the trigon, the quadrangle, the pentagon, other polygons, or other irregular shapes.

The above description of the magnetic circuit assembly 1300 may be only a specific example, and should not be considered as the only feasible implementation solution. Obviously, for those skilled in the art, after understanding the basic principles of magnetic circuit assembly, it is possible to make various modifications and changes in form and detail to the specific manner and steps of implementing magnetic circuit assembly 1300 without departing from this principle, but these modifications and changes are still within the scope described above. For example, the first conductive element 1318 may be provided near the voice coil 1328, such as the inner wall, the outer wall, the upper surface and/or lower surface of the voice coil 1328.

Figure 13B:
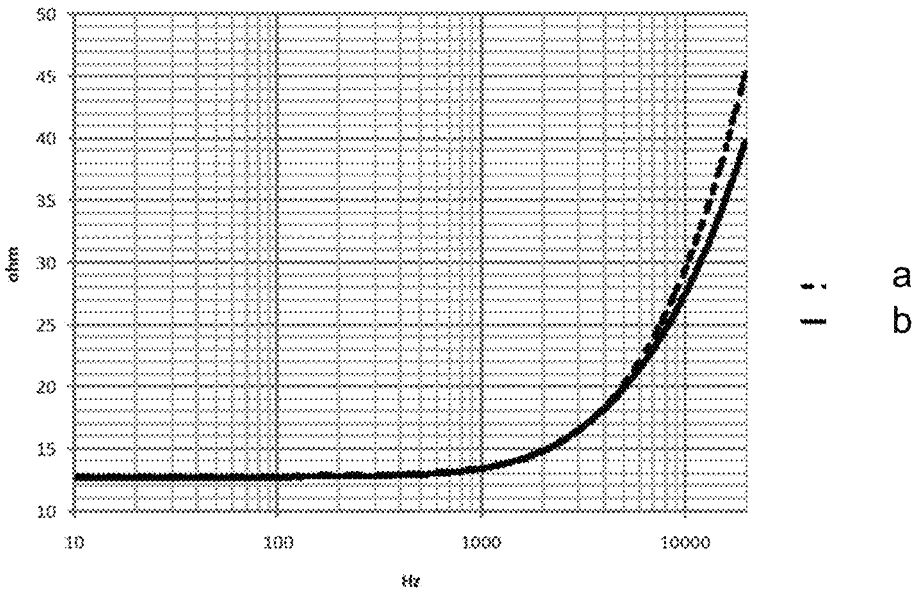
FIG. 13B is a relationship curve between the inductive reactance in the voice coil and the conductive element in the magnetic circuit assembly in FIG. 13A according to some embodiments of the present disclosure.

FIG. 13B is an influence curve of the magnetic guide element on the inductive reactance in the voice coil in the magnetic circuit assembly 1300 in FIG. 13A according to some embodiments of the present disclosure. The curve a corresponds to the magnetic circuit assembly 1300 without the first conductive element 1318, and the curve b corresponds to the magnetic circuit assembly 1300 with the first conductive element 1318. The abscissa may be the alternating current frequency in the voice coil 1110, and the ordinate may be the inductive reactance in the voice coil 1110. As shown in FIG. 13B, the inductive reactance in the voice coil 1110 may increase as the frequency of the alternating current increases, especially, after the alternating current frequency exceeds 1200 HZ. When the first conductive element 1318 is provided in the magnetic circuit assembly 1300, the inductive reactance in the voice coil 1110 may significantly be lower than the inductive reactance in the voice coil when the first conductive element 1318 is not provided in the magnetic circuit assembly 1300 (e.g., the inductive reactance corresponding to curve b is lower than the inductive reactance corresponding to curve a when the alternating current frequency is the same).

Figure 14A:
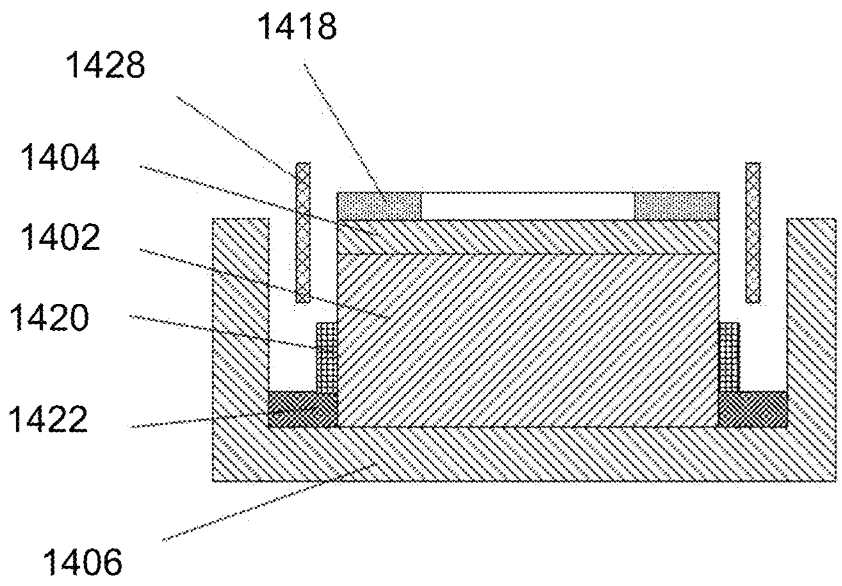
FIG. 14A is a schematic structural diagram illustrating a magnetic circuit assembly according to some embodiments of the present disclosure.

FIG. 14A is a schematic structural diagram illustrating a magnetic circuit assembly 1400 according to some embodiments of the present disclosure. As shown, the magnetic circuit assembly 1400 may include a first magnetic element 1402, a first magnetic guide element 1404, a second magnetic guide element 1406, a first conductive element 1418, a second conductive element 1420, and a third conductive element 1422. The first magnetic element 1402, the first magnetic guide element 1404, the second magnetic guide element 1406, the first conductive element 1418, the second conductive element 1420, and the third conductive element 1422 may be found in FIG. 3F of the present disclosure. The magnetic gap may be configured between the first magnetic element 1302, the first magnetic guide element 1304, and the second magnetic guide element 1306. A voice coil 1428 may be located within the magnetic gap. The cross-sectional shape of the voice coil 1428 may be in a circular shape or non-circular shape. The non-circular shape may include the oval, the trigon, the quadrangle, the pentagon, other polygons, or other irregular shapes.

The above description of the magnetic circuit assembly 1400 may be only a specific example, and should not be considered as the only feasible implementation solution. Obviously, for those skilled in the art, after understanding the basic principles of magnetic circuit assembly, it is possible to make various modifications and changes in the form and details of the specific means and steps of implementing the magnetic circuit assembly 1400 without departing from this principle, but these modifications and changes are still within the scope described above. For example, the first conductive element 1418 may be provided near the voice coil 1428, such as the inner wall, the outer wall, the upper surface and/or lower surface of the voice coil 1428.

Figure 14B:
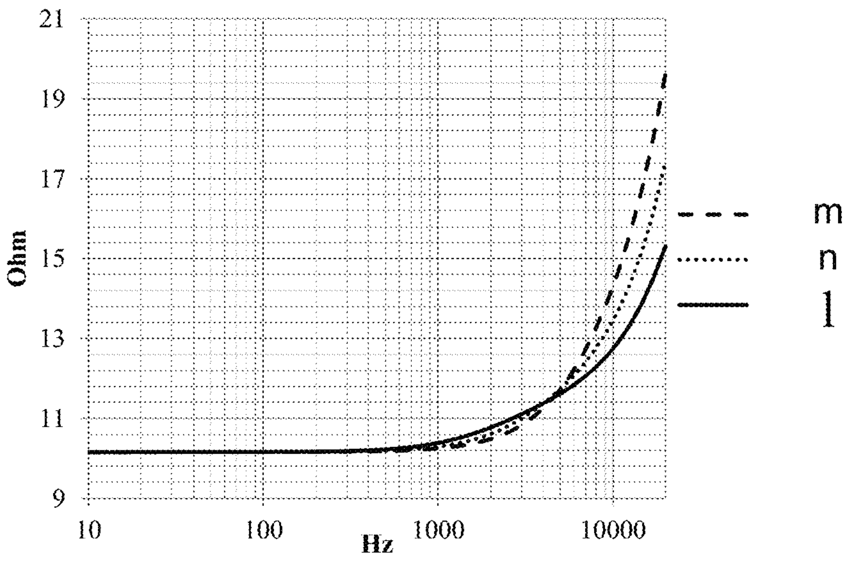
FIG. 14B is a relationship curve between the inductive reactance in the voice coil and the number of conductive elements in the magnetic circuit assembly shown in FIG. 14A according to some embodiments of the present disclosure.

FIG. 14B is an influence curve of the number of conductive elements in the magnetic circuit assembly 1420 in FIG. 14A on the inductive reactance in the voice coil according to some embodiments of the present disclosure. The curve m corresponds to a magnetic circuit assembly without a conductive element. The curve n corresponds to a magnetic circuit assembly provided with a conductive element (such as the magnetic circuit assembly 1200 shown in FIG. 12A). The curve l corresponds to a magnetic circuit assembly (such as the magnetic circuit assembly 1400 shown in FIG. 14A) in which a plurality of conductive elements may be provided. The abscissa may be the frequency of the alternating current in the voice coil, and the ordinate may be the inductive reactance in the voice coil. As shown in FIG. 14B, when the alternating current frequency increases to about 1200 HZ, the inductive reactance in the voice coil may increase with the increase of the alternating current frequency. With one or more conductive elements, the inductive reactance in the voice coil may significantly be lower than the inductive reactance in the voice coil when no conductive element is provided (e.g., the inductive reactance corresponding to curves n and l is lower than the inductive reactance corresponding to curve m). When a plurality of conductive elements is provided in the magnetic circuit assembly 1400, the inductive reactance in the voice coil may significantly be lower than the inductive reactance in the voice coil when a conductive element is provided (such as the inductive reactance corresponding to curve l is lower than the inductive reactance corresponding to curve n).

Figure 15A:
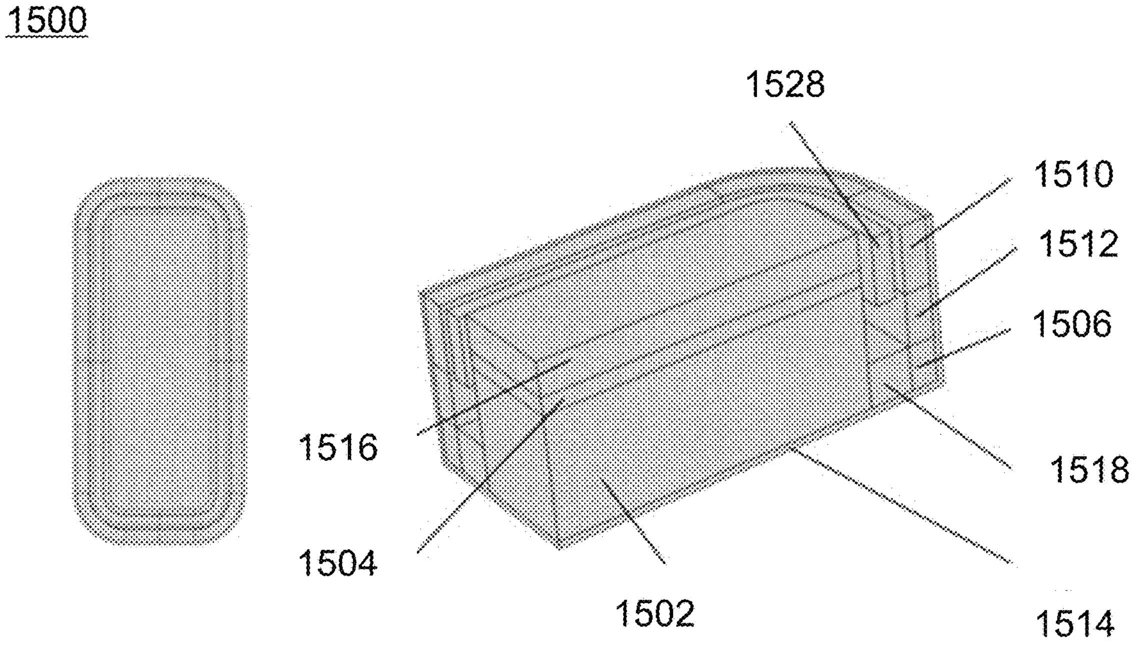
FIG. 15A is a schematic structural diagram illustrating a magnetic circuit assembly according to some embodiments of the present disclosure.

FIG. 15A is a schematic diagram illustrating a magnetic circuit assembly 1500 according to some embodiments of the present disclosure. As shown, the magnetic circuit assembly 1500 may include a first magnetic element 1502, a first magnetic guide element 1504, a first annular element 1506, a first annular magnetic element 1508, a second annular magnetic element 1510, a third annular magnetic element 1512, a magnetic shield 1514, and a second magnetic element 1516. The first magnetic element 1502, the first magnetic guide element 1504, the first ring element 1506, the first annular magnetic element 1508, the second annular magnetic element 1510, the third annular magnetic element 1512, the magnetic shield 1514, and the second magnetic element 1516 may be same as or similar to the first magnetic element 402, the first magnetic guide element 404, the first magnetic field changing element 406, the second magnetic element 408, the third magnetic element 410, the fourth magnetic element 412, and the magnetic shield 414, respectively as described in FIGS. 4A-4M. The first magnetic element 1502, the first magnetic guide element 1504, the first ring element 1506, the first annular magnetic element 1508, the second annular magnetic element 1510, the third annular magnetic element 1512, the magnetic shield 1514, and the second magnetic element 1516 may be found in FIG. 4A, FIG. 4B, FIG. 4C, FIG. 4D, FIG. 4E, FIG. 4F, FIG. 4G, FIG. 4H, and/or FIG. 4M.

The first magnetic element 1502, the first magnetic guide element 1504, the second magnetic element 1516, the second annular magnetic element 1510, and/or the third annular magnetic element 1512 may form a magnetic gap. A voice coil 1528 may be located within the magnetic gap. The voice coil 1528 may be in a circular shape or a non-circular shape. The non-circular shape may include the oval, the trigon, the quadrangle, the pentagon, other polygons, or other irregular shapes.

The above description of the magnetic circuit assembly 1500 may be only a specific example, and should not be regarded as the only feasible implementation solution. Obviously, for those skilled in the art, after understanding the basic principles of magnetic circuit assembly, it is possible to make various modifications and changes in the form and details of the specific means and steps of implementing the magnetic circuit assembly 1500 without departing from this principle, but these modifications and changes are still within the scope described above. For example, the magnetic circuit assembly 1500 may further include one or more conductive elements, which may be provided near the voice coil 1528, such as the inner wall, the outer wall, the upper surface, and/or lower surface of the voice coil 1528. In some embodiments, the conductive element may be physically connected with the first magnetic element 1502, the second magnetic element 1516, the first annular magnetic element 1508, the second annular magnetic element 1510, and/or the third annular magnetic element 1512. As another example, the magnetic circuit assembly 1500 may further include a third magnetic guide element, and the third magnetic guide element may be physically connected with the second magnetic element 1516.

Figure 15B:
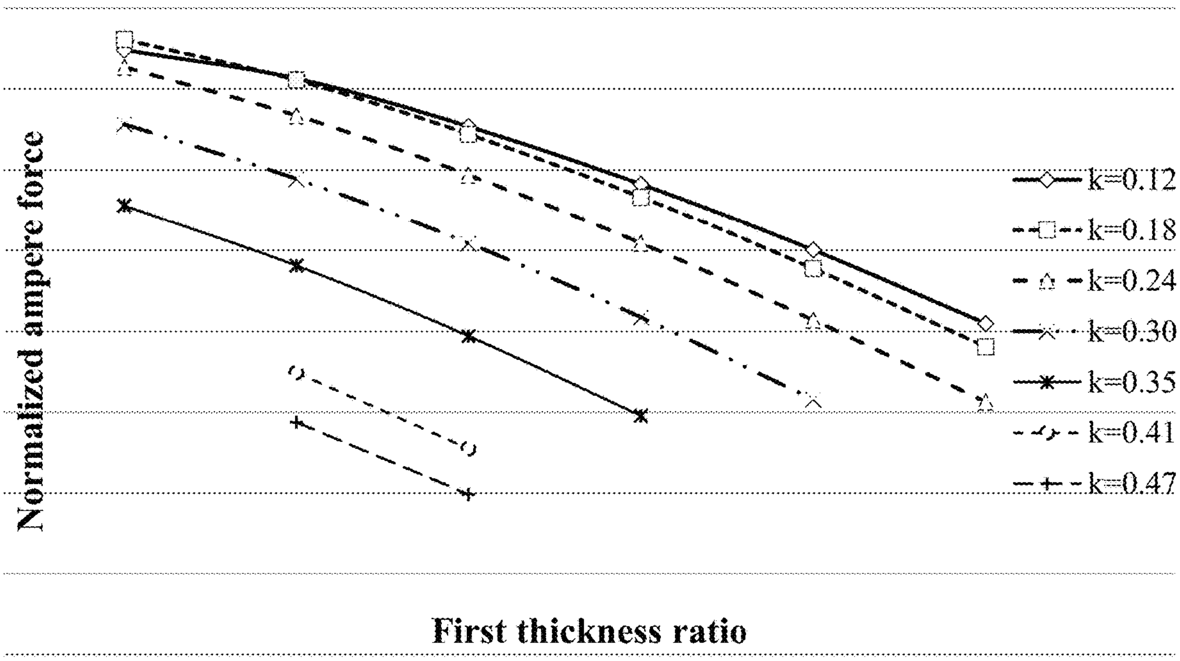
FIG. 15B is a relationship curve between the ampere force on the voice coil and the thickness of each element in the magnetic circuit assembly shown in FIG. 15A according to some embodiments of the present disclosure.

FIG. 15B is a schematic diagram illustrating a relationship curve between the ampere force on the voice coil and the thickness of one or more magnetic elements in the magnetic circuit assembly 1500 in FIG. 15A according to some embodiments of the present disclosure. The abscissa represents the first thickness ratio, and the ordinate represents the normalized ampere force received by the voice coil. The normalized ampere force may refer to a ratio of an actual ampere force on the voice coil located in the magnetic circuit assembly 1500 to a maximum ampere force on the voice coil located in single magnetic circuit assembly that includes one single magnetic element (also referred to as single magnetic circuit assembly). For example, the single magnetic circuit assembly may include the first magnetic element, the first magnetic guide element, and the second magnetic guide element. The volume of the first magnetic element in the single magnetic circuit assembly may be the same as the sum of volumes of the first magnetic element 1502 and the second magnetic element 1516 in the magnetic circuit assembly 1500. A first thickness ratio may be defined by the ratio of the thickness of the first magnetic element 1502 to the sum of thicknesses of the first magnetic element 1502, the first magnetic guide element 1504, and the second magnetic element 1516 and a second thickness ratio denoted by k in FIG. 15B may be defined by a ratio of the thickness of the first magnetic guide element 1504 to the sum of the thicknesses of the first magnetic element 1502, the first magnetic guide element 1504, and the second magnetic element 1516. As shown in FIG. 15B, for any value of the second thickness ratio k, the ordinate value exceeds 1, i.e., in the magnetic circuit assembly 1500, the ampere force on the voice coil 1528 may exceed the ampere force on the voice coil located in the single magnetic circuit assembly. When the second thickness ratio k remains unchanged, as the first thickness ratio increases, the ampere force on the voice coil 1528 located in the magnetic circuit assembly 1500 may gradually decrease. When the first thickness ratio remains unchanged, as the second thickness ratio k decreases, the ampere force on the voice coil 1528 located in the magnetic circuit assembly 1500 may gradually increase. When the range of the first thickness ratio is between 0.1-0.3 or the range of the second thickness ratio k is between 0.2-0.7, the ampere force on the voice coil 1528 located in the magnetic circuit assembly 1500 may be 50%-60% higher than the ampere force of the voice coil located in the single magnetic circuit assembly.

Figure 16:
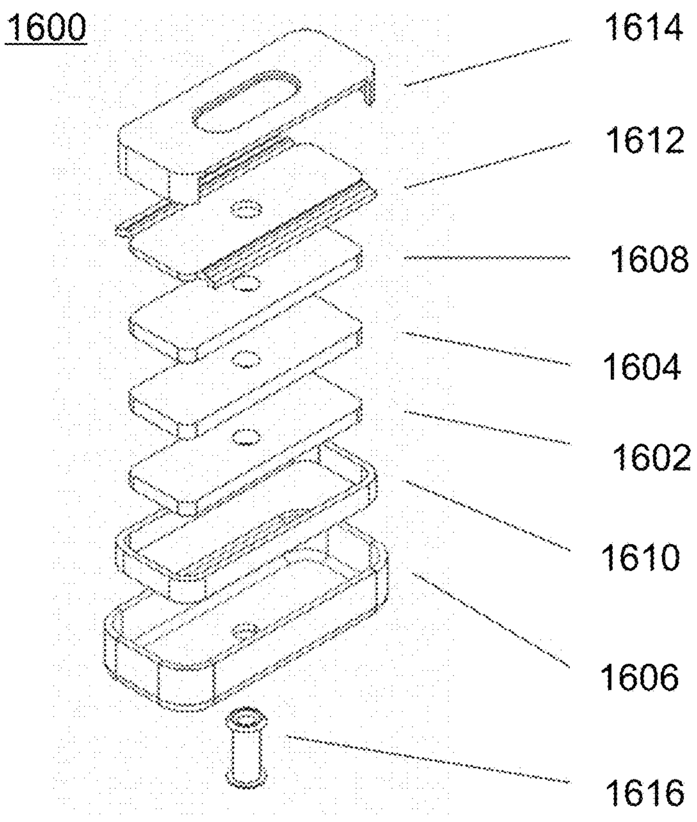
FIG. 16 is a schematic structural diagram illustrating a bone conduction speaker according to some embodiments of the present disclosure.

FIG. 16 is a schematic diagram illustrating a bone conduction speaker 1600 according to some embodiments of the present disclosure. As shown, the bone conduction speaker 1600 may include a first magnetic element 1602, a first magnetic guide element 1604, a second magnetic guide element 1606, a second magnetic element 1608, a voice coil 1610, a third magnetic guide element 1612, a bracket 1614, and a connector 1616. More descriptions for the first magnetic element 1602, the first magnetic guide element 1604, the second magnetic guide element 1606, the second magnetic element 1608, the voice coil 1610, and/or the third magnetic guide element 1612 may be found elsewhere in the present disclosure (e.g., FIGS. 3A-3G, 4A-4M, and 5A-5F, and the descriptions thereof).

The upper surface of the first magnetic element 1602 may be connected with the lower surface of the first magnetic guide element 1604. The lower surface of the second magnetic element 1608 may be connected with the upper surface of the first magnetic guide element 1604. The second magnetic guide element 1606 may include a first baseplate and a first side wall. The lower surface of the first magnetic element 1602 may be connected with the upper surface of the first baseplate. A magnetic gap may be configured between the side wall of the second magnetic guide element 1606, the side wall of the first magnetic element 1602, the first magnetic guide element 1604, and/or the second magnetic element 1608. The bracket 1614 may include a second baseplate and a second side wall. The voice coil 1610 may be located within the magnetic gap. The voice coil 1610 may be connected with the second side wall. A seam may be formed between the voice coil 1610 and the second baseplate. After the voice coil 1610 is located within the magnetic gap, the third magnetic guide element 1612 may pass through the seam to connect with the upper surface of the second magnetic element 1608 and the first side wall of the second magnetic guide element 1606, so that the third magnetic guide element 1612 and the second magnetic guide element 1606 form a closed cavity. The first magnetic element 1602, the first magnetic guide element 1604, the second magnetic guide element 1606, the second magnetic element 1608, the voice coil 1610, and/or the third magnetic guide element 1612 may be connected through one or more of the connection means as described elsewhere in the present disclosure. In some embodiments, one or more holes (e.g., pin holes, threaded holes, etc.) may be provided on the first magnetic element 1602, the first magnetic guide element 1604, the second magnetic guide element 1606, the second magnetic element 1608, the third magnetic guide element 1612, and/or the bracket 1614. The holes may be provided at the center, the periphery, or other positions on the first magnetic element 1602, the first magnetic guide element 1604, the second magnetic guide element 1606, the second magnetic element 1608, the third magnetic guide element 1612, and/or the bracket 1614. The connector 1616 may connect various elements (e.g., the first magnetic element 1602, the first magnetic guide element 1604, the second magnetic guide element 1606, the second magnetic element 1608, the third magnetic guide element 1612, and/or the bracket 1614) through the holes. For example, the connector 1616 may include a pipe pin. The pipe pin may pass through various elements (e.g., the first magnetic element 1602, the first magnetic guide element 1604, the second magnetic guide element 1606, the second magnetic element 1608, the third magnetic guide element 1612, and/or the bracket 1614) through the holes and fix the various elements after being deformed by a punching head through the bracket 1614.

The above description of the bone conduction speaker 1600 may be only a specific example, and should not be regarded as the only feasible implementation solution. Obviously, for those skilled in the art, after understanding the basic principles of magnetic circuit assembly, it is possible to make various modifications and changes in the form and details of the specific means and steps for implementing the bone conduction speaker 1600 without departing from this principle, but these modifications and changes are still within the scope described above. For example, the bone conduction speaker 1600 may include one or more conductive elements provided on the inner side wall, the outer wall, the top, and/or bottom of the voice coil 1610. As another example, the bone conduction speaker 1600 may further include one or more annular magnetic elements, the one or more annular magnetic elements may be physically connected with the upper surface of the second side wall of the second magnetic guide element 1606 or fixed in a magnetic gap.

Figure 17:
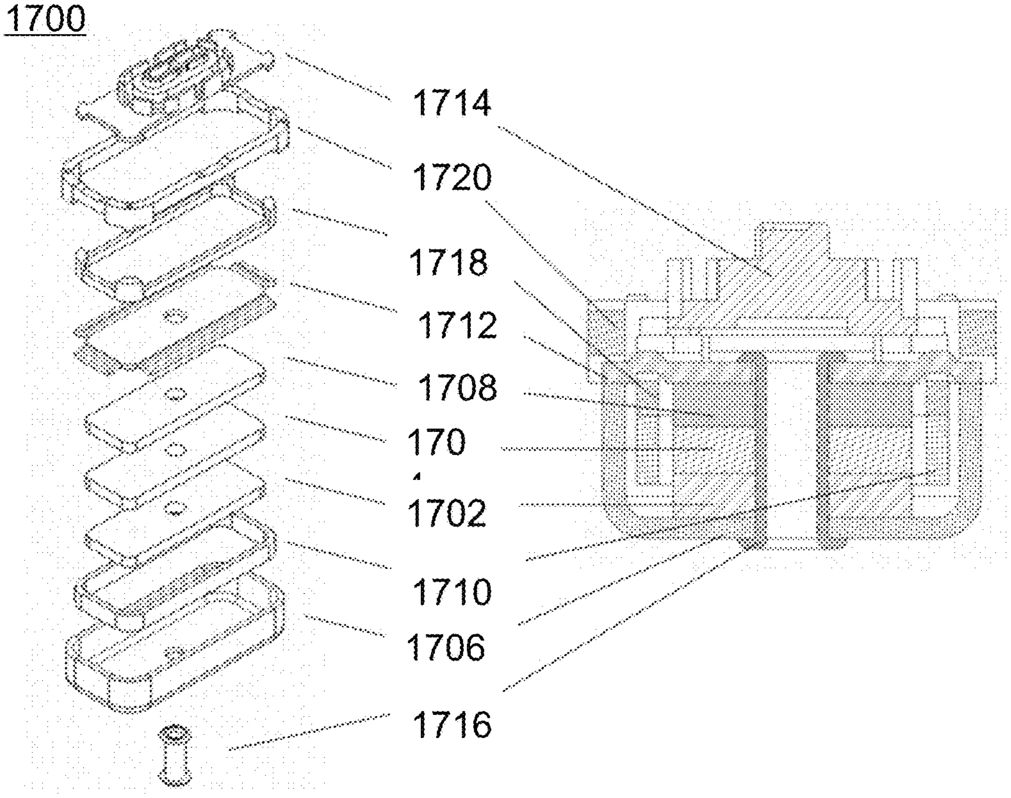
FIG. 17 is a schematic structural diagram illustrating a bone conduction speaker according to some embodiments of the present disclosure.

FIG. 17 is a schematic diagram illustrating a bone conduction speaker 1700 according to some embodiments of the present disclosure. As shown, the bone conduction speaker 1700 may include a first magnetic element 1702, a first magnetic guide element 1704, a second magnetic guide element 1706, a second magnetic element 1708, a voice coil 1710, a third magnetic guide element 1712, a bracket 1714, a connector 1716, a support link 1718, and a washer 1720. The upper surface of the first magnetic element 1702 may be physically connected with the lower surface of the first magnetic guide element 1706. The lower surface of the second magnetic element 1708 may be physically connected with the upper surface of the first magnetic guide element 1706. The second magnetic guide element 1706 may include a first baseplate and a first side wall. The first side wall may be formed by the baseplate extending in a direction perpendicular to the first baseplate. The lower surface of the first magnetic element 1702 may be physically connected with the upper surface of the first baseplate of the second magnetic guide element 1706. A magnetic gap may be configured between the first side wall of the second magnetic guide element 1706, the side surface of the first magnetic element 1702, the first magnetic guide element 1704, and/or the second magnetic element 1708. The support link 1718 may include one or more connecting rods. The voice coil 1710 may be physically connected with the support link 1718. The voice coil 1710 may be located within the magnetic gap. The third magnetic guide element 1712 may include a second baseplate and a second side wall. The second side wall may be formed by extending the second baseplate. The second side wall may be provided with one or more first holes, and the first holes correspond to the connecting rods of the support link 1718. Each of the connecting rods of the support link 1718 may penetrate one of the first holes of the third magnetic guide element 1712. When the voice coil 1710 is located within the magnetic gap, the second side wall of the third magnetic guide element 1712 may be physically connected with the support link 1718 by the connecting rods of the support link 1718 passing through the first holes, and the second baseplate may be physically connected with the upper surface of the second magnetic element 1708. The first magnetic element 1702, the first magnetic guide element 1704, the second magnetic guide element 1706, the second magnetic element 1708, the voice coil 1710, and/or the third magnetic guide element 1712 may be connected through one or more connection means as described elsewhere in the present disclosure. In some embodiments, the first magnetic element 1702, the first magnetic guide element 1704, the second magnetic guide element 1706, the second magnetic element 1708, the third magnetic guide element 1712, and/or the bracket 1714 may be provided with one or more second holes in the center, the periphery, or other positions. The connector 1716 may connect various elements (e.g., the first magnetic element 1702, the first magnetic guide element 1704, the second magnetic guide element 1706, the second magnetic element 1708, the third magnetic guide element 1712, and/or the bracket 1714) through the holes. For example, the connector 1716 may include a pipe pin. The pipe pin may pass through various elements (e.g., the first magnetic element 1702, the first magnetic guide element 1704, the second magnetic guide element 1706, the second magnetic element 1708, the third magnetic guide element 1712, and/or the bracket 1714) through the holes and fix the various elements after being deformed by a punching head through the bracket 1714. The bracket 1714 may be connected with the support link 1718, and the washer 1720 may be further connected with the second side wall of the third magnetic guide element 1712 and the first side wall of the second magnetic guide element 1706, thereby further fixing the second magnetic guide element 1706 and the third magnetic guide element 1712. In some embodiments, the washer 1720 may be physically connected with the bracket 1714 through a vibration plate.

The above description of the bone conduction speaker 1700 may be only a specific example, and should not be considered as the only feasible implementation solution. Obviously, for those skilled in the art, after understanding the basic principles of magnetic circuit assembly, it is possible to make various modifications and changes in form and detail to the specific manner and steps of implementing the bone conduction speaker 1700 without departing from this principle, but these modifications and changes are still within the scope described above. For example, the bone conduction speaker 1700 may include one or more conductive elements provided near the inner side wall, the outer wall, the top, and/or the bottom of the voice coil 1710. As another example, the bone conduction speaker 1700 may further include one or more annular magnetic elements, and the one or more annular magnetic elements may be connected with the upper surface of the first side wall of the second magnetic guide element 1706 or fixed within the magnetic gap.

Figure 18:
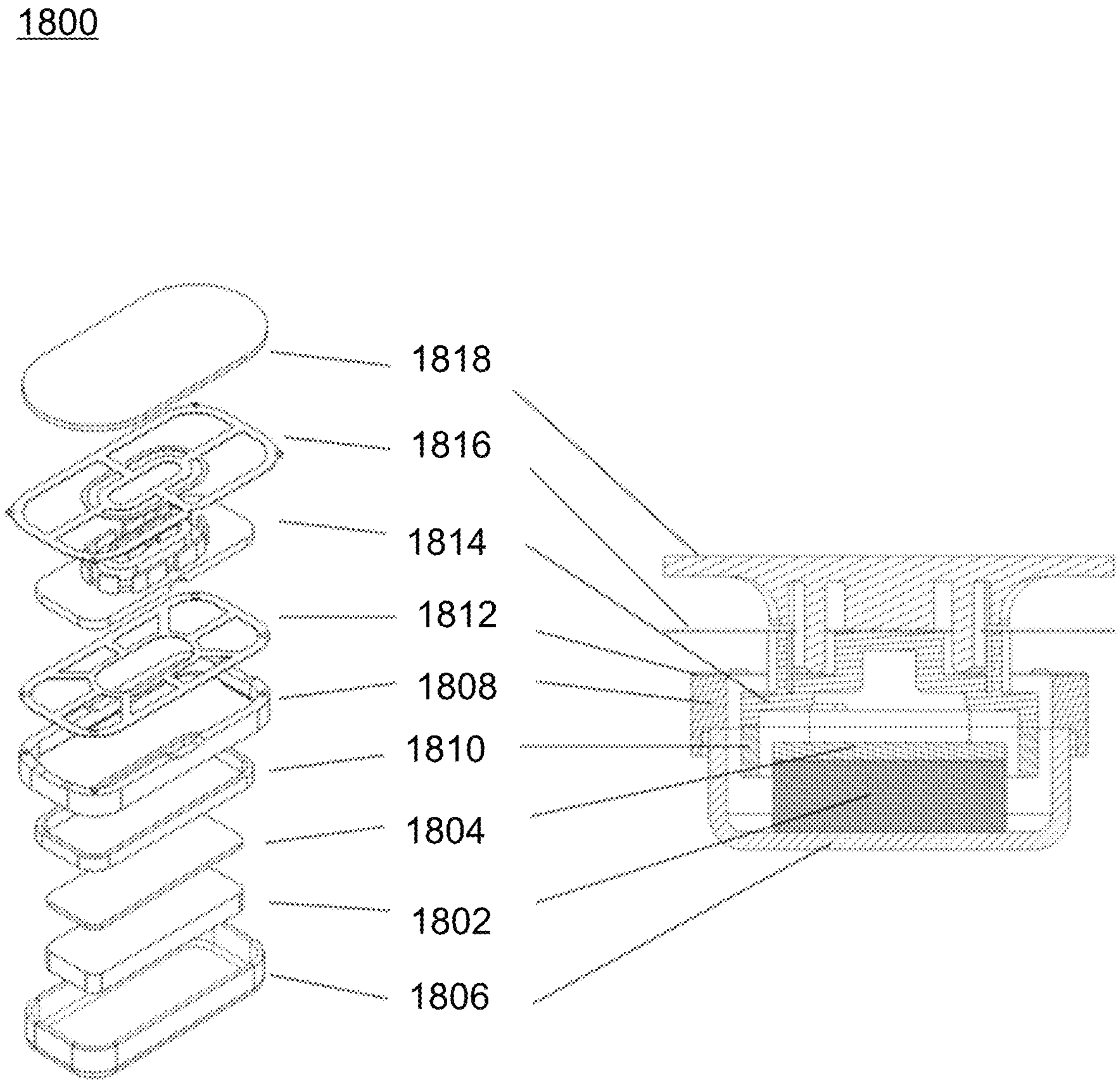
FIG. 18 is a schematic structural diagram illustrating a bone conduction speaker according to some embodiments of the present disclosure.

FIG. 18 is a schematic diagram illustrating a bone conduction speaker 1800 according to some embodiments of the present disclosure. As shown, the bone conduction speaker 1800 may include a first magnetic element 1802, a first magnetic guide element 1804, a second magnetic guide element 1806, a gasket 1808, a voice coil 1810, a first vibration plate 1812, a bracket 1814, a second vibration plate 1816, and a vibration panel 1818. The lower surface of the first magnetic element 1802 may be physically connected with the inner wall of the second magnetic guide element 1806. The upper surface of the first magnetic element 1802 may be physically connected with the upper surface of the first magnetic guide element 1804. A magnetic gap may be configured between the first magnetic element 1802, the first magnetic guide element 1804, and the second magnetic guide element 1806. A voice coil 1810 may be located within the magnetic gap. In some embodiments, the voice coil 1810 may be in a circular shape or non-circular shape, such as the trigon, the rectangle, the square, the oval, the pentagon, or other irregular shapes. The voice coil 1810 may be physically connected with the bracket 1814, the bracket 1814 may be physically connected with the first vibration plate 1812, and the first vibration plate 1812 may be physically connected with the second magnetic guide element 1806 through the washer 1808. The lower surface of the second vibration plate 1816 may be connected with the bracket 1814, and the upper surface of the second vibration plate 1816 may be connected with the vibration panel 1818. In some embodiments, the first magnetic element 1802, the first magnetic guide element 1804, the second magnetic guide element 1806, the washer 1808, the voice coil 1810, the first vibration plate 1812, the bracket 1814, the second vibration plate 11016, and/or the vibration panel 1818 may be connected through one or more connection means as described elsewhere in the present disclosure. For example, the first magnetic element 1802 may be physically connected with the first magnetic guide element 1804 and/or the second magnetic guide element 1806 by welding. As another example, the first magnetic element 1802, the first magnetic guide element 1804, and/or the second magnetic guide element 1806 may be provided with one or more holes. The pipe pin may pass through various elements (e.g., the first magnetic element 1802, the first magnetic guide element 1804, the second magnetic guide element 1806 and/or the bracket 1814) through the holes and fix the various elements after being deformed by a punching head through the bracket 1814. In some embodiments, the first vibration plate 1812 and/or the second vibration plate 1816 may be provided as one or more coaxial annular bodies. A plurality of supporting rods which are converged toward the center may be arranged in each of the one or more coaxial annular bodies, and the radiating centers may be consistent with the centers of the first vibration plate 1812 and/or the second vibration plate 1816. The plurality of supporting rods may be staggered in the first vibration plate 1812 and/or the second vibration plate 1816.

The above description of the bone conduction speaker 1800 may be only a specific example, and should not be regarded as the only feasible implementation solution. Obviously, for those skilled in the art, after understanding the basic principle of magnetic circuit assembly, it is possible to make various modifications and changes in the form and details of the specific means and steps for implementing the bone conduction speaker 1800 without departing from this principle, but these modifications and changes are still within the scope described above. For example, the bone conduction speaker 1800 may include one or more conductive elements, and the one or more conductive elements may be provided near the inner side wall, the outer wall, the top, and/or the bottom of the voice coil 1810. As another example, the bone conduction speaker 18000 may further include one or more annular magnetic elements, and the one or more annular magnetic elements may be connected with the upper surface of the side wall of the second magnetic guide element 1806 or fixed within the magnetic gap. In some embodiments, the bone conduction speaker may further include the second magnetic element and/or the third magnetic guide element.

Figure 19:
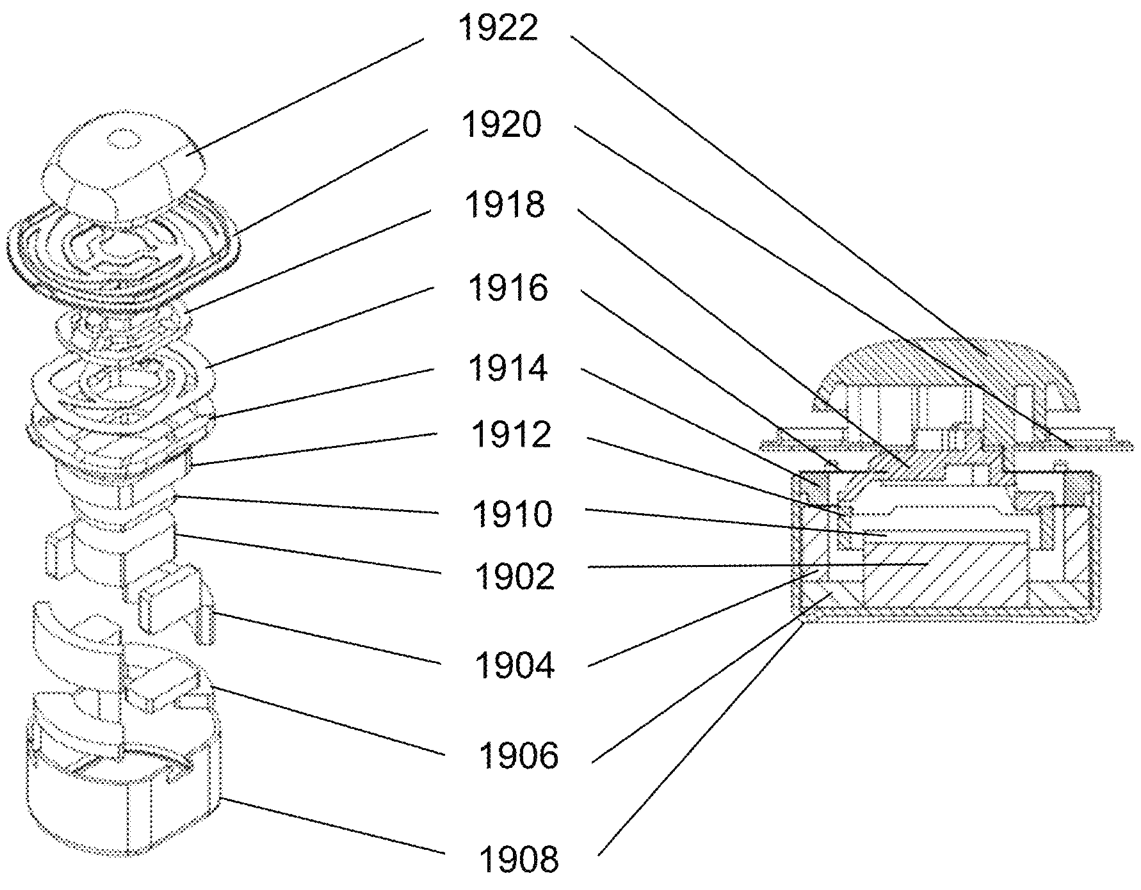
FIG. 19 is a schematic structural diagram illustrating a bone conduction speaker according to some embodiments of the present disclosure.
Figure 19:
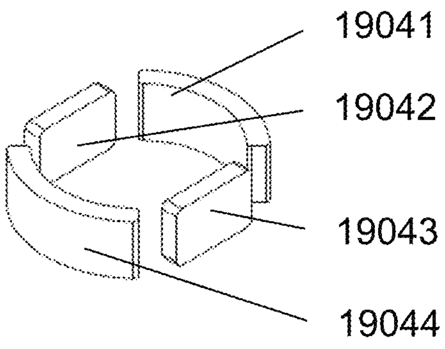
Figure 19:
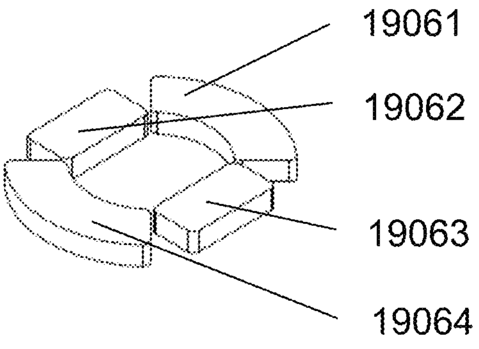

FIG. 19 is a schematic diagram illustrating a bone conduction speaker 1900 according to some embodiments of the present disclosure. As shown, the bone conduction speaker 1900 may include a first magnetic element 1902, a first magnetic guide element 1910, a second magnetic element 1904, third magnetic element 1906, a second magnetic guide element 1908, a washer 1914, a voice coil 1912, a first vibration plate 1916, a bracket 1918, a second vibration plate 1920, and a vibration panel 1922. The lower surface of the first magnetic element 1902 may be physically connected with the inner wall of the second magnetic guide element 1908. The upper surface of the first magnetic element 1902 may be physically connected with the lower surface of the first magnetic guide element 1910. The outer wall of the second magnetic element 1904 may be physically connected with the inner side wall of the second magnetic guide element 1908. The third magnetic element 1906 may be below the second magnetic element 1904, and at the same time, the outer wall of the third magnetic element 1906 may be physically connected with the inner side wall of the second magnetic guide element 1908; the inner side wall of the third magnetic element 1906 may be physically connected with the outer wall of the first magnetic element 1902; the lower surface of the third magnetic element 1906 may be physically connected with the inner wall of the second magnetic guide element 1908; the magnetic gap may be configured between the first magnetic element 1902, the first magnetic guide element 1910, the second magnetic element 1904, and the third magnetic element 1906. A voice coil 1912 may be located within the magnetic gap. In some embodiments, the voice coil 1912 may be in a track shape as shown in FIG. 19, or other geometric shapes, such as the trigon, the rectangle, the square, the oval, the pentagon, or other irregular shapes. The voice coil 1912 may be physically connected with the bracket 1918, the bracket 1918 may be physically connected with the first vibration plate 1916, and the first vibration plate 1916 may be physically connected with the second magnetic guide element 1908 through the washer 1914. The lower surface of the second vibration plate 1920 may be physically connected with the bracket 1918, and the upper surface of the second vibration plate 1920 may be physically connected with the vibration panel 1922. In some embodiments, the second magnetic element 1904 may be composed of multiple magnetic elements, for example, as shown in FIG. 19, including 4 magnetic elements 19041, 19041, 19043, and 19044. The shape surrounded by multiple magnetic elements may be the track shape as shown in FIG. 19, or other geometric shapes, such as the trigon, the rectangle, the square, the oval, the pentagon, or other irregular shapes. The third magnetic element 1906 may be composed of multiple magnetic elements, for example, as shown in FIG. 19, including 4 magnetic elements 19061, 19061, 19063, and 19064. The shape surrounded by multiple magnetic elements may be the track shape as shown in FIG. 19, or other geometric shapes, such as the trigon, the rectangle, the square, the oval, the pentagon, or other irregular shapes. As described in other embodiments in the present disclosure, at least one of the second magnetic element 1904 or the third magnetic element 1906 may be replaced with a plurality of magnetic elements with different magnetization directions. The plurality of magnetic elements with different magnetization directions may increase the magnetic field strength within the magnetic gap in the bone conduction speaker 1900, thereby improving the sensitivity of the bone conduction speaker 1900.

In some embodiments, the first magnetic element 1902, the first magnetic guide element 1910, the second magnetic element 1904, the third magnetic element 1906, the second magnetic guide element 1908, the washer 1914, the voice coil 1912, the first vibration plate 1916, the bracket 1918, the second vibration plate 1920, and/or the vibration panel 1922 may be connected through any one or more connection means as described elsewhere in the present disclosure. For example, the first magnetic element 1902, the second magnetic element 1904, and the third magnetic element 1906 may be connected with the first magnetic guide element 1910 and/or the second magnetic guide element 1908 by the bonding. As another example, the washer 1914 may be connected with the second magnetic guide element 1908 through a buckle, and the washer 1914 may further be connected with the second magnetic guide element 1908 and/or the second magnetic element 1904 through a buckle and an adhesive. In some embodiments, the first vibration plate 1916 and/or the second vibration plate 1920 may be provided as one or more coaxial annular bodies. A plurality of supporting rods may converge toward the center may be provided in the plurality of rings, and the converge center may be consistent with the center of the first vibration plate 1916 and/or the second vibration plate 1920. The plurality of supporting rods may be staggered in the first vibration plate 1916 and/or the second vibration plate 1920. A plurality of supporting rods may be straight rods or curved rods, or part of the straight rods are partially curved rods. Preferably, a plurality of supporting rods may be curved rods. In some embodiments, the outer surface of the vibration panel 1922 may be a flat surface or a curved surface. For example, the outer surface of the vibration panel 1922 may be a cambered surface that is convex as shown in FIG. 19.

The above description of the bone conduction speaker 1900 may be only a specific example, and should not be regarded as the only feasible implementation solution. Obviously, for those skilled in the art, after understanding the basic principles of magnetic circuit assembly, it is possible to make various modifications and changes in the form and details of the specific means and steps for implementing bone conduction speaker 1900 without departing from this principle, but these modifications and changes are still within the scope described above. For example, the bone conduction speaker 1900 may include one or more conductive elements provided on the inner side wall, outer wall, top, and/or bottom of the voice coil 1912. As another example, the bone conduction speaker 1900 may further include one or more annular magnetic elements, the one or more annular magnetic elements may connect the lower surface of the second magnetic element 1904 and the upper surface of the third magnetic element 1906. In some embodiments, the bone conduction speaker may further include the fifth magnetic element and/or the third magnetic guide element as described in other embodiments in the present disclosure.

What is claimed is:

1. A magnetic circuit assembly of a bone conduction speaker, wherein the magnetic circuit assembly generates a first magnetic field, and the magnetic circuit assembly includes:

a first magnetic element generating a second magnetic field;

a first magnetic guide element configured to adjust a distribution of the second magnetic field, a lower surface of the first magnetic guide element being connected with an upper surface of the first magnetic element;

a second magnetic guide element configured to adjust the distribution of the second magnetic field, at least a portion of the second magnetic guide element being configured to surround the first magnetic element and a magnetic gap being configured between the second magnetic guide element and the first magnetic element; and at least one second magnetic element connected with an upper surface of the first magnetic guide element, wherein the at least one second magnetic element generates a third magnetic field.

2. The magnetic circuit assembly of claim 1, wherein an included angle between a magnetization direction of the at least one second magnetic element and a magnetization direction of the first magnetic element is in a range from 90 degrees to 180 degrees.

3. The magnetic circuit assembly of claim 2, wherein the included angle between the magnetization direction of the at least one second magnetic element and the magnetization direction of the first magnetic element is in a range from 150 degrees to 180 degrees.

4. The magnetic circuit assembly of claim 3, wherein the included angle between the magnetization direction of the at least one second magnetic element and the magnetization direction of the first magnetic element is 180 degrees.

5. The magnetic circuit assembly of claim 2, wherein a magnetic field strength of the first magnetic field within the magnetic gap exceeds a magnetic field strength of the second magnetic field within the magnetic gap.

6. The magnetic circuit assembly of claim 2, wherein a magnetic field strength of the first magnetic field within the magnetic gap exceeds a magnetic field strength of the third magnetic field within the magnetic gap.

7. The magnetic circuit assembly of claim 2, wherein a magnetic field strength of the second magnetic field within the magnetic gap under the third magnetic field exceeds a magnetic field strength of the second magnetic field within the magnetic gap without the third magnetic field.

8. The magnetic circuit assembly of claim 1, further comprising:

at least one third magnetic element configured to surround the at least one second magnetic element.

9. The magnetic circuit assembly of claim 8, further comprising:

at least one fourth magnetic element, wherein the at least one fourth magnetic element is connected with the second magnetic guide element and the at least one third magnetic element.

10. The magnetic circuit assembly of claim 1, further comprising:

at least one fifth magnetic element located below the magnetic gap, wherein the at least one fifth magnetic element is connected with the first magnetic element and the second magnetic guide element.

11. The magnetic circuit assembly of claim 1, further comprising:

a third magnetic guide element connected with the at least one second magnetic element.

12. A magnetic circuit assembly of a bone conduction speaker, comprising:

a first magnetic element generating a first magnetic field;

a first magnetic guide element;

a magnetic field changing element configured to surround the first magnetic element, the magnetic field changing element being a magnetic element for generating a magnetic field or a magnetic guide element for adjusting a distribution of the first magnetic field, a magnetic gap being configured between the magnetic field changing element and the first magnetic element; and at least one second magnetic element located below the magnetic gap, wherein the at least one second magnetic element generates a second magnetic field.

13. The magnetic circuit assembly of claim 12, wherein magnetic induction lines generated by the first magnetic element or the at least one second magnetic element that are originally divergent without the magnetic field changing element converge to the magnetic gap under an action of the magnetic field changing element.

14. The magnetic circuit assembly of claim 12, wherein the second magnetic field increases a magnetic strength of the first magnetic field within the magnetic gap.

15. The magnetic circuit assembly of claim 12, further comprising:

at least one third magnetic element connected with the magnetic field changing element, wherein the at least one third magnetic element generates a third magnetic field.

16. The magnetic circuit assembly of claim 15, further comprising:

at least one fourth magnetic element located between the magnetic field changing element and the at least one third magnetic element.

17. The magnetic circuit assembly of claim 12, further comprising:

a magnetic shield configured to encompass the first magnetic element, the first magnetic guide element, the magnetic field changing element, and the second magnetic element, or at least one conductive element connected with at least one of the first magnetic element, the first magnetic guide element, or the second magnetic element.

18. The magnetic circuit assembly of claim 12, wherein the magnetic field changing element is connected with the at least one second magnetic element, a connection surface between the magnetic field changing element and the at least one second magnetic element including a cross section in a wedge shape.

19. The magnetic circuit assembly of claim 12, further comprising:

at least one fifth magnetic element connected with an upper surface of the first magnetic guide element, wherein the at least one fifth magnetic element generates a fifth magnetic field, the fifth magnetic field increases the magnetic field strength of the first magnetic field within the magnetic gap.

20. A bone conduction speaker, comprising a magnetic circuit assembly generating a first magnetic field, wherein the magnetic circuit assembly includes:

a first magnetic element generating a second magnetic field;

a first magnetic guide element configured to adjust a distribution of the second magnetic field, a lower surface of the first magnetic guide element being connected with an upper surface of the first magnetic element;

a second magnetic guide element configured to adjust the distribution of the second magnetic field, at least a portion of the second magnetic guide element being configured to surround the first magnetic element and a magnetic gap being configured between the second magnetic guide element and the first magnetic element; and at least one second magnetic element connected with an upper surface of the first magnetic guide element, wherein the at least one second magnetic element generates a third magnetic field.

* * * * *